(12) United States Patent
Yamamoto et al.

(10) Patent No.: US 11,759,756 B2
(45) Date of Patent: Sep. 19, 2023

(54) ULTRAFINE BUBBLE-CONTAINING LIQUID PRODUCING APPARATUS AND ULTRAFINE BUBBLE-CONTAINING LIQUID PRODUCING METHOD

(71) Applicant: CANON KABUSHIKI KAISHA, Tokyo (JP)

(72) Inventors: Akira Yamamoto, Kanagawa (JP); Masahiko Kubota, Tokyo (JP); Akitoshi Yamada, Kanagawa (JP); Yoshiyuki Imanaka, Kanagawa (JP); Yumi Yanai, Kanagawa (JP); Hiroyuki Ishinaga, Tokyo (JP); Teruo Ozaki, Kanagawa (JP); Toshio Kashino, Kanagawa (JP); Ikuo Nakazawa, Kanagawa (JP); Hiroaki Mihara, Tokyo (JP); Hiroyuki Shimoyama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 210 days.

(21) Appl. No.: 17/084,809

(22) Filed: Oct. 30, 2020

(65) Prior Publication Data

US 2021/0129093 A1    May 6, 2021

(30) Foreign Application Priority Data

Oct. 31, 2019  (JP) ................................ 2019-199170
Aug. 25, 2020  (JP) ................................ 2020-141640

(51) Int. Cl.
*B01F 25/00*    (2022.01)
*B01F 25/53*    (2022.01)
(Continued)

(52) U.S. Cl.
CPC .......... *B01F 25/53* (2022.01); *B01F 23/2375* (2022.01); *B01F 23/23124* (2022.01);
(Continued)

(58) Field of Classification Search
CPC .. B10F 35/2111; B01F 25/53; B01F 35/7176; B01F 25/51; B01F 35/221; B01F 35/2113; B01F 23/811
See application file for complete search history.

(56) References Cited

U.S. PATENT DOCUMENTS 9,327,251 B2    5/2016  Li
10,315,170 B2   6/2019  Maeda et al.
(Continued)

FOREIGN PATENT DOCUMENTS

EA    031074 B1    11/2018
EP    3 530 347 A1  8/2019
(Continued)

OTHER PUBLICATIONS

Machine Translation of WO 2018073987 to Nakao (Year: 2018).*
(Continued)

*Primary Examiner* — Anshu Bhatia
(74) *Attorney, Agent, or Firm* — VENABLE LLP

(57) ABSTRACT

In order to efficiently produce a liquid containing ultrafine bubbles of a desired gas, an ultrafine bubble-containing liquid producing apparatus includes a gas dissolving unit that dissolves a predetermined gas into a liquid, and a UFB generating unit that generates ultrafine bubbles in the liquid in which the predetermined gas is dissolved. A CPU performs control under a first condition in a case of causing the gas dissolving unit to operate in a circulation route passing through the dissolving unit. The CPU performs control under a second condition different from the first condition in
(Continued)

a case of causing the UFB generating unit to operate in a circulation route passing through the UFB generating unit.

32 Claims, 28 Drawing Sheets

(51) Int. Cl.
| | |
|---|---|
| *B01F 23/70* | (2022.01) |
| *B01F 23/80* | (2022.01) |
| *B01F 23/231* | (2022.01) |
| *B01F 25/51* | (2022.01) |
| *B01F 35/00* | (2022.01) |
| *B01F 35/221* | (2022.01) |
| *B01F 35/21* | (2022.01) |
| *B01F 35/71* | (2022.01) |
| *B01F 23/2375* | (2022.01) |

(52) U.S. Cl.
CPC .......... *B01F 23/703* (2022.01); *B01F 23/811* (2022.01); *B01F 25/51* (2022.01); *B01F 35/187* (2022.01); *B01F 35/2111* (2022.01); *B01F 35/2113* (2022.01); *B01F 35/2115* (2022.01); *B01F 35/221* (2022.01); *B01F 35/7176* (2022.01); *B01F 23/231244* (2022.01)

(56) References Cited

U.S. PATENT DOCUMENTS

| | | |
|---|---|---|
| 10,336,091 B2 | 7/2019 | Nakagawa et al. |
| 10,828,906 B2 | 11/2020 | Nakagawa et al. |
| 11,298,954 B2 | 4/2022 | Nakagawa et al. |
| 2008/0296229 A1 | 12/2008 | Yamasaki et al. |
| 2019/0240629 A1 | 8/2019 | Nakamoto |
| 2019/0374912 A1 | 12/2019 | Nakao |
| 2020/0197963 A1 | 6/2020 | Takahashi et al. |
| 2020/0254468 A1 | 8/2020 | Kubota et al. |
| 2020/0276511 A1 | 9/2020 | Ozaki et al. |
| 2020/0276512 A1 | 9/2020 | Ozaki et al. |
| 2020/0276513 A1 | 9/2020 | Yanai et al. |
| 2020/0276514 A1 | 9/2020 | Ishinaga et al. |
| 2020/0276515 A1 | 9/2020 | Kubota et al. |
| 2020/0276516 A1 | 9/2020 | Imanaka et al. |
| 2020/0276550 A1 | 9/2020 | Imanaka et al. |
| 2020/0276803 A1 | 9/2020 | Arimizu et al. |
| 2020/0276804 A1 | 9/2020 | Kubota et al. |
| 2020/0278111 A1 | 9/2020 | Imanaka et al. |
| 2021/0129041 A1 | 5/2021 | Imanaka et al. |
| 2021/0129042 A1 | 5/2021 | Ozaki et al. |
| 2021/0129090 A1 | 5/2021 | Yamada et al. |
| 2021/0129091 A1 | 5/2021 | Yamada et al. |
| 2022/0184968 A1 | 6/2022 | Nakagawa et al. |

FOREIGN PATENT DOCUMENTS

| | | |
|---|---|---|
| JP | 6104201 B2 | 3/2017 |
| JP | 2019-042732 A | 3/2019 |
| KR | 101176988 B1 | 8/2012 |
| KR | 10-2017-0083501 A | 7/2017 |
| KR | 10-2018-0054510 A | 5/2018 |
| SU | 1079904 A1 | 3/1984 |

OTHER PUBLICATIONS

Official Action in Russian Application No. 2020135723 (Sep. 2021).
Extended European Search Report in European Application No. 20204959.9 (Mar. 2021).
Request for the Submission of an Opinion in Korean Application No. 10-2020-0143059 (Feb. 2023).

* cited by examiner

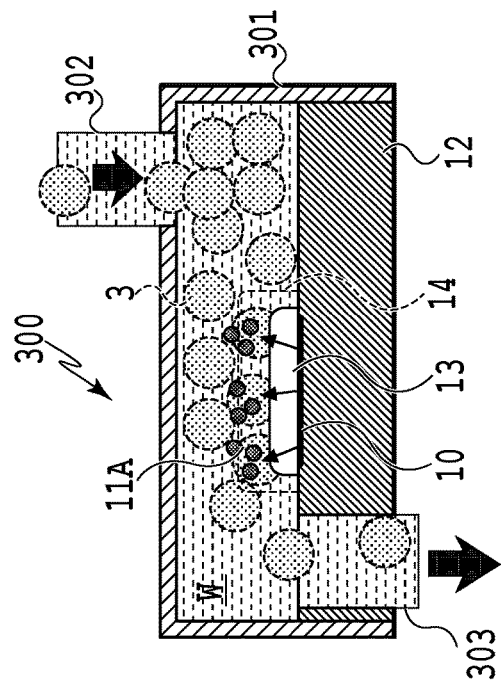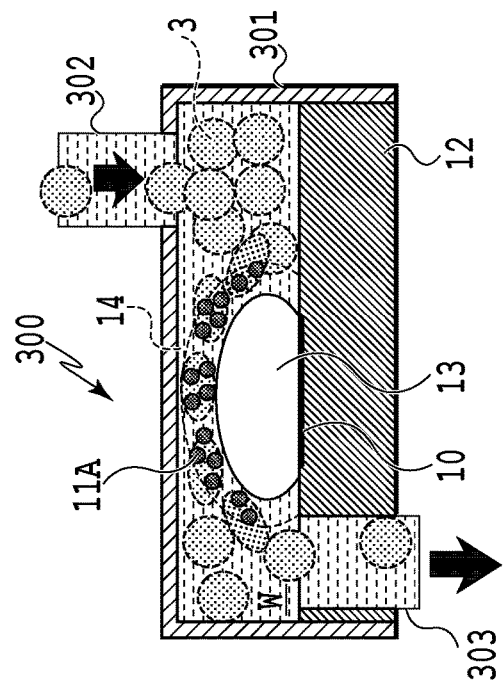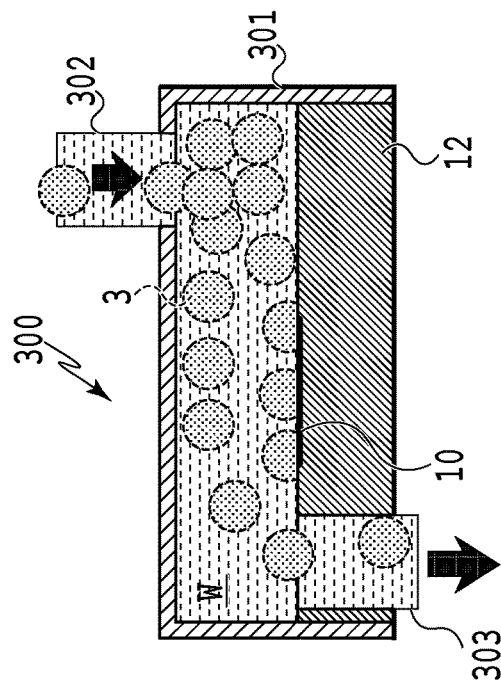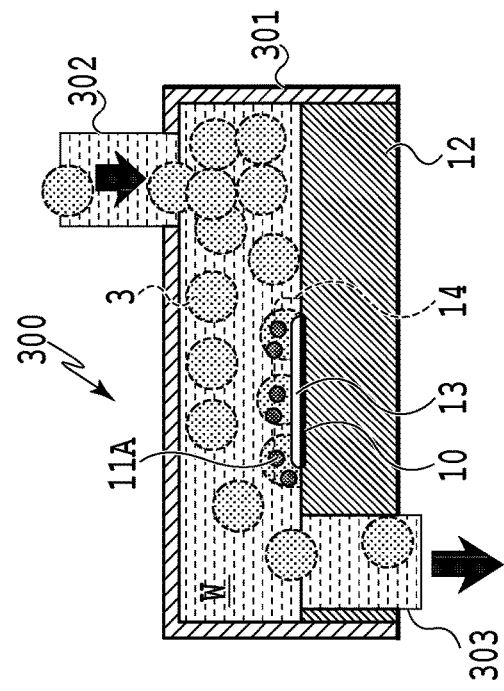

ULTRAFINE BUBBLE-CONTAINING LIQUID PRODUCING APPARATUS AND ULTRAFINE BUBBLE-CONTAINING LIQUID PRODUCING METHOD

BACKGROUND OF THE INVENTION

Field of the Invention

The present invention relates to an ultrafine bubble-containing liquid producing apparatus and an ultrafine bubble-containing liquid producing method.

Description of the Related Art

Recently, there have been developed techniques for applying the features of fine bubbles such as microbubbles in micrometer-size in diameter and nanobubbles in nanometer-size in diameter. Especially, the utility of ultrafine bubbles (hereinafter also referred to as "UFBs") smaller than 1.0 μm in diameter have been confirmed in various fields.

Japanese Patent No. 6104201 discloses an apparatus in which a pressurized dissolution unit that pressurizes a desired gas to dissolve it into a liquid, and a fine bubble generation unit that ejects the liquid from a nozzle to generate fine bubbles are provided in the same liquid circulation route to generate fine bubbles of a desired gas at high concentration.

In the configuration of Japanese Patent No. 6104201, the dissolution of the desired gas and the generation of fine bubbles are performed simultaneously in the same circulation route. Specifically, the circulation condition such as the liquid's flow rate and pressure is the same in the pressurized dissolution step and the fine bubble generation step. However, a circulation condition suitable for dissolving the desired gas into a liquid and a circulation condition suitable for generating fine bubbles are not necessarily the same. Moreover, these suitable circulation conditions vary independently of each other depending on the combination of the liquid and the gas to be used. Thus, with the configuration of Japanese Patent No. 6104201, it is not always possible to efficiently produce a liquid containing fine bubble of the desired gas.

SUMMARY OF THE INVENTION

The present invention has been made to solve the above-described problem. An object thereof is therefore to efficiently produce a liquid containing ultrafine bubbles of a desired gas.

In a first aspect of the present invention, there is provided an ultrafine bubble-containing liquid producing apparatus comprising: a dissolving unit that dissolves a predetermined gas into a liquid; an ultrafine bubble generating unit that generates ultrafine bubbles in the liquid in which the predetermined gas is dissolved; and a circulation controlling unit that controls circulation of a liquid through liquid circulation routes including the dissolving unit and the ultrafine bubble generating unit, wherein the circulation controlling unit circulates a liquid under a first condition that defines a state of the liquid to be circulated, through a circulation route passing through the dissolving unit in a case of causing the dissolving unit to operate in the circulation route, and the circulation controlling unit circulates a liquid under a second condition different from the first condition through a circulation route passing through the ultrafine bubble generating unit in a case of causing the ultrafine bubble generating unit to operate in the circulation route.

In a second aspect of the present invention, there is provided an ultrafine bubble-containing liquid producing method comprising: a dissolving step of dissolving a predetermined gas into a liquid; an ultrafine bubble generating step of generating ultrafine bubbles in the liquid in which the predetermined gas is dissolved; and a circulation controlling step of controlling circulation of a liquid so as to circulate a liquid under a first condition that defines a state of the liquid to be circulated, through a circulation route in which the dissolving step is executable, in a case of executing the dissolving step in the circulation route, and circulate a liquid under a second condition different from the first condition through a circulation route in which the ultrafine bubble generating step is executable, in a case of executing the ultrafine bubble generating step in the circulation route.

Further features of the present invention will become apparent from the following description of exemplary embodiments with reference to the attached drawings.

BRIEF DESCRIPTION OF THE DRAWINGS

FIGS. 7A to 7D are diagrams illustrating the states of generation of UFBs caused by expansion of a film boiling bubble;

DESCRIPTION OF THE EMBODIMENTS

《Configuration of UFB Generating Apparatus》

Figure 1:
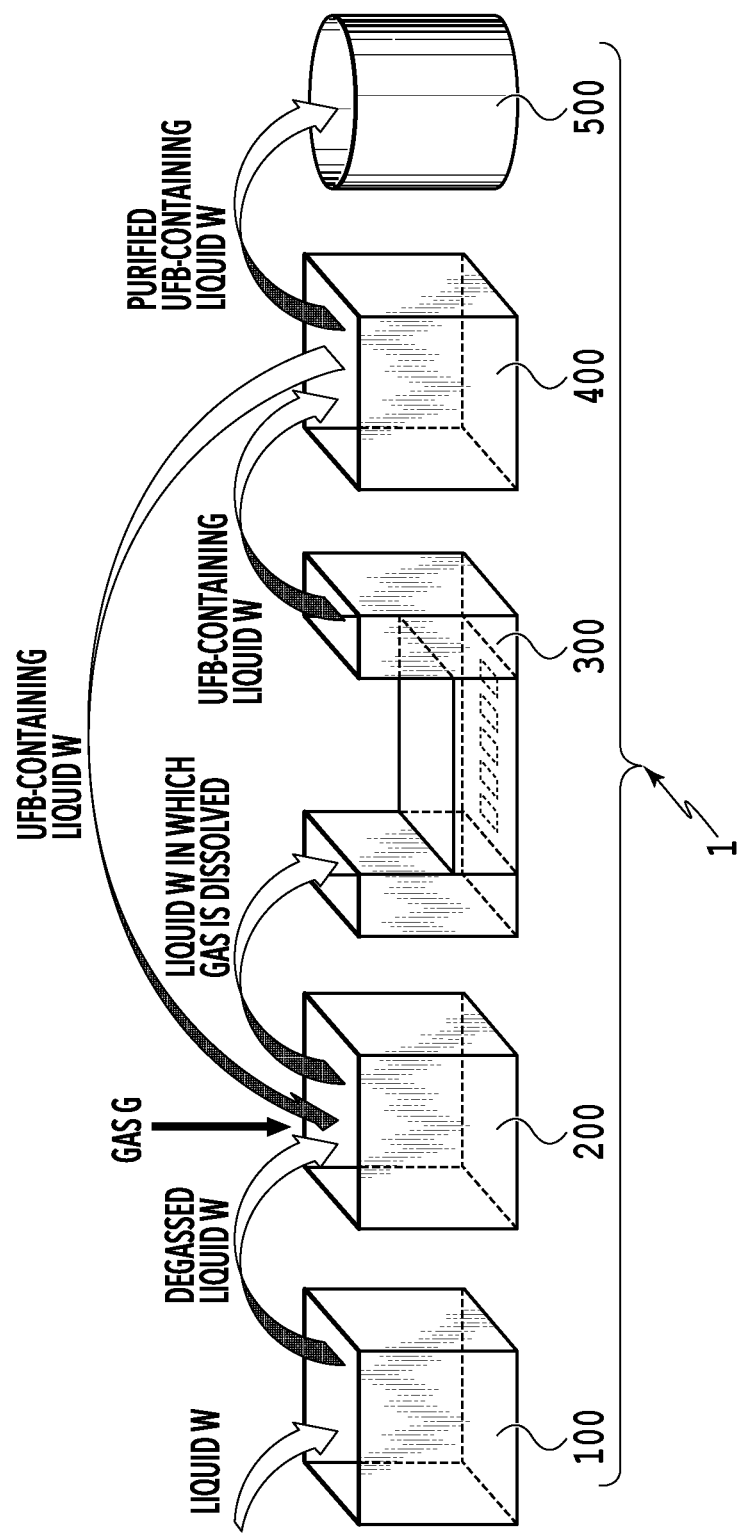
FIG. 1 is a diagram illustrating an example of a UFB generating apparatus.

FIG. 1 is a Schematic configuration diagram of a UFB generating apparatus applicable to the present invention. A UFB generating apparatus 1 of this embodiment includes a pre-processing unit 100, dissolving unit 200, a T-UFB generating unit 300, a post-processing unit 400, and a collecting unit 500. Each unit performs unique processing on a liquid W such as tap water supplied to the pre-processing unit 100 in the above order, and the thus-processed liquid W is collected as a T-UFB-containing liquid by the collecting unit 500. Functions and configurations of the units are described below. Although details are described later, UFBs generated by utilizing the film boiling caused by rapid heating are referred to as thermal-ultrafine bubbles (T-UFBs) in this specification.

Figure 2:
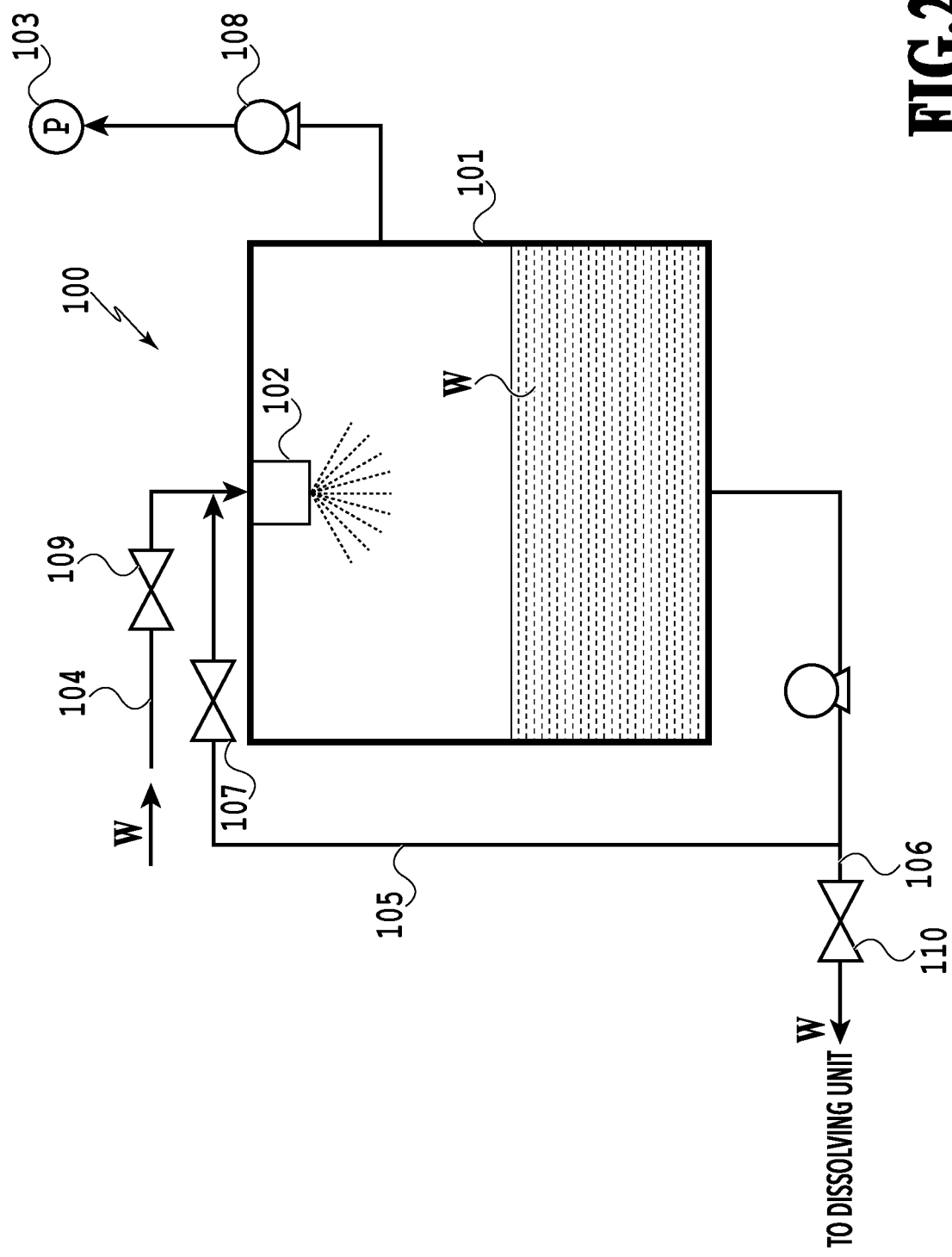
FIG. 2 is a schematic configuration diagram of a pre-processing unit.

FIG. 2 is a schematic configuration diagram of the pre-processing unit 100. The pre-processing unit 100 of this embodiment performs a degassing treatment on the supplied liquid W. The pre-processing unit 100 mainly includes a degassing container 101, a shower head 102, a depressurizing pump 103, a liquid introduction passage 104, a liquid circulation passage 105, and a liquid discharge passage 106. For example, the liquid W such as tap water is supplied to the degassing container 101 from the liquid introduction passage 104 through a valve 109. In this process, the shower head 102 provided in the degassing container 101 sprays a mist of the liquid W in the degassing container 101. The shower head 102 is for prompting the gasification of the liquid W; however, a centrifugal and the like may be used instead as the mechanism for producing the gasification prompt effect.

When a certain amount of the liquid W is reserved in the degassing container 101 and then the depressurizing pump 103 is activated with all the valves closed, already-gasified gas components are discharged, and gasification and discharge of gas components dissolved in the liquid W are also prompted. In this process, the internal pressure of the degassing container 101 may be depressurized to around several hundreds to thousands of Pa (1.0 Torr to 10.0 Torr) while checking a manometer 108. The gases to be removed by the pre-processing unit 100 includes nitrogen, oxygen, argon, carbon dioxide, and so on, for example.

The above-described degassing processing can be repeatedly performed on the same liquid W by utilizing the liquid circulation passage 105. Specifically, the shower head 102 is operated with the valve 109 of the liquid introduction passage 104 and a valve 110 of the liquid discharge passage 106 closed and a valve 107 of the liquid circulation passage 105 opened. This allows the liquid W reserved in the degassing container 101 and degassed once to be resprayed in the degassing container 101 from the shower head 102. In addition, with the depressurizing pump 103 operated, the gasification processing by the shower head 102 and the degassing processing by the depressurizing pump 103 are repeatedly performed on the same liquid W. Every time the above processing utilizing the liquid circulation passage 105 is performed repeatedly, it is possible to decrease the gas components contained in the liquid W in stages. Once the liquid W degassed to a desired purity is obtained, the liquid W is transferred to the dissolving unit 200 through the liquid discharge passage 106 with the valve 110 opened.

FIG. 2 illustrates the degassing unit 100 that depressurizes the gas part to gasify the solute; however, the method of degassing the solution is not limited thereto. For example, a heating and boiling method for boiling the liquid W to gasify the solute may be employed, or a film degassing method for increasing the interface between the liquid and the gas using hollow fibers. A SEPAREL series (produced by DIC corporation) is commercially supplied as the degassing module using the hollow fibers. The SEPAREL series uses poly(4-methylpentene-1) (PMP) for the raw material of the hollow fibers and is used for removing air bubbles from ink and the like mainly supplied for a piezo head. In addition, two or more of an evacuating method, the heating and boiling method, and the film degassing method may be used together.

Figure 3A:
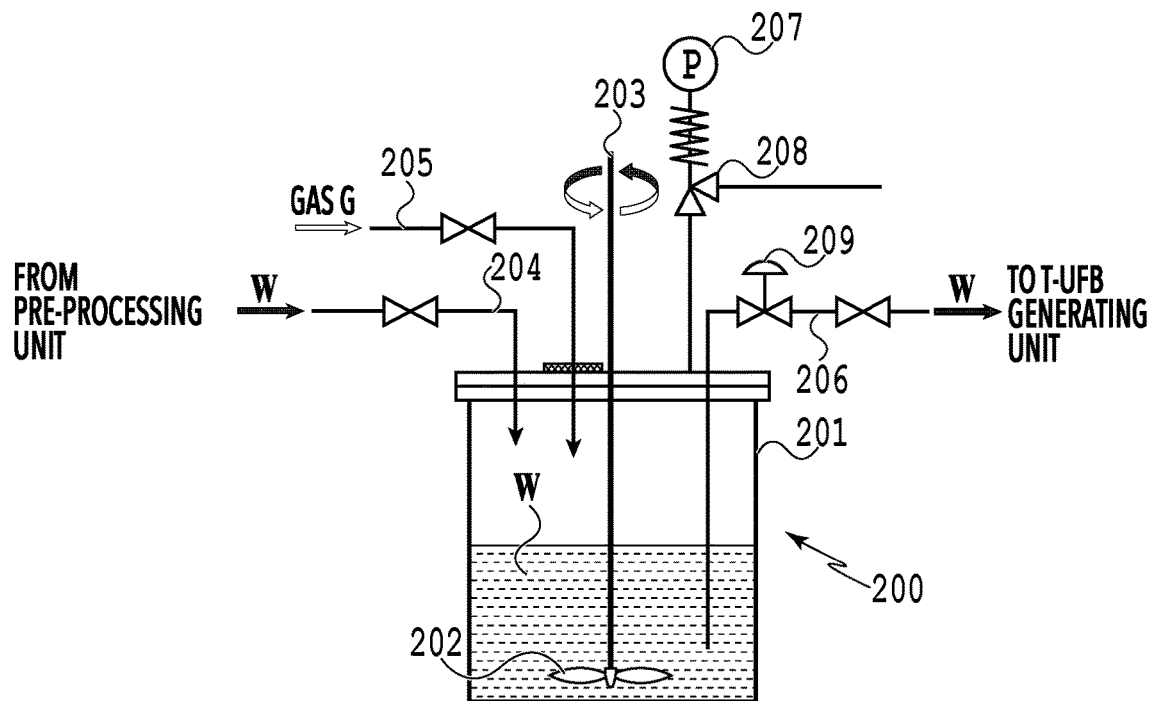
FIGS. 3A and 3B are a schematic configuration diagram of a dissolving unit and a diagram for describing the dissolving states in a liquid.
Figure 3B:
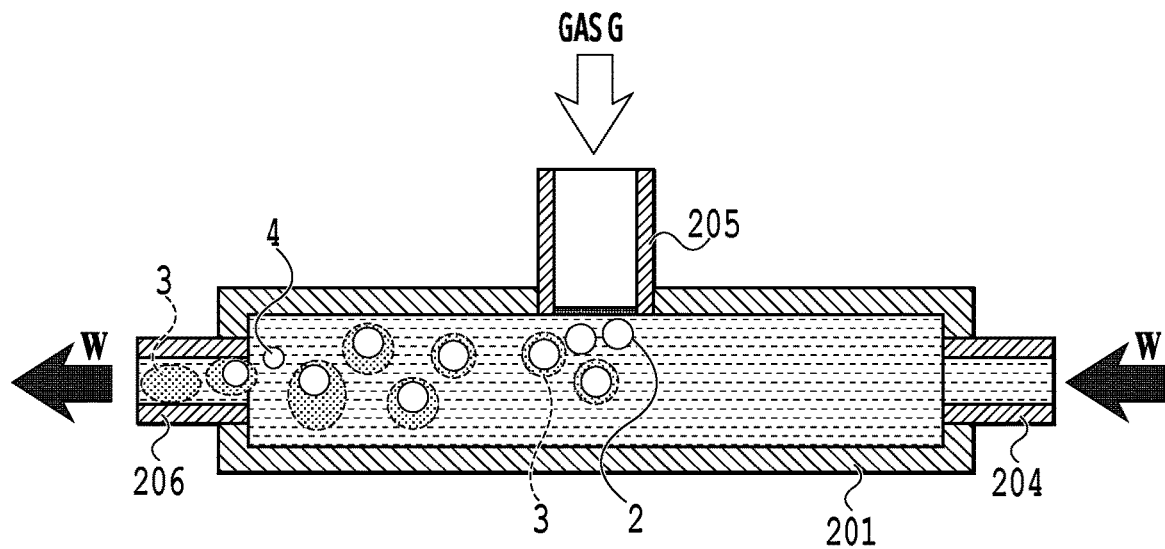

FIGS. 3A and 3B are a schematic configuration diagram of the dissolving unit 200 and a diagram for describing the dissolving states in the liquid. The dissolving unit 200 is a unit for dissolving a desired gas into the liquid W supplied from the pre-processing unit 100. The dissolving unit 200 of this embodiment mainly includes a dissolving container 201, a rotation shaft 203 provided with a rotation plate 202, a liquid introduction passage 204, a gas introduction passage 205, a liquid discharge passage 206, and a pressurizing pump 207.

The liquid W supplied from the pre-processing unit 100 is supplied and reserved into the dissolving container 201 through the liquid introduction passage 204. Meanwhile, a gas G is supplied to the dissolving container 201 through the gas introduction passage 205.

Once predetermined amounts of the liquid W and the gas G are reserved in the dissolving container 201, the pressurizing pump 207 is activated to increase the internal pressure of the dissolving container 201 to about 0.5 MPa. A safety valve 208 is arranged between the pressurizing pump 207 and the dissolving container 201. With the rotation plate 202 in the liquid rotated via the rotation shaft 203, the gas G supplied to the dissolving container 201 is transformed into air bubbles, and the contact area between the gas G and the liquid W is increased to prompt the dissolution into the liquid W. This operation is continued until the solubility of the gas G reaches almost the maximum saturation solubility. In this case, a unit for decreasing the temperature of the liquid may be provided to dissolve the gas as much as possible. When the gas is with low solubility, it is also possible to increase the internal pressure of the dissolving container 201 to 0.5 MPa or higher. In this case, the material and the like of the container need to be the optimum for safety sake.

Once the liquid W in which the components of the gas G are dissolved at a desired concentration is obtained, the liquid W is discharged through the liquid discharge passage 206 and supplied to the T-UFB generating unit 300. In this process, a back-pressure valve 209 adjusts the flow pressure of the liquid W to prevent excessive increase of the pressure during the supplying.

FIG. 3B is a diagram schematically illustrating the dissolving states of the gas G put in the dissolving container 201. An air bubble 2 containing the components of the gas G put in the liquid W is dissolved from a portion in contact with the liquid W. The air bubble 2 thus shrinks gradually, and a gas-dissolved liquid 3 then appears around the air bubble 2. Since the air bubble 2 is affected by the buoyancy, the air bubble 2 may be moved to a position away from the center of the gas-dissolved liquid 3 or be separated out from the gas-dissolved liquid 3 to become a residual air bubble 4. Specifically, in the liquid W to be supplied to the T-UFB generating unit 300 through the liquid discharge passage 206, there is a mix of the air bubbles 2 surrounded by the gas-dissolved liquids 3 and the air bubbles 2 and the gas-dissolved liquids 3 separated from each other.

The gas-dissolved liquid 3 in the drawings means "a region of the liquid W in which the dissolution concentration of the gas G mixed therein is relatively high." In the gas components actually dissolved in the liquid W, the concentration of the gas components in the gas-dissolved liquid 3 is the highest at a portion surrounding the air bubble 2. In a case where the gas-dissolved liquid 3 is separated from the air bubble 2 the concentration of the gas components of the gas-dissolved liquid 3 is the highest at the center of the region, and the concentration is continuously decreased as away from the center. That is, although the region of the gas-dissolved liquid 3 is surrounded by a broken line in FIG. 3 for the sake of explanation, such a clear boundary does not actually exist. In addition, in the present invention, a gas that cannot be dissolved completely may be accepted to exist in the form of an air bubble in the liquid.

Figure 4:
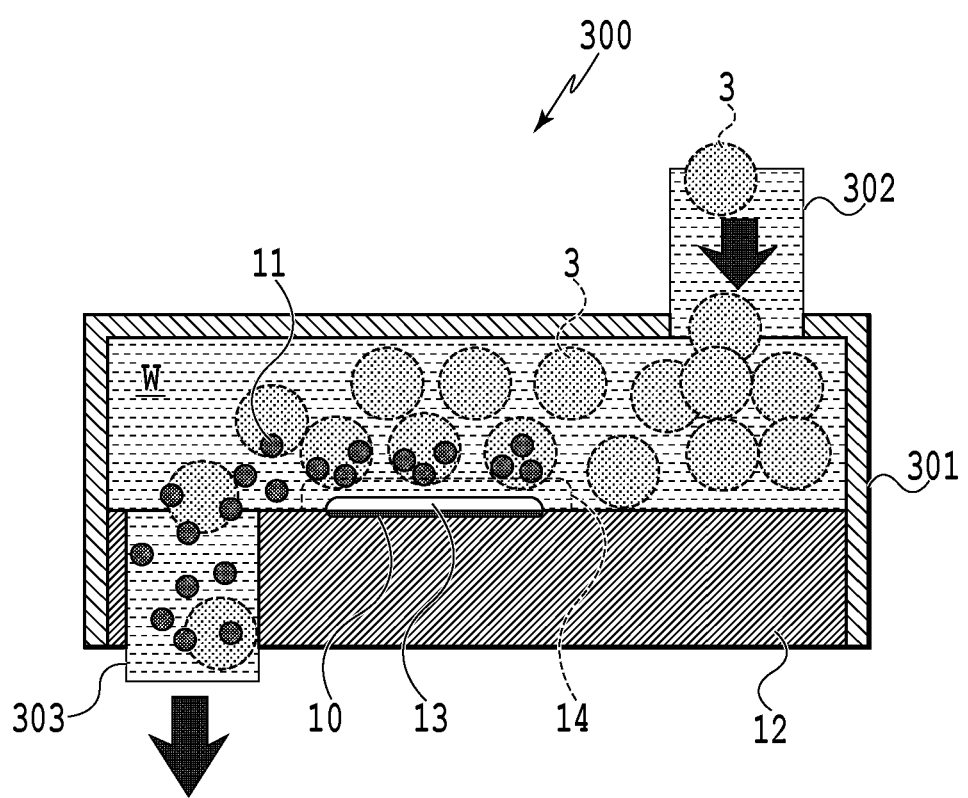
FIG. 4 is a schematic configuration diagram of a T-UFB generating unit.

FIG. 4 is a schematic configuration diagram of the T-UFB generating unit 300. The T-UFB generating unit 300 mainly includes a chamber 301, a liquid introduction passage 302, and a liquid discharge passage 303. The flow from the liquid introduction passage 302 to the liquid discharge passage 303 through the chamber 301 is formed by a not-illustrated flow pump. Various pumps including a diaphragm pump, a gear pump, and a screw pump may be employed as the flow pump. In in the liquid W introduced from the liquid introduction passage 302, the gas-dissolved liquid 3 of the gas G put by the dissolving unit 200 is mixed.

An element substrate 12 provided with a heating element 10 is arranged on a bottom section of the chamber 301. With a predetermined voltage pulse applied to the heating element 10, a bubble 13 generated by the film boiling (hereinafter, also referred to as a film boiling bubble 13) is generated in a region in contact with the heating element 10. Then, an ultrafine bubble (UFB) 11 containing the gas G is generated caused by expansion and shrinkage of the film boiling bubble 13. As a result, a UFB-containing liquid W containing many UFBs 11 is discharged from the liquid discharge passage 303.

Figure 5A:
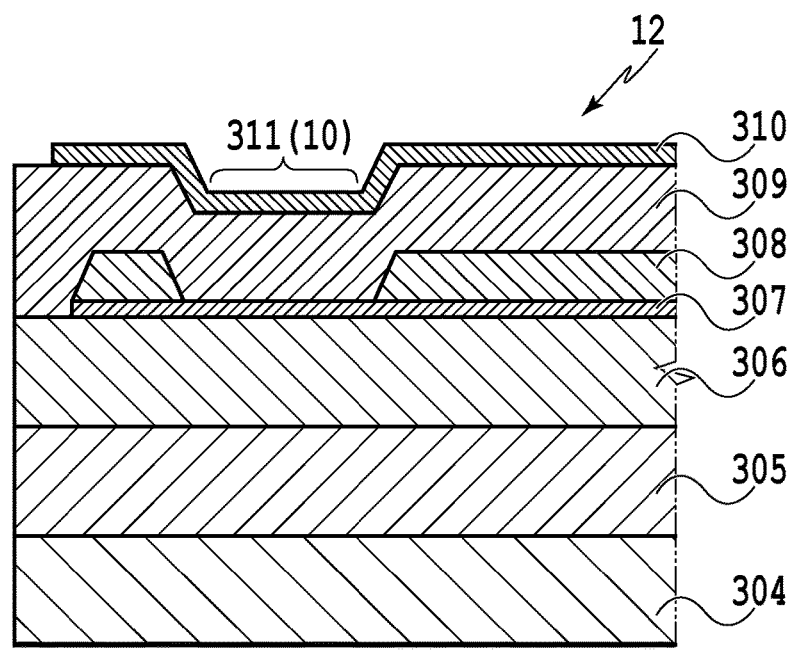
FIGS. 5A and 5B are diagrams for describing details of a heating element.
Figure 5B:
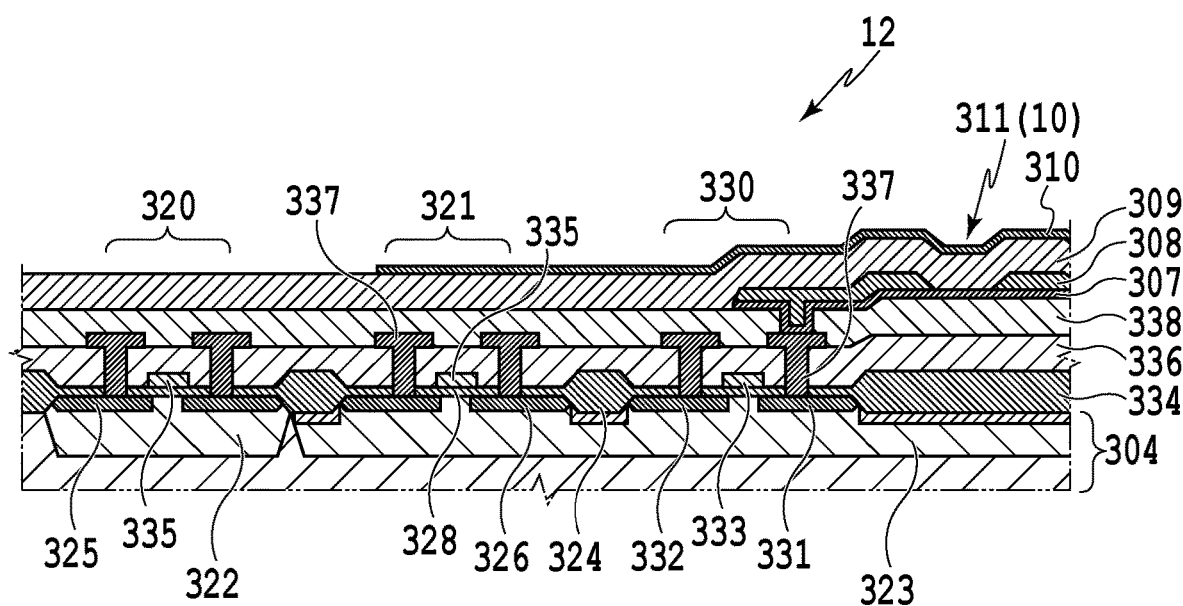

FIGS. 5A and 5B are diagrams for illustrating a detailed configuration of the heating element 10. FIG. 5A illustrates a closeup view of the heating element 10, and FIG. 5B illustrates a cross-sectional view of a wider region of the element substrate 12 including the heating element 10.

As illustrated in FIG. 5A, in the element substrate 12 of this embodiment, a thermal oxide film 305 as a heat-accumulating layer and an interlaminar film 306 also served as a heat-accumulating layer are laminated on a surface of a silicon substrate 304. An $SiO_2$ film or an SiN film may be used as the interlaminar film 306. A resistive layer 307 is formed on a surface of the interlaminar film 306, and a wiring 308 is partially formed on a surface of the resistive layer 307. An Al-alloy wiring of Al, Al—Si, Al—Cu, or the like may be used as the wiring 308. A protective layer 309 made of an $SiO_2$ film or an $Si_3N_4$ film is formed on surfaces of the wiring 308, the resistive layer 307, and the interlaminar film 306.

A cavitation-resistant film 310 for protecting the protective layer 309 from chemical and physical impacts due to the heat evolved by the resistive layer 307 is formed on a portion and around the portion on the surface of the protective layer 309, the portion corresponding to a heat-acting portion 311 that eventually becomes the heating element 10. A region on the surface of the resistive layer 307 in which the wiring 308 is not formed is the heat-acting portion 311 in which the resistive layer 307 evolves heat. The heating portion of the resistive layer 307 on which the wiring 308 is not formed functions as the heating element (heater) 10. As described above, the layers in the element substrate 12 are sequentially formed on the surface of the silicon substrate 304 by a semiconductor production technique, and the heat-acting portion 311 is thus provided on the silicon substrate 304.

The configuration illustrated in the drawings is an example, and various other configurations are applicable. For example, a configuration in which the laminating order of the resistive layer 307 and the wiring 308 is opposite, and a configuration in which an electrode is connected to a lower surface of the resistive layer 307 (so-called a plug electrode configuration) are applicable. In other words, as described later, any configuration may be applied as long as the configuration allows the heat-acting portion 311 to heat the liquid for generating the film boiling in the liquid.

FIG. 5B is an example of a cross-sectional view of a region including a circuit connected to the wiring 308 in the element substrate 12. An N-type well region 322 and a P-type well region 323 are partially provided in a top layer of the silicon substrate 304, which is a P-type conductor. A P-MOS 320 is formed in the N-type well region 322 and an N-MOS 321 is formed in the P-type well region 323 by introduction and diffusion of impurities by the ion implantation and the like in the general MOS process.

The P-MOS 320 includes a source region 325 and a drain region 326 formed by partial introduction of N-type or P-type impurities in a top layer of the N-type well region 322, a gate wiring 335, and so on. The gate wiring 335 is deposited on a part of a top surface of the N-type well region 322 excluding the source region 325 and the drain region 326, with a gate insulation film 328 of several hundreds of Å in thickness interposed between the gate wiring 335 and the top surface of the N-type well region 322.

The N-MOS 321 includes the source region 325 and the drain region 326 formed by partial introduction of N-type or P-type impurities in a top layer of the P-type well region 323, the gate wiring 335, and so on. The gate wiring 335 is deposited on a part of a top surface of the P-type well region 323 excluding the source region 325 and the drain region 326, with the gate insulation film 328 of several hundreds of Å in thickness interposed between the gate wiring 335 and the top surface of the P-type well region 323. The gate wiring 335 is made of polysilicon of 3000 Å to 5000 Å in thickness deposited by the CVD method. A C-MOS logic is constructed with the P-MOS 320 and the N-MOS 321.

In the P-type well region 323, an N-MOS transistor 330 for driving an electrothermal conversion element (heating resistance element) is formed on a portion different from the portion including the N-MOS 321. The N-MOS transistor 330 includes a source region 332 and a drain region 331 partially provided in the top layer of the P-type well region 323 by the steps of introduction and diffusion of impurities, a gate wiring 333, and so on. The gate wiring 333 is deposited on a part of the top surface of the P-type well region 323 excluding the source region 332 and the drain region 331, with the gate insulation film 328 interposed between the gate wiring 333 and the top surface of the P-type well region 323.

In this example, the N-MOS transistor 330 is used as the transistor for driving the electrothermal conversion element. However, the transistor for driving is not limited to the N-MOS transistor 330, and any transistor may be used as long as the transistor has a capability of driving multiple electrothermal conversion elements individually and can implement the above-described fine configuration. Although the electrothermal conversion element and the transistor for driving the electrothermal conversion element are formed on the same substrate in this example, those may be formed on different substrates separately.

An oxide film separation region 324 is formed by field oxidation of 5000 Å to 10000 Å in thickness between the elements, such as between the P-MOS 320 and the N-MOS 321 and between the N-MOS 321 and the N-MOS transistor 330. The oxide film separation region 324 separates the elements. A portion of the oxide film separation region 324 corresponding to the heat-acting portion 311 functions as a heat-accumulating layer 334, which is the first layer on the silicon substrate 304.

An interlayer insulation film 336 including a PSG film, a BPSG film, or the like of about 7000 Å in thickness is formed by the CVD method on each surface of the elements such as the P-MOS 320, the N-MOS 321, and the N-MOS transistor 330. After the interlayer insulation film 336 is made flat by heat treatment, an Al electrode 337 as a first wiring layer is formed in a contact hole penetrating through the interlayer insulation film 336 and the gate insulation film 328. On surfaces of the interlayer insulation film 336 and the Al electrode 337, an interlayer insulation film 338 including an $SiO_2$ film of 10000 Å to 15000 Å in thickness is formed by a plasma CVD method. On the surface of the interlayer insulation film 338, a resistive layer 307 including a TaSiN film of about 500 Å in thickness is formed by a co-sputter method on portions corresponding to the heat-acting portion 311 and the N-MOS transistor 330. The resistive layer 307 is electrically connected with the Al electrode 337 near the drain region 331 via a through-hole formed in the interlayer insulation film 338. On the surface of the resistive layer 307, the wiring 308 of Al as a second wiring layer for a wiring to each electrothermal conversion element is formed. The protective layer 309 on the surfaces of the wiring 308, the resistive layer 307, and the interlayer insulation film 338 includes an SiN film of 3000 Å in thickness formed by the plasma CVD method. The cavitation-resistant film 310 deposited on the surface of the protective layer 309 includes a thin film of about 2000 Å in thickness, which is at least one metal selected from the group consisting of Ta, Fe, Ni, Cr, Ge, Ru, Zr, Ir, and the like. Various materials other than the above-described TaSiN such as $TaN_{0.8}$, CrSiN, TaAl, WSiN, and the like can be applied as long as the material can generate the film boiling in the liquid.

Figure 6A:
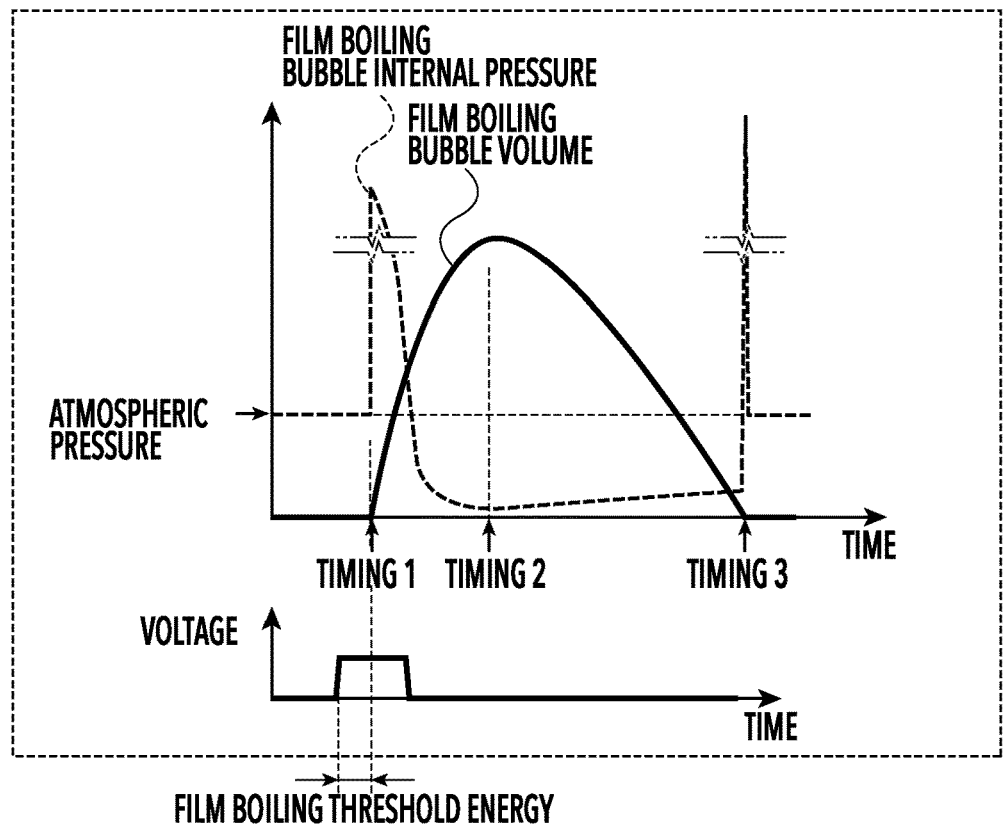
FIGS. 6A and 6B are diagrams for describing the states of film boiling on the heating element.
Figure 6B:
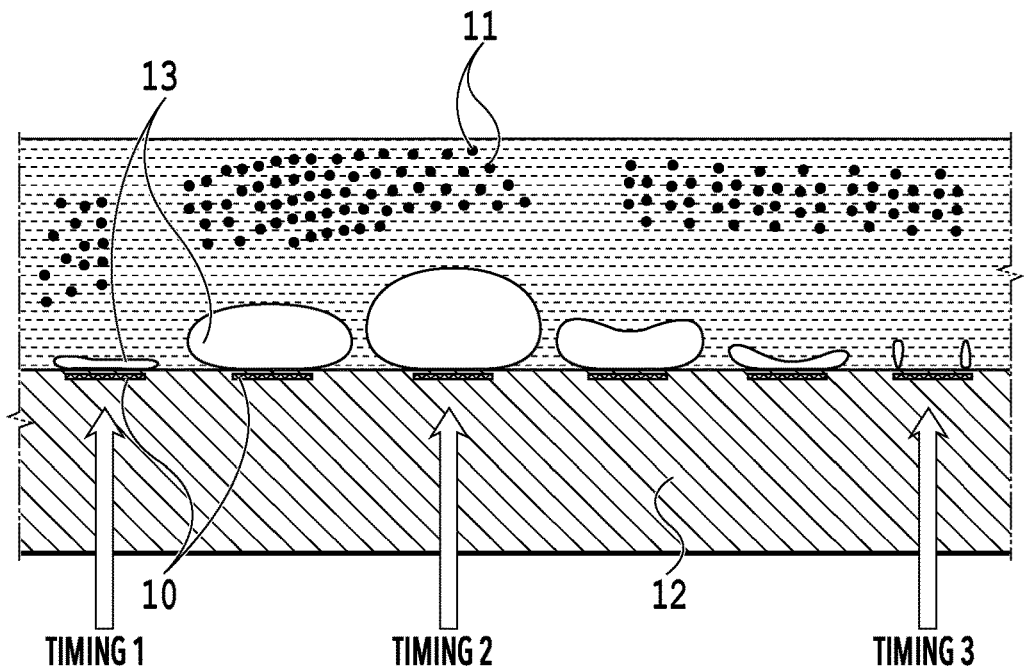

FIGS. 6A and 6B are diagrams illustrating the states of the film boiling when a predetermined voltage pulse is applied to the heating element 10. In this case, the case of generating the film boiling under atmospheric pressure is described. In FIG. 6A, the horizontal axis represents time. The vertical axis in the lower graph represents a voltage applied to the heating element 10, and the vertical axis in the upper graph represents the volume and the internal pressure of the film boiling bubble 13 generated by the film boiling. On the other hand, FIG. 6B illustrates the states of the film boiling bubble 13 in association with timings 1 to 3 shown in FIG. 6A. Each of the states is described below in chronological order. The UFBs 11 generated by the film boiling as described later are mainly generated near a surface of the film boiling bubble 13. The states illustrated in FIG. 6B are the states where the UFBs 11 generated by the generating unit 300 are resupplied to the dissolving unit 200 through the circulation route, and the liquid containing the UFBs 11 is resupplied to the liquid passage of the generating unit 300, as illustrated in FIG. 1.

Before a voltage is applied to the heating element 10, the atmospheric pressure is substantially maintained in the chamber 301. Once a voltage is applied to the heating element 10, the film boiling is generated in the liquid in contact with the heating element 10, and a thus-generated air bubble (hereinafter, referred to as the film boiling bubble 13) is expanded by a high pressure acting from inside (timing 1). A bubbling pressure in this process is expected to be around 8 to 10 MPa, which is a value close to a saturation vapor pressure of water.

The time for applying a voltage (pulse width) is around 0.5 μsec to 10.0 μsec, and the film boiling bubble 13 is expanded by the inertia of the pressure obtained in timing 1 even after the voltage application. However, a negative pressure generated with the expansion is gradually increased inside the film boiling bubble 13, and the negative pressure acts in a direction to shrink the film boiling bubble 13. After a while, the volume of the film boiling bubble 13 becomes the maximum in timing 2 when the inertial force and the negative pressure are balanced, and thereafter the film boiling bubble 13 shrinks rapidly by the negative pressure.

In the disappearance of the film boiling bubble 13, the film boiling bubble 13 disappears not in the entire surface of the heating element 10 but in one or more extremely small regions. For this reason, on the heating element 10, further greater force than that in the bubbling in timing 1 is generated in the extremely small region in which the film boiling bubble 13 disappears (timing 3).

The generation, expansion, shrinkage, and disappearance of the film boiling bubble 13 as described above are repeated every time a voltage pulse is applied to the heating element 10, and new UFBs 11 are generated each time.

The states of generation of the UFBs 11 in each process of the generation, expansion, shrinkage, and disappearance of the film boiling bubble 13 are further described in detail with reference to FIGS. 7A to 10B.

FIGS. 7A to 7D are diagrams schematically illustrating the states of generation of the UFBs 11 caused by the generation and the expansion of the film boiling bubble 13. FIG. 7A illustrates the state before the application of a voltage pulse to the heating element 10. The liquid W in which the gas-dissolved liquids 3 are mixed flows inside the chamber 301.

FIG. 7B illustrates the state where a voltage is applied to the heating element 10, and the film boiling bubble 13 is evenly generated in almost all over the region of the heating element 10 in contact with the liquid W. When a voltage is applied, the surface temperature of the heating element 10 rapidly increases at a speed of 10° C./μsec. The film boiling occurs at a time point when the temperature reaches almost 300° C., and the film boiling bubble 13 is thus generated.

Thereafter, the surface temperature of the heating element 10 keeps increasing to around 600 to 800° C. during the pulse application, and the liquid around the film boiling bubble 13 is rapidly heated as well. In FIG. 7B, a region of the liquid that is around the film boiling bubble 13 and to be rapidly heated is indicated as a not-yet-bubbling high temperature region 14. The gas-dissolved liquid 3 within the not-yet-bubbling high temperature region 14 exceeds the thermal dissolution limit and is vaporized to become the UFB. The thus-vaporized air bubbles have diameters of around 10 nm to 100 nm and large gas-liquid interface energy. Thus, the air bubbles float independently in the liquid W without disappearing in a short time. In this embodiment, the air bubbles generated by the thermal action from the generation to the expansion of the film boiling bubble 13 are called first UFBs 11A.

FIG. 7C illustrates the state where the film boiling bubble 13 is expanded. Even after the voltage pulse application to the heating element 10, the film boiling bubble 13 continues expansion by the inertia of the force obtained from the generation thereof, and the not-yet-bubbling high temperature region 14 is also moved and spread by the inertia. Specifically, in the process of the expansion of the film boiling bubble 13, the gas-dissolved liquid 3 within the not-yet-bubbling high temperature region 14 is vaporized as a new air bubble and becomes the first UFB 11A.

FIG. 7D illustrates the state where the film boiling bubble 13 has the maximum volume. As the film boiling bubble 13 is expanded by the inertia, the negative pressure inside the film boiling bubble 13 is gradually increased along with the expansion, and the negative pressure acts to shrink the film boiling bubble 13. At a time point when the negative pressure and the inertial force are balanced, the volume of the film boiling bubble 13 becomes the maximum, and then the shrinkage is started.

Figure 8A:
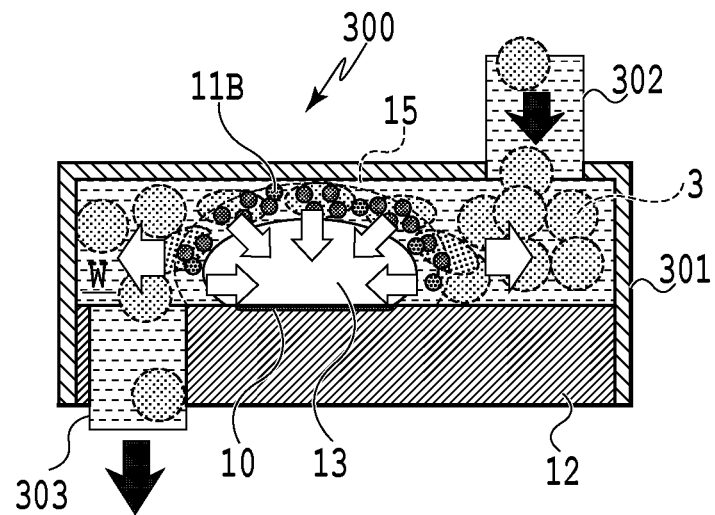
FIGS. 8A to 8C are diagrams illustrating the states of generation of UFBs caused by shrinkage of the film boiling bubble.
Figure 8B:
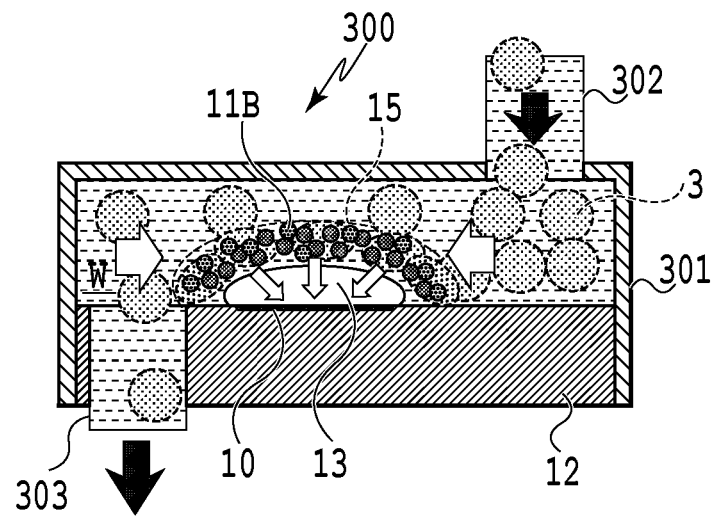
Figure 8C:
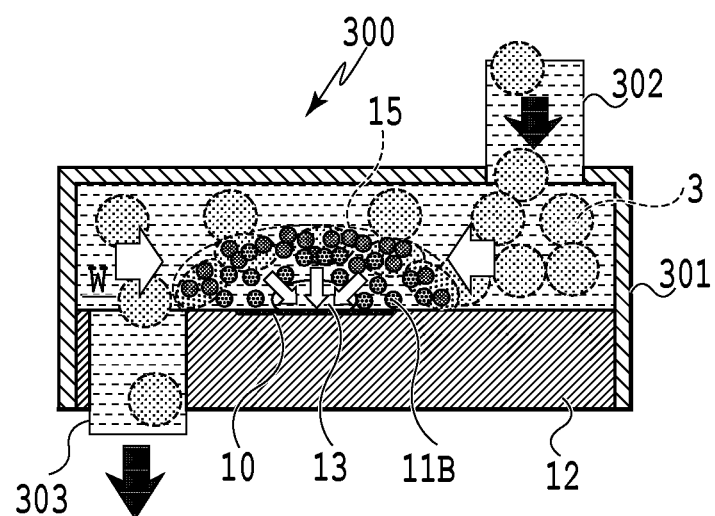
Figure 9A:
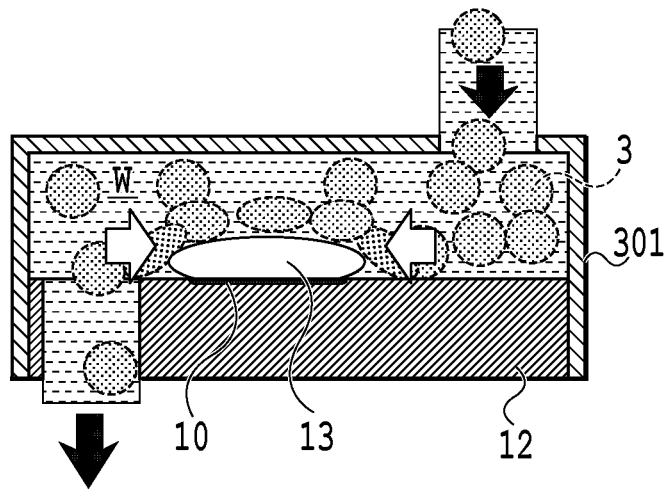
FIGS. 9A to 9C are diagrams illustrating the states of generation of UFBs caused by reheating of the liquid.
Figure 9B:
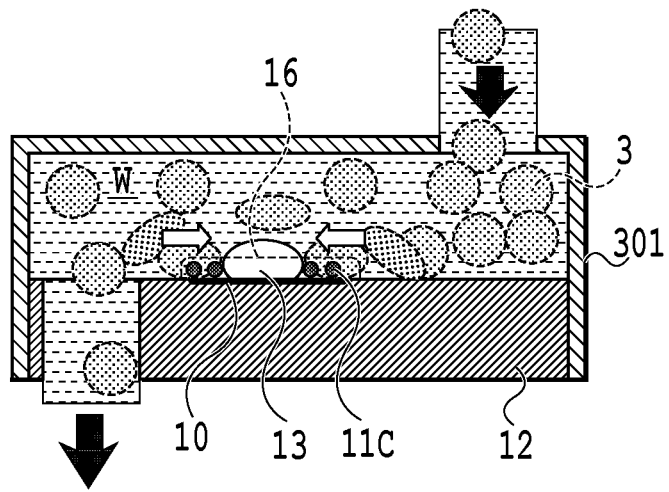
Figure 9C:
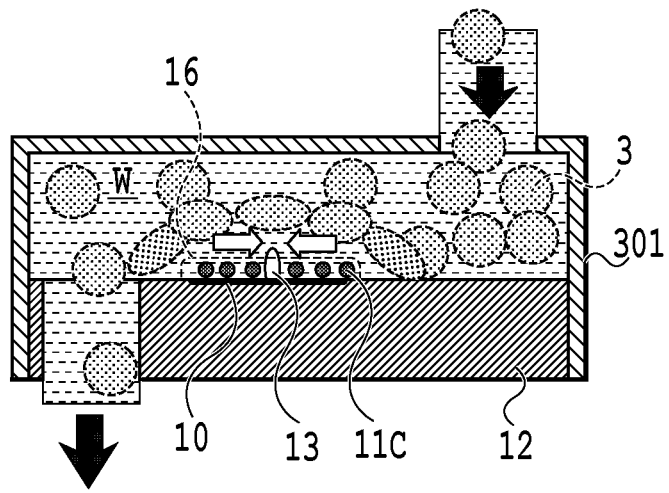

In the shrinking stage of the film boiling bubble 13, there are UFBs generated by the processes illustrated in FIGS. 8A to 8C (second UFBs 11B) and UFBs generated by the processes illustrated in FIGS. 9A to 9C (third UFBs 11C). It is considered that these two processes are made simultaneously.

FIGS. 8A to 8C are diagrams illustrating the states of generation of the UFBs 11 caused by the shrinkage of the film boiling bubble 13. FIG. 8A illustrates the state where the film boiling bubble 13 starts shrinking. Although the film boiling bubble 13 starts shrinking, the surrounding liquid W still has the inertial force in the expansion direction. Because of this, the inertial force acting in the direction of going away from the heating element 10 and the force going toward the heating element 10 caused by the shrinkage of the film boiling bubble 13 act in a surrounding region extremely close to the film boiling bubble 13, and the region is depressurized. The region is indicated in the drawings as a not-yet-bubbling negative pressure region 15.

The gas-dissolved liquid 3 within the not-yet-bubbling negative pressure region 15 exceeds the pressure dissolution limit and is vaporized to become an air bubble. The thus-vaporized air bubbles have diameters of about 100 nm and thereafter float independently in the liquid W without disappearing in a short time. In this embodiment, the air bubbles vaporized by the pressure action during the shrinkage of the film boiling bubble 13 are called the second UFBs 11B.

FIG. 8B illustrates a process of the shrinkage of the film boiling bubble 13. The shrinking speed of the film boiling bubble 13 is accelerated by the negative pressure, and the not-yet-bubbling negative pressure region 15 is also moved along with the shrinkage of the film boiling bubble 13. Specifically, in the process of the shrinkage of the film boiling bubble 13, the gas-dissolved liquids 3 within a part over the not-yet-bubbling negative pressure region 15 are precipitated one after another and become the second UFBs 11B.

FIG. 8C illustrates the state immediately before the disappearance of the film boiling bubble 13. Although the moving speed of the surrounding liquid W is also increased by the accelerated shrinkage of the film boiling bubble 13, a pressure loss occurs due to a flow passage resistance in the chamber 301. As a result, the region occupied by the not-yet-bubbling negative pressure region 15 is further increased, and a number of the second UFBs 11B are generated.

FIGS. 9A to 9C are diagrams illustrating the states of generation of the UFBs by reheating of the liquid W during the shrinkage of the film boiling bubble 13. FIG. 9A illustrates the state where the surface of the heating element 10 is covered with the shrinking film boiling bubble 13.

FIG. 9B illustrates the state where the shrinkage of the film boiling bubble 13 has progressed, and a part of the surface of the heating element 10 comes in contact with the liquid W. In this state, there is heat left on the surface of the heating element 10, but the heat is not high enough to cause the film boiling even if the liquid W comes in contact with the surface. A region of the liquid to be heated by coming in contact with the surface of the heating element 10 is indicated in the drawings as a not-yet-bubbling reheated region 16. Although the film boiling is not made, the gas-dissolved liquid 3 within the not-yet-bubbling reheated region 16 exceeds the thermal dissolution limit and is vaporized. In this embodiment, the air bubbles generated by the reheating of the liquid W during the shrinkage of the film boiling bubble 13 are called the third UFBs 11C.

FIG. 9C illustrates the state where the shrinkage of the film boiling bubble 13 has further progressed. The smaller the film boiling bubble 13, the greater the region of the heating element 10 in contact with the liquid W, and the third UFBs 11C are generated until the film boiling bubble 13 disappears.

Figure 10A:
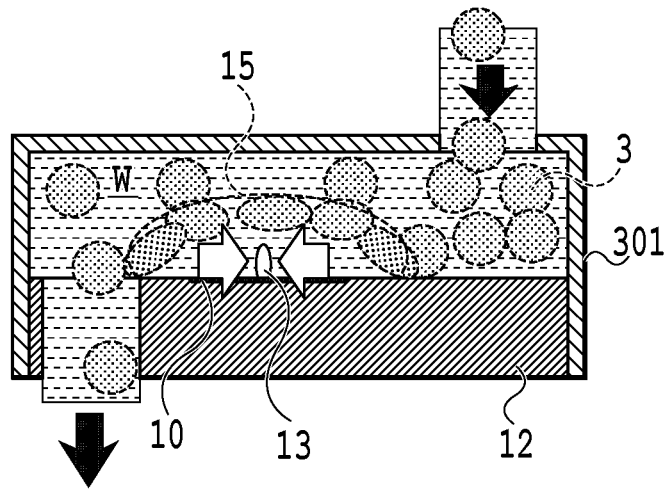
FIGS. 10A and 10B are diagrams illustrating the states of generation of UFBs caused by shock waves made by disappearance of the bubble generated by the film boiling.
Figure 10B:
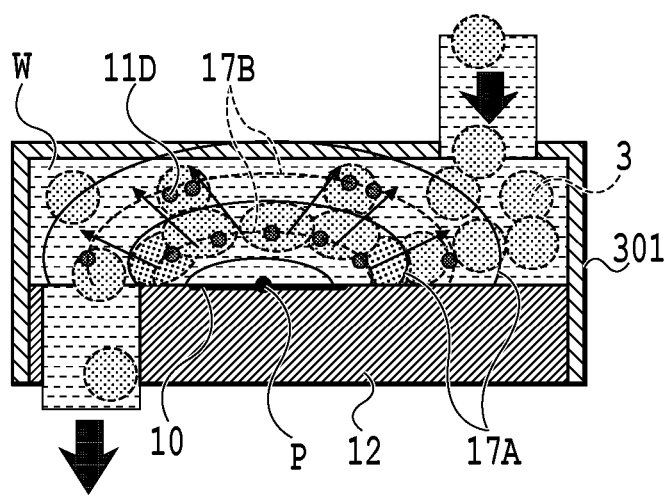

FIGS. 10A and 10B are diagrams illustrating the states of generation of the UFBs caused by an impact from the disappearance of the film boiling bubble 13 generated by the film boiling (that is, a type of cavitation). FIG. 10A illustrates the state immediately before the disappearance of the film boiling bubble 13. In this state, the film boiling bubble 13 shrinks rapidly by the internal negative pressure, and the not-yet-bubbling negative pressure region 15 surrounds the film boiling bubble 13.

FIG. 10B illustrates the state immediately after the film boiling bubble 13 disappears at a point P. When the film boiling bubble 13 disappears, acoustic waves ripple concentrically from the point P as a starting point due to the impact of the disappearance. The acoustic wave is a collective term of an elastic wave that is propagated through anything regardless of gas, liquid, and solid. In this embodiment, compression waves of the liquid W, which are a high pressure surface 17A and a low pressure surface 17B of the liquid W, are propagated alternately.

In this case, the gas-dissolved liquid 3 within the not-yet-bubbling negative pressure region 15 is resonated by the shock waves made by the disappearance of the film boiling bubble 13, and the gas-dissolved liquid 3 exceeds the pressure dissolution limit and the phase transition is made in timing when the low pressure surface 17B passes therethrough. Specifically, a number of air bubbles are vaporized in the not-yet-bubbling negative pressure region 15 simultaneously with the disappearance of the film boiling bubble 13. In this embodiment, the air bubbles generated by the shock waves made by the disappearance of the film boiling bubble 13 are called fourth UFBs 11D.

The fourth UFBs 11D generated by the shock waves made by the disappearance of the film boiling bubble 13 suddenly appear in an extremely short time (1 µS or less) in an extremely narrow thin film-shaped region. The diameter is sufficiently smaller than that of the first to third UFBs, and the gas-liquid interface energy is higher than that of the first to third UFBs. For this reason, it is considered that the fourth UFBs 11D have different characteristics from the first to third UFBs 11A to 11C and generate different effects.

Additionally, the fourth UFBs 11D are evenly generated in many parts of the region of the concentric sphere in which the shock waves are propagated, and the fourth UFBs 11D evenly exist in the chamber 301 from the generation thereof. Although many first to third UFBs already exist in the timing of the generation of the fourth UFBs 11D, the presence of the first to third UFBs does not affect the generation of the fourth UFBs 11D greatly. It is also considered that the first to third UFBs do not disappear due to the generation of the fourth UFBs 11D.

As described above, it is expected that the UFBs 11 are generated in the multiple stages from the generation to the disappearance of the film boiling bubble 13 by the heat generation of the heating element 10. The first UFBs 11A, the second UFBs 11B, and the third UFBs 11C are generated near the surface of the film boiling bubble generated by the film boiling. In this case, near means a region within about 20 µm from the surface of the film boiling bubble. The fourth UFBs 11D are generated in a region through which the shock waves are propagated when the air bubble disappears. Although the above example illustrates the stages to the disappearance of the film boiling bubble 13, the way of generating the UFBs is not limited thereto. For example, with the generated film boiling bubble 13 communicating with the atmospheric air before the bubble disappearance, the UFBs can be generated also if the film boiling bubble 13 does not reach the disappearance.

Next, remaining properties of the UFBs are described. The higher the temperature of the liquid, the lower the dissolution properties of the gas components, and the lower the temperature, the higher the dissolution properties of the gas components. In other words, the phase transition of the dissolved gas components is prompted and the generation of the UFBs becomes easier as the temperature of the liquid is higher. The temperature of the liquid and the solubility of the gas are in the inverse relationship, and the gas exceeding the saturation solubility is transformed into air bubbles and appeared in the liquid as the liquid temperature increases.

Therefore, when the temperature of the liquid rapidly increases from normal temperature, the dissolution properties are decreased without stopping, and the generation of the UFBs starts. The thermal dissolution properties are decreased as the temperature increases, and a number of the UFBs are generated.

Conversely, when the temperature of the liquid decreases from normal temperature, the dissolution properties of the gas are increased, and the generated UFBs are more likely to be liquefied. However, such temperature is sufficiently lower than normal temperature. Additionally, since the once generated UFBs have a high internal pressure and large gas-liquid interface energy even when the temperature of the liquid decreases, it is highly unlikely that there is exerted a sufficiently high pressure to break such a gas-liquid interface. In other words, the once generated UFBs do not disappear easily as long as the liquid is stored at normal temperature and normal pressure.

In this embodiment, the first UFBs 11A described with FIGS. 7A to 7C and the third UFBs 11C described with FIGS. 9A to 9C can be described as UFBs that are generated by utilizing such thermal dissolution properties of gas.

On the other hand, in the relationship between the pressure and the dissolution properties of liquid, the higher the pressure of the liquid, the higher the dissolution properties of the gas, and the lower the pressure, the lower the dissolution properties. In other words, the phase transition to the gas of the gas-dissolved liquid dissolved in the liquid is prompted and the generation of the UFBs becomes easier as the pressure of the liquid is lower. Once the pressure of the liquid becomes lower than normal pressure, the dissolution properties are decreased instantly, and the generation of the UFBs starts. The pressure dissolution properties are decreased as the pressure decreases, and a number of the UFBs are generated.

Conversely, when the pressure of the liquid increases to be higher than normal pressure, the dissolution properties of the gas are increased, and the generated UFBs are more likely to be liquefied. However, such pressure is sufficiently higher than the atmospheric pressure. Additionally, since the once generated UFBs have a high internal pressure and large gas-liquid interface energy even when the pressure of the liquid increases, it is highly unlikely that there is exerted a sufficiently high pressure to break such a gas-liquid interface. In other words, the once generated UFBs do not disappear easily as long as the liquid is stored at normal temperature and normal pressure.

In this embodiment, the second UFBs 11B described with FIGS. 8A to 8C and the fourth UFBs 11D described with FIGS. 10A to 10B can be described as UFBs that are generated by utilizing such pressure dissolution properties of gas.

Those first to fourth UFBs generated by different causes are described individually above; however, the above-described generation causes occur simultaneously with the event of the film boiling. Thus, at least two types of the first to the fourth UFBs may be generated at the same time, and these generation causes may cooperate to generate the UFBs. It should be noted that it is common for all the generation causes to be induced by the volume change of the film boiling bubble generated by the film boiling phenomenon. In this specification, the method of generating the UFBs by utilizing the film boiling caused by the rapid heating as described above is referred to as a thermal-ultrafine bubble (T-UFB) generating method. Additionally, the UFBs generated by the T-UFB generating method are referred to as T-UFBs, and the liquid containing the T-UFBs generated by the T-UFB generating method is referred to as a T-UFB-containing liquid.

Almost all the air bubbles generated by the T-UFB generating method are 1.0 µm or less, and milli-bubbles and microbubbles are unlikely to be generated. That is, the T-UFB generating method allows dominant and efficient generation of the UFBs. Additionally, the T-UFBs generated by the T-UFB generating method have larger gas-liquid interface energy than that of the UFBs generated by a conventional method, and the T-UFBs do not disappear easily as long as being stored at normal temperature and normal pressure. Moreover, even if new T-UFBs are generated by new film boiling, it is possible to prevent disappearance of the already generated T-UFBs due to the impact from the new generation. That is, it can be said that the number and the concentration of the T-UFBs contained in the T-UFB-containing liquid have the hysteresis properties depending on the number of times the film boiling is made in the T-UFB-containing liquid. In other words, it is possible to adjust the concentration of the T-UFBs contained in the T-UFB-containing liquid by controlling the number of the heating elements provided in the T-UFB generating unit 300 and the number of the voltage pulse application to the heating elements.

Reference to FIG. 1 is made again. Once the T-UFB-containing liquid W with a desired UFB concentration is generated in the T-UFB generating unit 300, the UFB-containing liquid W is supplied to the post-processing unit 400.

Figure 11A:
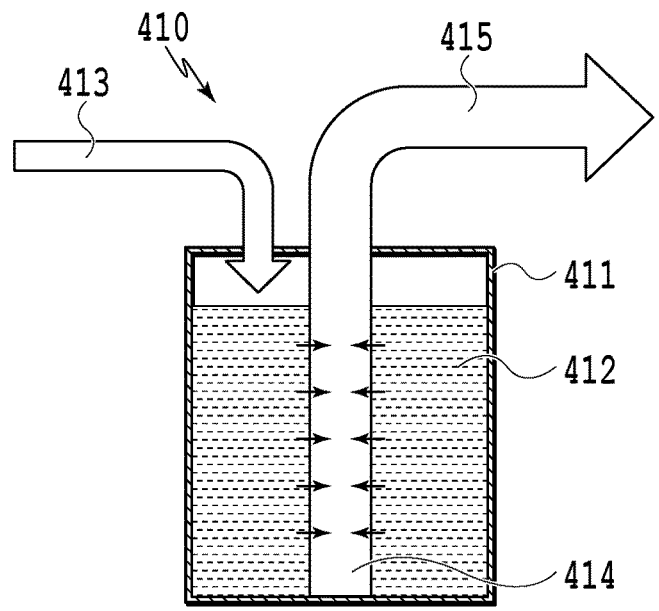
FIGS. 11A to 11C are diagrams illustrating a configuration example of a post-processing unit.
Figure 11B:
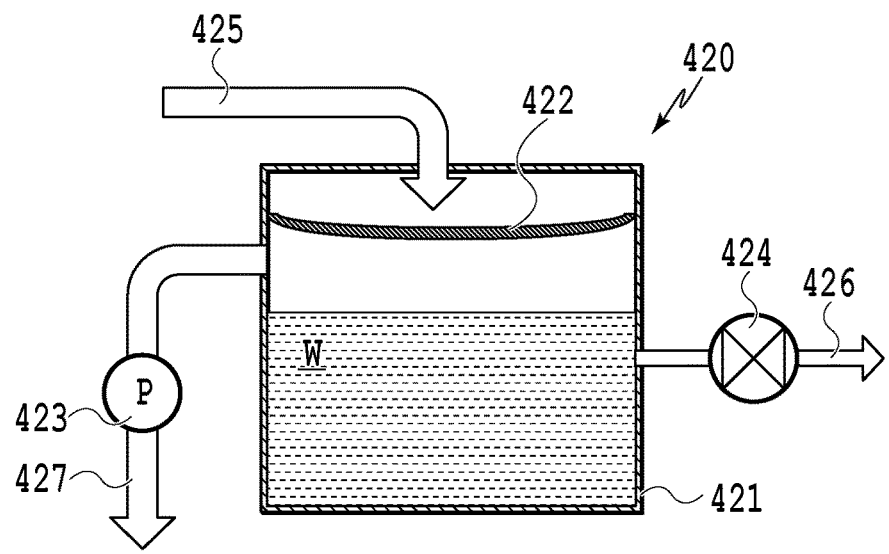
Figure 11C:
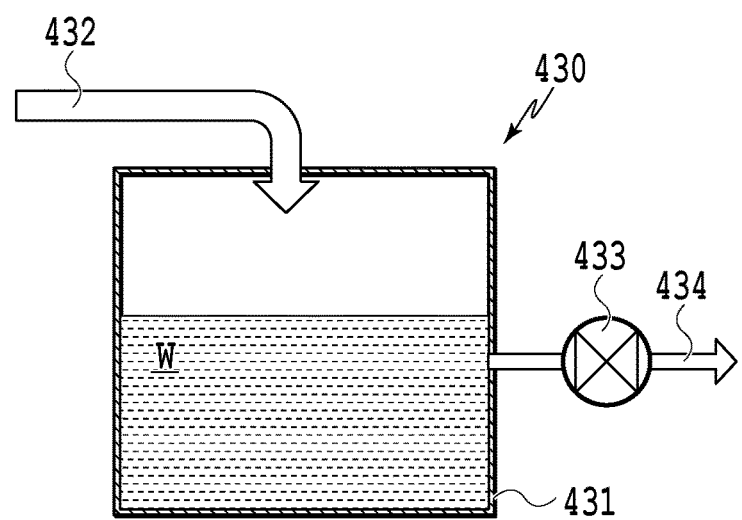

FIGS. 11A to 11C are diagrams illustrating configuration examples of the post-processing unit 400 of this embodiment. The post-processing unit 400 of this embodiment removes impurities in the UFB-containing liquid W in stages in the order from inorganic ions, organic substances, and insoluble solid substances.

FIG. 11A illustrates a first post-processing mechanism 410 that removes the inorganic ions. The first post-processing mechanism 410 includes an exchange container 411, cation exchange resins 412, a liquid introduction passage 413, a collecting pipe 414, and a liquid discharge passage 415. The exchange container 411 stores the cation exchange resins 412. The UFB-containing liquid W generated by the T-UFB generating unit 300 is injected to the exchange container 411 through the liquid introduction passage 413 and absorbed into the cation exchange resins 412 such that the cations as the impurities are removed. Such impurities include metal materials peeled off from the element substrate 12 of the T-UFB generating unit 300, such as $SiO_2$, SiN, SiC, Ta, $Al_2O_3$, $Ta_2O_5$, and Ir.

The cation exchange resins 412 are synthetic resins in which a functional group (ion exchange group) is introduced in a high polymer matrix having a three-dimensional network, and the appearance of the synthetic resins are spherical particles of around 0.4 to 0.7 mm. A general high polymer matrix is the styrene-divinylbenzene copolymer, and the functional group may be that of methacrylic acid series and acrylic acid series, for example. However, the above material is an example. As long as the material can remove desired inorganic ions effectively, the above material can be changed to various materials. The UFB-containing liquid W absorbed in the cation exchange resins 412 to remove the inorganic ions is collected by the collecting pipe 414 and transferred to the next step through the liquid discharge passage 415.

FIG. 11B illustrates a second post-processing mechanism 420 that removes the organic substances. The second post-processing mechanism 420 includes a storage container 421, a filtration filter 422, a vacuum pump 423, a valve 424, a liquid introduction passage 425, a liquid discharge passage 426, and an air suction passage 427. Inside of the storage container 421 is divided into upper and lower two regions by the filtration filter 422. The liquid introduction passage 425 is connected to the upper region of the upper and lower two regions, and the air suction passage 427 and the liquid discharge passage 426 are connected to the lower region thereof. Once the vacuum pump 423 is driven with the valve 424 closed, the air in the storage container 421 is discharged through the air suction passage 427 to make the pressure inside the storage container 421 negative pressure, and the UFB-containing liquid W is thereafter introduced from the liquid introduction passage 425. Then, the UFB-containing liquid W from which the impurities are removed by the filtration filter 422 is reserved into the storage container 421.

The impurities removed by the filtration filter 422 include organic materials that may be mixed at a tube or each unit, such as organic compounds including silicon, siloxane, and epoxy, for example. A filter film usable for the filtration filter 422 includes a filter of a sub-μm-mesh (a filter of 1 μm or smaller in mesh diameter) that can remove bacteria, and a filter of a nm-mesh that can remove virus.

After a certain amount of the UFB-containing liquid W is reserved in the storage container 421, the vacuum pump 423 is stopped and the valve 424 is opened to transfer the T-UFB-containing liquid in the storage container 421 to the next step through the liquid discharge passage 426. Although the vacuum filtration method is employed as the method of removing the organic impurities herein, a gravity filtration method and a pressurized filtration can also be employed as the filtration method using a filter, for example.

FIG. 11C illustrates a third post-processing mechanism 430 that removes the insoluble solid substances. The third post-processing mechanism 430 includes a precipitation container 431, a liquid introduction passage 432, a valve 433, and a liquid discharge passage 434.

First, a predetermined amount of the UFB-containing liquid W is reserved into the precipitation container 431 through the liquid introduction passage 432 with the valve 433 closed, and leaving it for a while. Meanwhile, the solid substances in the UFB-containing liquid W are precipitated onto the bottom of the precipitation container 431 by gravity. Among the bubbles in the UFB-containing liquid, relatively large bubbles such as microbubbles are raised to the liquid surface by the buoyancy and also removed from the UFB-containing liquid. After a lapse of sufficient time, the valve 433 is opened, and the UFB-containing liquid W from which the solid substances and large bubbles are removed is transferred to the collecting unit 500 through the liquid discharge passage 434. The example of applying the three post-processing mechanisms in sequence is shown in this embodiment; however, it is not limited thereto, and the order of the three post-processing mechanisms may be changed, or at least one needed post-processing mechanism may be employed.

Reference to FIG. 1 is made again. The T-UFB-containing liquid W from which the impurities are removed by the post-processing unit 400 may be directly transferred to the collecting unit 500 or may be put back to the dissolving unit 200 again. In the latter case, the gas dissolution concentration of the T-UFB-containing liquid W that is decreased due to the generation of the T-UFBs can be compensated to the saturated state again by the dissolving unit 200. If new T-UFBs are generated by the T-UFB generating unit 300 after the compensation, it is possible to further increase the concentration of the UFBs contained in the T-UFB-containing liquid with the above-described properties. That is, it is possible to increase the concentration of the contained UFBs by the number of circulations through the dissolving unit 200, the T-UFB generating unit 300, and the post-processing unit 400, and it is possible to transfer the UFB-containing liquid W to the collecting unit 500 after a predetermined concentration of the contained UFBs is obtained.

The collecting unit 500 collects and preserves the UFB-containing liquid W transferred from the post-processing unit 400. The T-UFB-containing liquid collected by the collecting unit 500 is a UFB-containing liquid with high purity from which various impurities are removed.

In the collecting unit 500, the UFB-containing liquid W may be classified by the size of the T-UFBs by performing some stages of filtration processing. Since it is expected that the temperature of the T-UFB-containing liquid W obtained by the T-UFB method is higher than normal temperature, the collecting unit 500 may be provided with a cooling unit. The cooling unit may be provided to a part of the post-processing unit 400.

The schematic description of the UFB generating apparatus 1 is given above; however, it is needless to say that the illustrated multiple units can be changed, and not all of them need to be prepared. Depending on the type of the liquid W and the gas G to be used and the intended use of the T-UFB-containing liquid to be generated, a part of the above-described units may be omitted, or another unit other than the above-described units may be added.

For example, when the gas to be contained by the UFBs is the atmospheric air, the degassing unit as the pre-processing unit 100 and the dissolving unit 200 can be omitted. On the other hand, when multiple kinds of gases are desired to be contained by the UFBs, another dissolving unit 200 may be added.

The units for removing the impurities as described in FIGS. 11A to 11C may be provided upstream of the T-UFB generating unit 300 or may be provided both upstream and downstream thereof. When the liquid to be supplied to the UFB generating apparatus is tap water, rain water, contaminated water, or the like, there may be included organic and inorganic impurities in the liquid. If such a liquid W including the impurities is supplied to the T-UFB generating unit 300, there is a risk of deteriorating the heating element 10 and inducing the salting-out phenomenon. With the mechanisms as illustrated in FIGS. 11A to 11C provided upstream of the T-UFB generating unit 300, it is possible to remove the above-described impurities previously.

«Liquid and Gas Usable For T-UFB-Containing Liquid»

Now, the liquid W usable for generating the T-UFB-containing liquid is described. The liquid W usable in this embodiment is, for example, pure water, ion exchange water, distilled water, bioactive water, magnetic active water, lotion, tap water, sea water, river water, clean and sewage water, lake water, underground water, rain water, and so on. A mixed liquid containing the above liquid and the like is also usable. A mixed solvent containing water and soluble organic solvent can be also used. The soluble organic solvent to be used by being mixed with water is not particularly limited; however, the followings can be a specific example thereof. An alkyl alcohol group of the carbon number of 1 to 4 including methyl alcohol, ethyl alcohol, n-propyl alcohol, isopropyl alcohol, n-butyl alcohol, sec-butyl alcohol, and tert-butyl alcohol. An amide group including N-methyl-2-pyrrolidone, 2-pyrrolidone, 1,3-dimethyl-2-imidazolidinone, N,N-dimethylformamide, and N,N-dimethylacetamide. A keton group or a ketoalcohol group including acetone and diacetone alcohol. A cyclic ether group including tetrahydrofuran and dioxane. A glycol group including ethylene glycol, 1,2-propylene glycol, 1,3-propylene glycol, 1,2-butanediol, 1,3-butanediol, 1,4-butanediol, 1,5-pentanediol, 1,2-hexanediol, 1,6-hexanediol, 3-methyl-1,5-pentanediol, diethylene glycol, triethylene glycol, and thiodiglycol. A group of lower alkyl ether of polyhydric alcohol including ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether. A polyalkylene glycol group including polyethylene glycol and polypropylene glycol. A triol group including glycerin, 1,2,6-hexanetriol, and trimethylolpropane. These soluble organic solvents can be used individually, or two or more of them can be used together.

A gas component that can be introduced into the dissolving unit 200 is, for example, hydrogen, helium, oxygen, nitrogen, methane, fluorine, neon, carbon dioxide, ozone, argon, chlorine, ethane, propane, air, and so on. The gas component may be a mixed gas containing some of the above. Additionally, it is not necessary for the dissolving unit 200 to dissolve a substance in a gas state, and the dissolving unit 200 may fuse a liquid or a solid containing desired components into the liquid W. The dissolution in this case may be spontaneous dissolution, dissolution caused by pressure application, or dissolution caused by hydration, ionization, and chemical reaction due to electrolytic dissociation.

«Effects of T-UFB Generating Method»

Next, the characteristics and the effects of the above-described T-UFB generating method are described by comparing with a conventional UFB generating method. For example, in a conventional air bubble generating apparatus as represented by the Venturi method, a mechanical depressurizing structure such as a depressurizing nozzle is provided in a part of a flow passage. A liquid flows at a predetermined pressure to pass through the depressurizing structure, and air bubbles of various sizes are generated in a downstream region of the depressurizing structure.

In this case, among the generated air bubbles, since the relatively large bubbles such as milli-bubbles and microbubbles are affected by the buoyancy, such bubbles rise to the liquid surface and disappear. Even the UFBs that are not affected by the buoyancy may also disappear with the milli-bubbles and microbubbles since the gas-liquid interface energy of the UFBs is not very large. Additionally, even if the above-described depressurizing structures are arranged in series, and the same liquid flows through the depressurizing structures repeatedly, it is impossible to store for a long time the UFBs of the number corresponding to the number of repetitions. In other words, it has been difficult for the UFB-containing liquid generated by the conventional UFB generating method to maintain the concentration of the contained UFBs at a predetermined value for a long time.

In contrast, in the T-UFB generating method of this embodiment utilizing the film boiling, a rapid temperature change from normal temperature to about 300° C. and a rapid pressure change from normal pressure to around a several megapascal occur locally in a part extremely close to the heating element. The heating element is a rectangular shape having one side of around several tens to hundreds of μm. It is around $\frac{1}{10}$ to $\frac{1}{1000}$ of the size of a conventional UFB generating unit. Additionally, with the gas-dissolved liquid within the extremely thin film region of the film boiling bubble surface exceeding the thermal dissolution limit or the pressure dissolution limit instantaneously (in an extremely short time under microseconds), the phase transition occurs and the gas-dissolved liquid is precipitated as the UFBs. In this case, the relatively large bubbles such as milli-bubbles and microbubbles are hardly generated, and the liquid contains the UFBs of about 100 nm in diameter with extremely high purity. Moreover, since the T-UFBs generated in this way have sufficiently large gas-liquid interface energy, the T-UFBs are not broken easily under the normal environment and can be stored for a long time.

Particularly, the present invention using the film boiling phenomenon that enables local formation of a gas interface in the liquid can form an interface in a part of the liquid close to the heating element without affecting the entire liquid region, and a region on which the thermal and pressure actions performed can be extremely local. As a result, it is possible to stably generate desired UFBs. With further more conditions for generating the UFBs applied to the generation liquid through the liquid circulation, it is possible to additionally generate new UFBs with small effects on the already-made UFBs. As a result, it is possible to produce a UFB liquid of a desired size and concentration relatively easily.

Moreover, since the T-UFB generating method has the above-described hysteresis properties, it is possible to increase the concentration to a desired concentration while keeping the high purity. In other words, according to the T-UFB generating method, it is possible to efficiently generate a long-time storable UFB-containing liquid with high purity and high concentration.

«Specific Usage of T-UFB-Containing Liquid»

In general, applications of the ultrafine bubble-containing liquids are distinguished by the type of the containing gas. Any type of gas can make the UFBs as long as an amount of around PPM to BPM of the gas can be dissolved in the liquid. For example, the ultrafine bubble-containing liquids can be applied to the following applications.

- A UFB-containing liquid containing air can be preferably applied to cleansing in the industrial, agricultural and fishery, and medical scenes and the like, and to cultivation of plants and agricultural and fishery products.
- A UFB-containing liquid containing ozone can be preferably applied to not only cleansing application in the industrial, agricultural and fishery, and medical scenes and the like, but to also applications intended to disinfection, sterilization, and decontamination, and environmental cleanup of drainage and contaminated soil, for example.
- A UFB-containing liquid containing nitrogen can be preferably applied to not only cleansing application in the industrial, agricultural and fishery, and medical scenes and the like, but to also applications intended to disinfection, sterilization, and decontamination, and environmental cleanup of drainage and contaminated soil, for example.
- A UFB-containing liquid containing oxygen can be preferably applied to cleansing application in the industrial, agricultural and fishery, and medical scenes and the like, and to cultivation of plants and agricultural and fishery products.
- A UFB-containing liquid containing carbon dioxide can be preferably applied to not only cleansing application in the industrial, agricultural and fishery, and medical scenes and the like, but to also applications intended to disinfection, sterilization, and decontamination, for example.
- A UFB-containing liquid containing perfluorocarbons as a medical gas can be preferably applied to ultrasonic diagnosis and treatment. As described above, the UFB-containing liquids can exert the effects in various fields of medical, chemical, dental, food, industrial, agricultural and fishery, and so on.

In each of the applications, the purity and the concentration of the UFBs contained in the UFB-containing liquid are important for quickly and reliably exert the effect of the UFB-containing liquid. In other words, unprecedented effects can be expected in various fields by utilizing the T-UFB generating method of this embodiment that enables generation of the UFB-containing liquid with high purity and desired concentration. Here is below a list of the applications in which the T-UFB generating method and the T-UFB-containing liquid are expected to be preferably applicable.

(A) Liquid Purification Application

- With the T-UFB generating unit provided to a water clarification unit, enhancement of an effect of water clarification and an effect of purification of PH adjustment liquid is expected. The T-UFB generating unit may also be provided to a carbonated water server.
- With the T-UFB generating unit provided to a humidifier, aroma diffuser, coffee maker, and the like, enhancement of a humidifying effect, a deodorant effect, and a scent spreading effect in a room is expected.
- If the UFB-containing liquid in which an ozone gas is dissolved by the dissolving unit is generated and is used for dental treatment, burn treatment, and wound treatment using an endoscope, enhancement of a medical cleansing effect and an antiseptic effect is expected.
- With the T-UFB generating unit provided to a water storage tank of a condominium, enhancement of a water clarification effect and chlorine removing effect of drinking water to be stored for a long time is expected.
- If the T-UFB-containing liquid containing ozone or carbon dioxide is used for brewing process of Japanese sake, shochu, wine, and so on in which the high-temperature pasteurization processing cannot be performed, more efficient pasteurization processing than that with the conventional liquid is expected.
- If the UFB-containing liquid is mixed into the ingredient in a production process of the foods for specified health use and the foods with functional claims, the pasteurization processing is possible, and thus it is possible to provide safe and functional foods without a loss of flavor.
- With the T-UFB generating unit provided to a supplying route of sea water and fresh water for cultivation in a cultivation place of fishery products such as fish and pearl, prompting of spawning and growing of the fishery products is expected.
- With the T-UFB generating unit provided in a purification process of water for food preservation, enhancement of the preservation state of the food is expected.
- With the T-UFB generating unit provided in a bleaching unit for bleaching pool water or underground water, a higher bleaching effect is expected.
- With the T-UFB-containing liquid used for repairing a crack of a concrete member, enhancement of the effect of crack repairment is expected.
- With the T-UFBs contained in liquid fuel for a machine using liquid fuel (such as automobile, vessel, and airplane), enhancement of energy efficiency of the fuel is expected.

(B) Cleansing Application

Recently, the UFB-containing liquids have been receiving attention as cleansing water for removing soils and the like attached to clothing. If the T-UFB generating unit described in the above embodiment is provided to a washing machine, and the UFB-containing liquid with higher purity and better permeability than the conventional liquid is supplied to the washing tub, further enhancement of detergency is expected.

With the T-UFB generating unit provided to a bath shower and a bedpan washer, not only a cleansing effect on all kinds of animals including human body but also an effect of prompting contamination removal of a water stain and a mold on a bathroom and a bedpan are expected.

With the T-UFB generating unit provided to a window washer for automobiles, a high-pressure washer for cleansing wall members and the like, a car washer, a dishwasher, a food washer, and the like, further enhancement of the cleansing effects thereof is expected.

With the T-UFB-containing liquid used for cleansing and maintenance of parts produced in a factory including a burring step after pressing, enhancement of the cleansing effect is expected.

In production of semiconductor elements, if the T-UFB-containing liquid is used as polishing water for a wafer, enhancement of the polishing effect is expected. Additionally, if the T-UFB-containing liquid is used in a resist removal step, prompting of peeling of resist that is not peeled off easily is enhanced.

With the T-UFB generating unit is provided to machines for cleansing and decontaminating medical machines such as a medical robot, a dental treatment unit, an organ preservation container, and the like, enhancement of the cleansing effect and the decontamination effect of the machines is expected. The T-UFB generating unit is also applicable to treatment of animals.

(C) Pharmaceutical Application

If the T-UFB-containing liquid is contained in cosmetics and the like, permeation into subcutaneous cells is prompted, and additives that give bad effects to skin such as preservative and surfactant can be reduced greatly. As a result, it is possible to provide safer and more functional cosmetics.

If a high concentration nanobubble preparation containing the T-UFBs is used for contrasts for medical examination apparatuses such as a CT and an MM, reflected light of X-rays and ultrasonic waves can be efficiently used. This makes it possible to capture a more detailed image that is usable for initial diagnosis of a cancer and the like.

If a high concentration nanobubble water containing the T-UFBs is used for a ultrasonic wave treatment machine called high-intensity focused ultrasound (HIFU), the irradiation power of ultrasonic waves can be reduced, and thus the treatment can be made more non-invasive. Particularly, it is possible to reduce the damage to normal tissues.

It is possible to create a nanobubble preparation by using high concentration nanobubbles containing the T-UFBs as a source, modifying a phospholipid forming a liposome in a negative electric charge region around the air bubble, and applying various medical substances (such as DNA and RNA) through the phospholipid.

If a drug containing high concentration nanobubble water made by the T-UFB generation is transferred into a dental canal for regenerative treatment of pulp and dentine, the drug enters deeply a dentinal tubule by the permeation effect of the nanobubble water, and the decontamination effect is prompted. This makes it possible to treat the infected root canal of the pulp safely in a short time.

Embodiments of the present invention will be specifically described below.

First Embodiment

Figure 12:
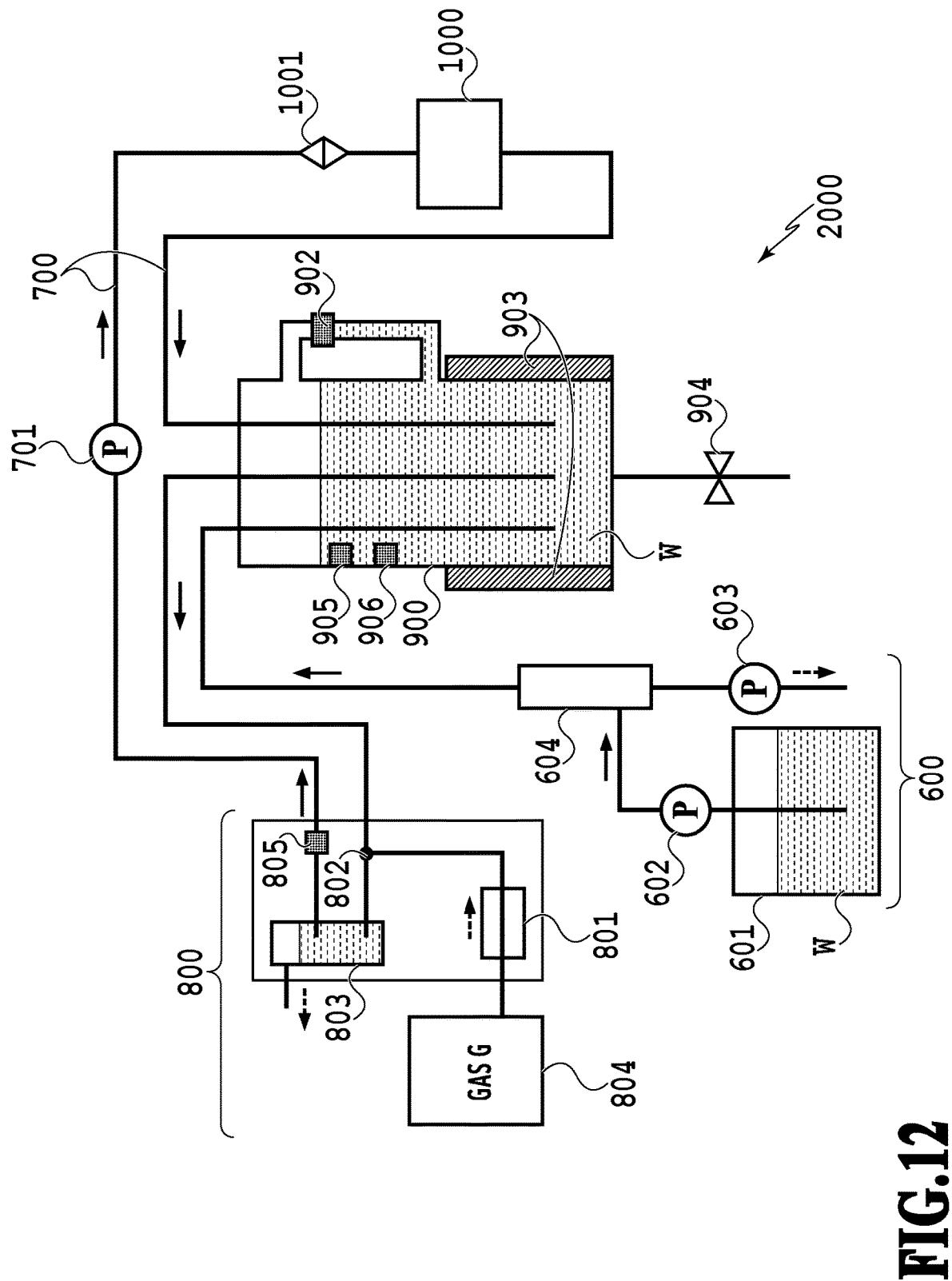
FIG. 12 is a schematic configuration diagram of a UFB-containing liquid producing apparatus in a first embodiment.

FIG. 12 is a schematic configuration diagram of an ultrafine bubble-containing liquid producing apparatus 2000 in a first embodiment (hereinafter referred to as the UFB-containing liquid producing apparatus 2000). The UFB-containing liquid producing apparatus 2000 in the present embodiment mainly includes a liquid supplying unit 600, a gas dissolving unit 800, a first storing chamber 900, and an ultrafine bubble generating unit 1000 (hereinafter referred to as the UFB generating unit 1000). The liquid supplying unit 600, the gas dissolving unit 800, and the UFB generating unit 1000 correspond to the pre-processing unit 100, the dissolving unit 200, and the T-UFB generating unit 300 in FIG. 1, respectively. These units are connected to each other by a pipe 700, and a liquid W is circulated by a pump 701 disposed at an intermediate portion of the pipe 700. In FIG. 12, each solid arrow represents a liquid flow, and each dotted arrow represents a gas flow.

The liquid supplying unit 600 mainly includes a liquid reservoir unit 601, two pumps 602 and 603, and a degassing unit 604. A liquid W reserved in the liquid reservoir unit 601 is transferred to the first storing chamber 900 by the pumps 602 and 603 via the degassing unit 604. Inside the degassing unit 604 is disposed a film through which gases can pass and liquids cannot pass. With pressures from the pumps 602 and 603, only gases pass through the film, so that the gases and the liquid are separated from each other. The liquid W is moved toward the first storing chamber 900 whereas the gases are discharged to the outside. Various gases may be dissolved in the liquid reserved in the liquid reservoir unit 601. By removing the dissolved gases at the degassing unit 604 before transferring the liquid to the first storing chamber 900, the efficiency of dissolution in a gas dissolving step to be subsequently performed can be enhanced.

The gas dissolving unit 800 includes a gas supplying unit 804, a pre-processing unit 801, a merging part 802, and a gas-liquid separating chamber 803. While the gas supplying unit 804 may be a gas cylinder storing a desired gas G, the gas supplying unit 804 may be an apparatus capable of continuously generating the desired gas G. For example, in a case where the desired gas G is oxygen, it is possible to employ an apparatus that takes in the atmospheric air, removes nitrogen, and feeds the gas from which nitrogen has been removed with a pump.

The gas G supplied by the gas supplying unit 804 is subjected to a process such as electrical discharging at the pre-processing unit 801. Then, at the merging part 802, the gas G merges with the liquid W having flowed out from the first storing chamber 900. Here, part of the gas G is dissolved into the liquid W. The gas G and the liquid W having thus merged are separated from each other again at the gas-liquid separating chamber 803, and only the part of the gas G that has not been dissolved into the liquid W is discharged to the outside. The liquid W with the gas G dissolved therein is then transferred to the UFB generating unit 1000 by the pump 701. Note that a dissolution degree sensor 805 that detects the degree of dissolution of the gas G in the liquid W is provided downstream of the gas-liquid separating chamber 803.

The UFB generating unit 1000 generates UFBs in the liquid W caused to flow into the UFB generating unit 1000. Various methods such as the Venturi method can be employed as the method of generating UFBs. In the present embodiment, the T-UFB method described using FIGS. 4 to 10 is employed. A filter 1001 is disposed upstream of the UFB generating unit 1000 and prevents impurities, dust, and the like from entering the UFB generating unit 1000. Removing impurities, dust, and the like can improve the UFB generation efficiency at the UFB generating unit 1000. The UFB-containing liquid W generated by the UFB generating unit 1000 is stored into the first storing chamber 900 through the pipe 700.

The first storing chamber 900 stores a mixed liquid of the liquid W supplied from the liquid supplying unit 600, the liquid W in which the desired gas G has been dissolved by the gas dissolving unit 800, and the UFB-containing liquid in which T-UFBs have been generated by the UFB generating unit 1000.

A temperature sensor 905 detects the temperature of the liquid stored in the first storing chamber 900. A liquid level sensor 902 is disposed at a predetermined height in the first storing chamber 900 and detects the surface of the liquid W. A UFB concentration sensor 906 detects the UFB concentration of the liquid W stored in the first storing chamber 900. A valve 904 is opened in a case of discharging the liquid W stored in the first storing chamber 900 to a container on the outside. Note that, though not illustrated in FIG. 12, the first storing chamber 900 may be provided with an agitator therein for making the temperature of and the UFB distribution in the liquid W uniform.

A cooling unit 903 cools the liquid W stored in the first storing chamber 900. It is preferable that the temperature of the liquid W to be supplied to the gas dissolving unit 800 be as low as possible in order to efficiently dissolve the desired gas G at the gas dissolving unit 800. Also, keeping the liquid W to be circulated at low temperature suppresses rise in the temperature of the UFB generating unit 1000, which generates UFBs by utilizing film boiling. This can lengthen the life of the UFB generating unit 1000. In the present embodiment, the temperature of the liquid W to be supplied to the gas dissolving unit 800 is adjusted at 20° C. or lower by using the cooling unit 903 while the temperature of the liquid is detected with the temperature sensor 905.

The configuration of the cooling unit 903 is not particularly limited. For example, it is possible to employ a type which uses a Peltier device or a type which circulates a liquid cooled by a chiller. In the case of the latter, a cooling tube through which a cooling liquid is circulated may be wound around the outer periphery of the first storing chamber 900 as in FIG. 12, or the first storing chamber 900 may be formed to have a hollow structure with a cooling tube disposed in the hollow space. Alternatively, the configuration may be such that a cooling tube is immersed in the liquid W inside the first storing chamber 900.

In the present embodiment, the above configuration forms a circulation route for a liquid W that starts from the first storing chamber 900, passes through the gas dissolving unit 800 and the UFB generating unit 1000, and returns to the first storing chamber 900.

In FIG. 12, the pump 701, which urges a liquid W to be circulated through the entire circulation route, is disposed between the gas dissolving unit 800 and the UFB generating unit 1000. However, the position and the number of pumps are not limited to this case. For example, a pump may be disposed between the UFB generating unit 1000 and the first storing chamber 900, or a pump may be disposed between the gas dissolving unit 800 and the UFB generating unit 1000 and also between the UFB generating unit 1000 and the first storing chamber 900. Further, in each unit's configuration, a pump and a valve that may be necessary in the unit's operation may be provided. A pump whose pulsation and flow rate variation are small is preferably used to avoid impairing the UFB generation efficiency.

Also, the collection route and the valve 904 for collecting a liquid W may be provided not at the first storing chamber 900 but at another position in the liquid circulation route. Further, in a case where the temperature of the UFB generating unit 1000 rises intensely, the UFB generating unit 1000 may also be provided with a cooling unit similar to that of the first storing chamber 900.

The dissolution degree sensor 805, the temperature sensor 905, and the UFB concentration sensor 906 do not necessarily have to be provided at the positions illustrated in FIG. 12. These sensors may be provided at other positions as long as they are within the circulation route. Alternatively, the configuration may be such that each sensor is provided at a plurality of positions in the circulation route and an average value can be outputted.

Members that contact the UFB-containing liquid, such as the liquid contacting portions of the pipe 700, the pump 701, the filter 1001, the first storing chamber 900, and the UFB generating unit 1000, are preferably made of a material with high corrosion resistance. For example, a fluorine-based resin such as polytetrafluoroethylene (PTFE) or perfluoroalkoxy alkane (PFA), a metal such as SUS316L, or another inorganic material can be preferably used. In this way, it is possible to generate UFBs in a suitable manner even in a case of using a highly corrosive gas G and liquid W.

Figure 13:
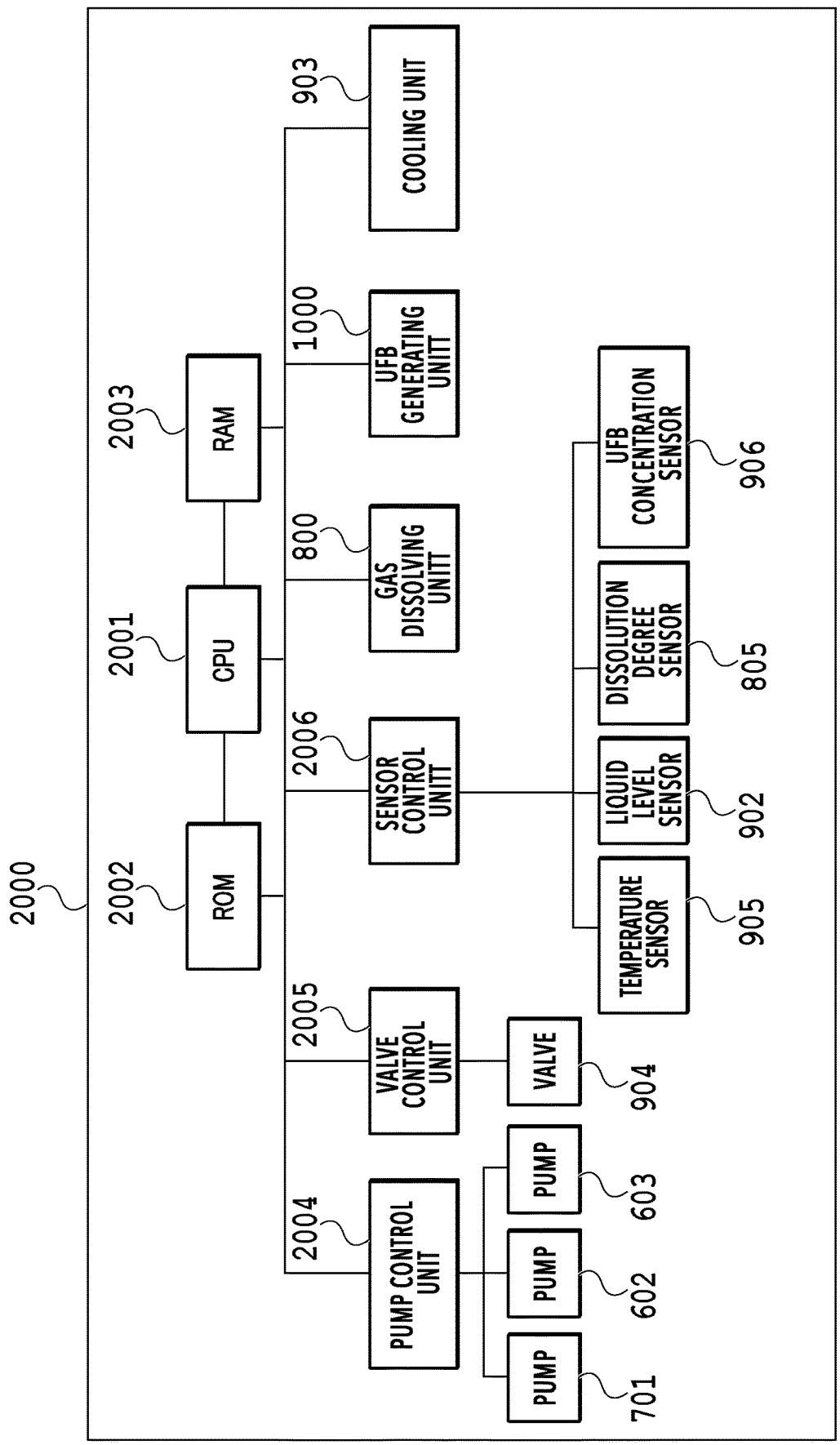
FIG. 13 is a block diagram illustrating a control configuration in the UFB-containing liquid producing apparatus.

FIG. 13 is a block diagram for describing a control configuration in the UFB-containing liquid producing apparatus 2000 in the present embodiment. A CPU 2001 controls the entire apparatus while using a RAM 2003 as a work area in accordance with a program stored in a ROM 2002.

Under the instruction of the CPU 2001, a pump control unit 2004 controls the driving of various pumps provided in the circulation route illustrated in FIG. 12, including the pumps 602, 603, and 701. Under the instruction of the CPU 2001, a valve control unit 2005 controls the opening and closing of various valves including the valve 904. Under the instruction of the CPU 2001, a sensor control unit 2006 controls various sensors including the dissolution degree sensor 805, the liquid level sensor 902, the temperature sensor 905, and the UFB concentration sensor 906 and provides the detection values of the various sensors to the CPU 2001.

For example, in a case where the UFB-containing liquid producing apparatus 2000 starts operating, the CPU 2001 drives the pumps 602 and 603 until the liquid level sensor 902 detects a liquid surface to reserve a predetermined amount of a liquid in the first storing chamber 900. Also, in a case where the UFB concentration detected by the UFB concentration sensor 906 reaches a predetermined value, the CPU 2001 causes the pump control unit 2004 to stop operating the pump 701, and causes the valve control unit 2005 to open the valve 904, thereby discharging the liquid W stored in the first storing chamber 900.

Figure 14:
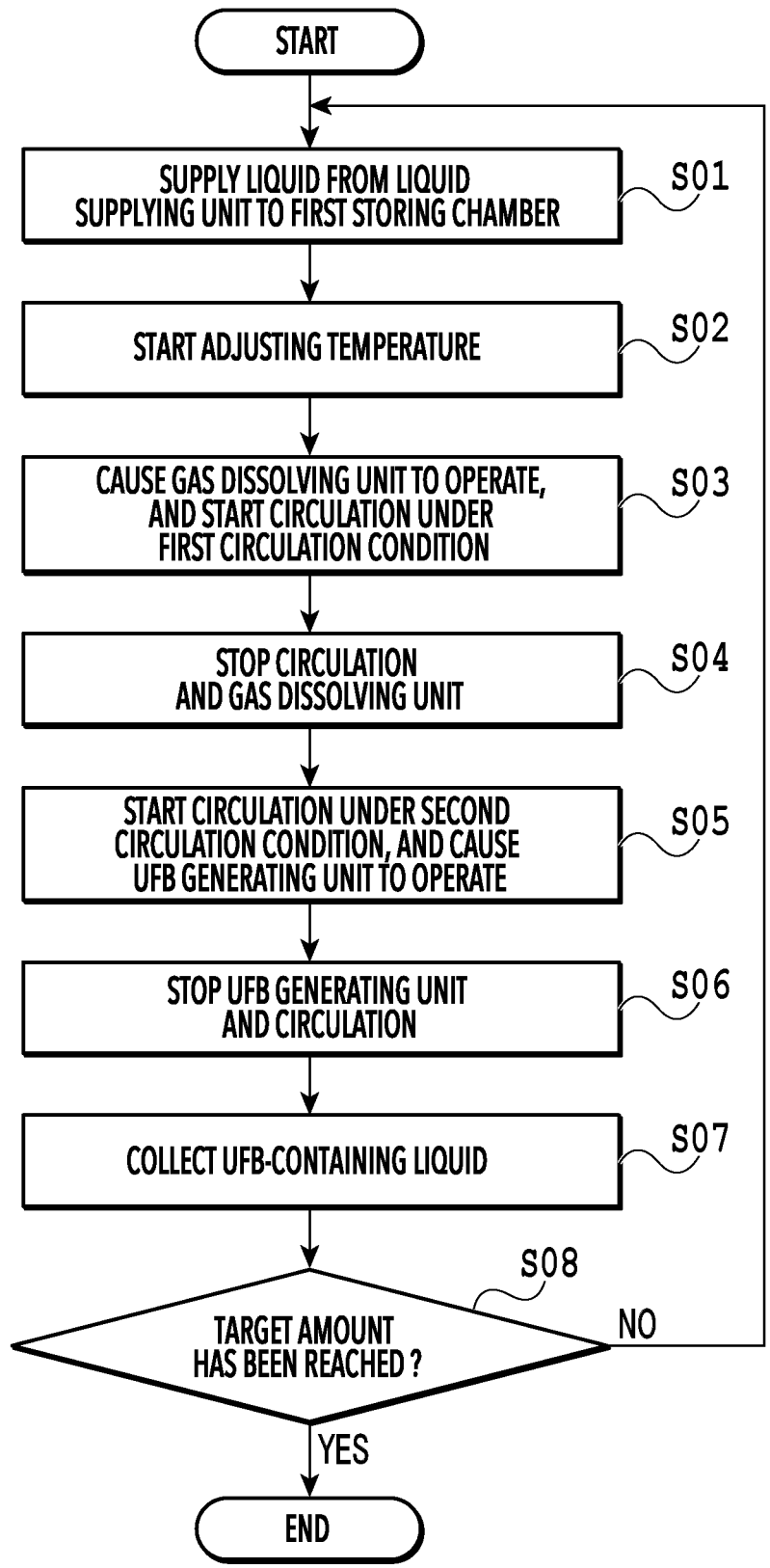
FIG. 14 is a flowchart describing UFB-containing liquid producing steps in the first embodiment.

FIG. 14 is a flowchart for describing steps executed by the CPU 2001 in a case of producing a desired UFB-containing liquid in the UFB-containing liquid producing apparatus 2000. Upon start of this process, the CPU 2001 firstly reserves a predetermined amount of a liquid in the first storing chamber 900 (S01).

Specifically, the CPU 2001 causes the pumps 602 and 603 to operate while monitoring the detection by the liquid level sensor 902. Thus, a liquid W reserved in the liquid supplying unit 600 is degassed at the degassing unit 604 and transferred to the first storing chamber 900. Then, in a case where the liquid level sensor 902 detects a liquid surface, the CPU 2001 causes the pumps 602 and 603 to stop operating. As a result, a predetermined amount of a liquid W is reserved in the first storing chamber 900.

The CPU 2001 then starts adjusting the temperature of the liquid W stored in the first storing chamber 900 (S02). Specifically, the CPU 2001 causes the cooling unit 903 to operate while monitoring the temperature detected by the temperature sensor 905. The CPU 2001 proceeds to S03 if the temperature detected by the temperature sensor 905 reaches 20° C. or lower.

In S03, the CPU 2001 causes the gas dissolving unit 800 to operate, and drives the pump 701 under a first circulation condition to circulate the liquid W while monitoring the detection by the dissolution degree sensor 805. In the present embodiment, the first circulation condition is a circulation condition suitable for dissolving the gas G into the liquid W. In the present embodiment, this first circulation condition is set such that the flow rate and flow pressure of the liquid in the circulation route are 300 to 3000 mL/min and 0.2 to 0.6 MPa, respectively. Specifically, in S03, the CPU 2001 causes the pump control unit 2004 to drive the pump 701 so as to maintain such a flow rate and flow pressure.

In a case where, for example, the UFB generating unit has a configuration based on the Venturi method, i.e., a liquid is passed through a particular flow passage structure to generate UFBs, the generation of UFBs cannot be stopped without stopping the liquid flow, and bubbles of unintended sizes may be generated. In the present embodiment, however, the T-UFB method is employed. Thus, UFBs are not generated at the UFB generating unit 1000 without a voltage applied to its heating elements (heaters). Thus, by causing the UFB generating unit 1000 not to operate in S03, UFBs are not generated, and in this state the circulated liquid W can efficiently raise only the degree of dissolution of the gas G therein under the first circulation condition.

In a case where the dissolution degree sensor 805 detects a predetermined degree of dissolution, the CPU 2001 causes the gas dissolving unit 800 and the pump 701 to stop operating (S04). As a result, the circulation of the liquid W stops. In this state, a liquid W in which the desired gas G is dissolved at a desired degree of dissolution is reserved in the first storing chamber 900.

In S05, the CPU 2001 drives the pump 701 under a second circulation condition to circulate the liquid W. In the present embodiment, the second circulation condition is a circulation condition suitable for the UFB generating unit 1000 to generate UFBs. In the present embodiment, this second circulation condition is set such that the flow rate and flow pressure of the liquid in the circulation route are 10 to 300 mL/min and 0.1 to 0.3 MPa, respectively. Specifically, in S05, the CPU 2001 causes the pump control unit 2004 to drive the pump 701 so as to maintain such a flow rate and flow pressure.

Further, the CPU 2001 causes the UFB generating unit 1000 to operate while monitoring the detection by the UFB concentration sensor 906. In doing so, the CPU 2001 causes the gas dissolving unit 800 not to operate. In other words, the UFB concentration in the circulated liquid W is efficiently raised under the second circulation condition.

In a case where the UFB concentration sensor 906 detects a predetermined UFB concentration, the CPU 2001 causes the UFB generating unit 1000 and the pump 701 to stop operating (S06). As a result, the circulation of the liquid W stops. In this state, a UFB-containing liquid W containing UFBs of the desired gas G at a desired concentration is reserved in the first storing chamber 900.

In S07, the CPU 2001 opens the valve 904 to discharge the UFB-containing liquid W stored in the first storing chamber 900 to a collection container on the outside. In doing so, the CPU 2001 may discharge the entirety of the liquid W stored in the first storing chamber 900 or discharge only part of the liquid W.

In S08, the CPU 2001 determines whether the liquid W collected in the collection container has reached a target amount. If the target amount has not been reached, the CPU 2001 returns to S01 and repeats steps S01 to S07. On the other hand, if it is determined in S08 that the target amount has been reached, this process is terminated.

In the present embodiment described above, the step of dissolving the desired gas G and the step of generating UFBs are steps which are independent of each other and in which a liquid is circulated under a circulation condition suitable for the step. Specifically, in the step of dissolving the desired gas G, the liquid is circulated at a relatively high flow rate and pressure in order to prompt dissolution of the gas at the merging part 802. On the other hand, in the step of generating UFBs, which employs the T-UFB method utilizing film boiling, the liquid is circulated under a condition suitable for causing film boiling, i.e., a flow rate and pressure (about the atmospheric pressure) lower than those in the first circulation condition. In this way, a liquid containing UFBs of the desired gas G can be generated more efficiently than conventional methods.

Note that the specific numerical values of the flow rates and pressures in the first and second circulation conditions described above can be variously changed according to the type of the gas G and the liquid W. For example, the flow rate and pressure in the first circulation condition and the flow rate and pressure in the second circulation condition may be varied according to the combination of the type of the gas G and the type of the liquid W. In this case, a table may be stored in the ROM in advance in which, for each of the first circulation condition and the second circulation condition, driving parameters of the pump 701 corresponding to combinations of a gas G and a liquid W are associated with the circulation condition. In this way, the CPU 2001 can set driving parameters suitable for the first circulation condition and the second circulation condition based on the combination of the gas G and the liquid W to be used.

The first and second circulation conditions may contain a parameter other than flow rate and pressure, e.g., temperature or the like. In this case, the CPU 2001 sets the adjusted temperature of the liquid W differently in S03 and in S05.

For example, the temperature in the second circulation condition may be set lower than that in the first circulation condition. Depending on the length of the pipe from the first storing chamber 900 to the UFB generating unit 1000, the temperature may slightly rise. Consequently, part of the gas G dissolved in the liquid W may be precipitated as bubbles, which may lower the UFB generation efficiency. The higher the solubility of a gas, the larger the amount of bubbles generated by a temperature rise. It is possible to prevent a trouble as above from occurring and stably generate UFBs by making the liquid temperature lower during the UFB generation than during the gas dissolution such that the liquid temperature does not rise to 20° C. or higher while the liquid W is supplied to the UFB generating unit 1000 from the first storing chamber 900.

Second Embodiment

Figure 15:
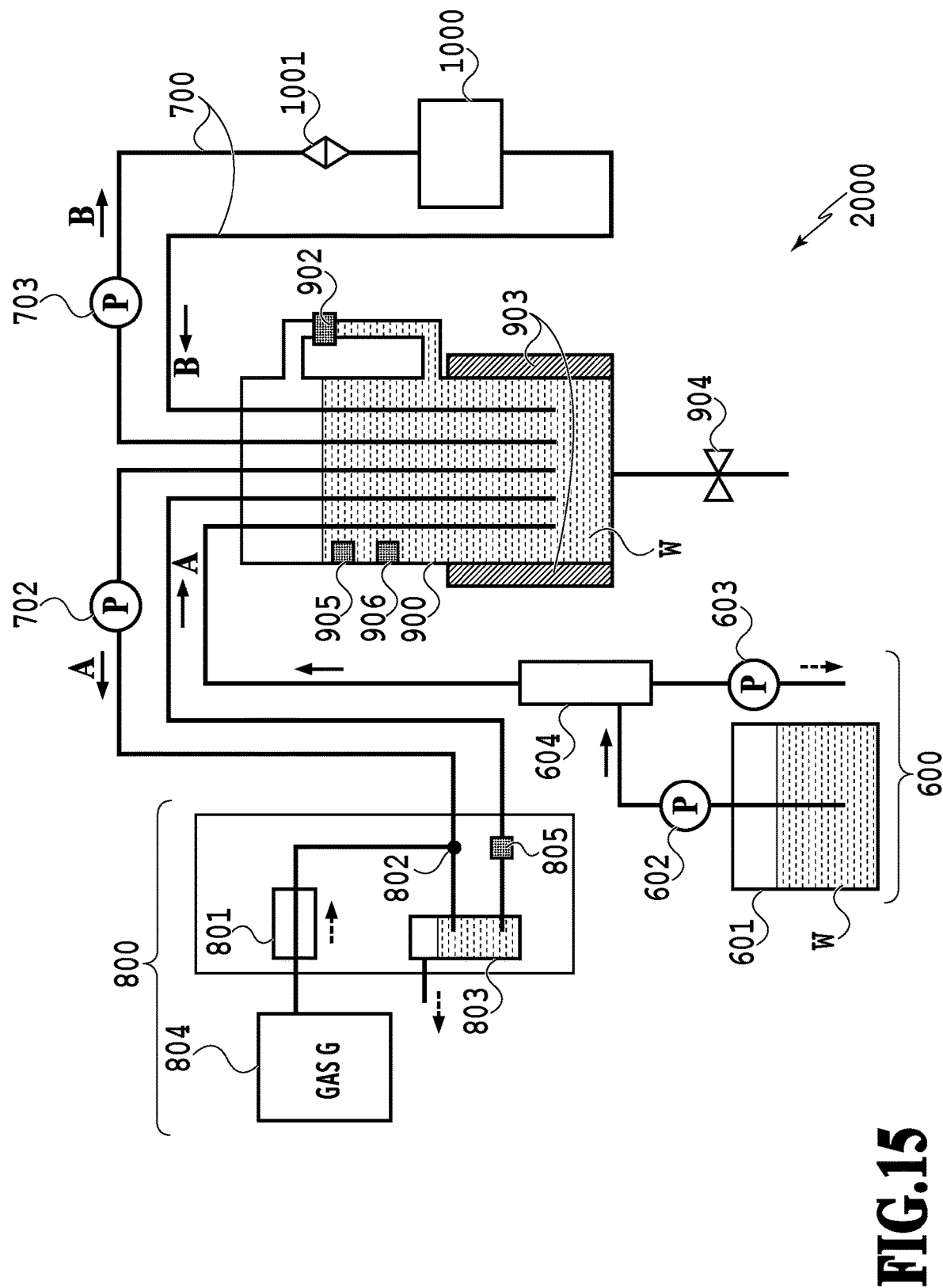
FIG. 15 is a schematic configuration diagram of a UFB-containing liquid producing apparatus in a second embodiment.

FIG. 15 is a schematic configuration diagram of a UFB-containing liquid producing apparatus 2000 in a second embodiment. The UFB-containing liquid producing apparatus 2000 in the present embodiment differs from that in the first embodiment illustrated in FIG. 12 in that two circulation routes are prepared for the first storing chamber 900. A circulation route A indicated by arrow A in FIG. 15 is a circulation route starting from the first storing chamber 900, passing through the gas dissolving unit 800, and returning to the first storing chamber 900, and uses a first pump 702 as a driving source. A circulation route B indicated by arrow B is a circulation route starting from the first storing chamber 900, passing through the UFB generating unit 1000, and returning to the first storing chamber 900, and uses a second pump 703 as a driving source.

By preparing two circulation routes as above, the UFB-containing liquid producing apparatus 2000 in the present embodiment can execute a step of dissolving the desired gas G and a step of generating UFBs in independent circulation routes in which circulation conditions suitable for the respective steps are set.

Figure 16:
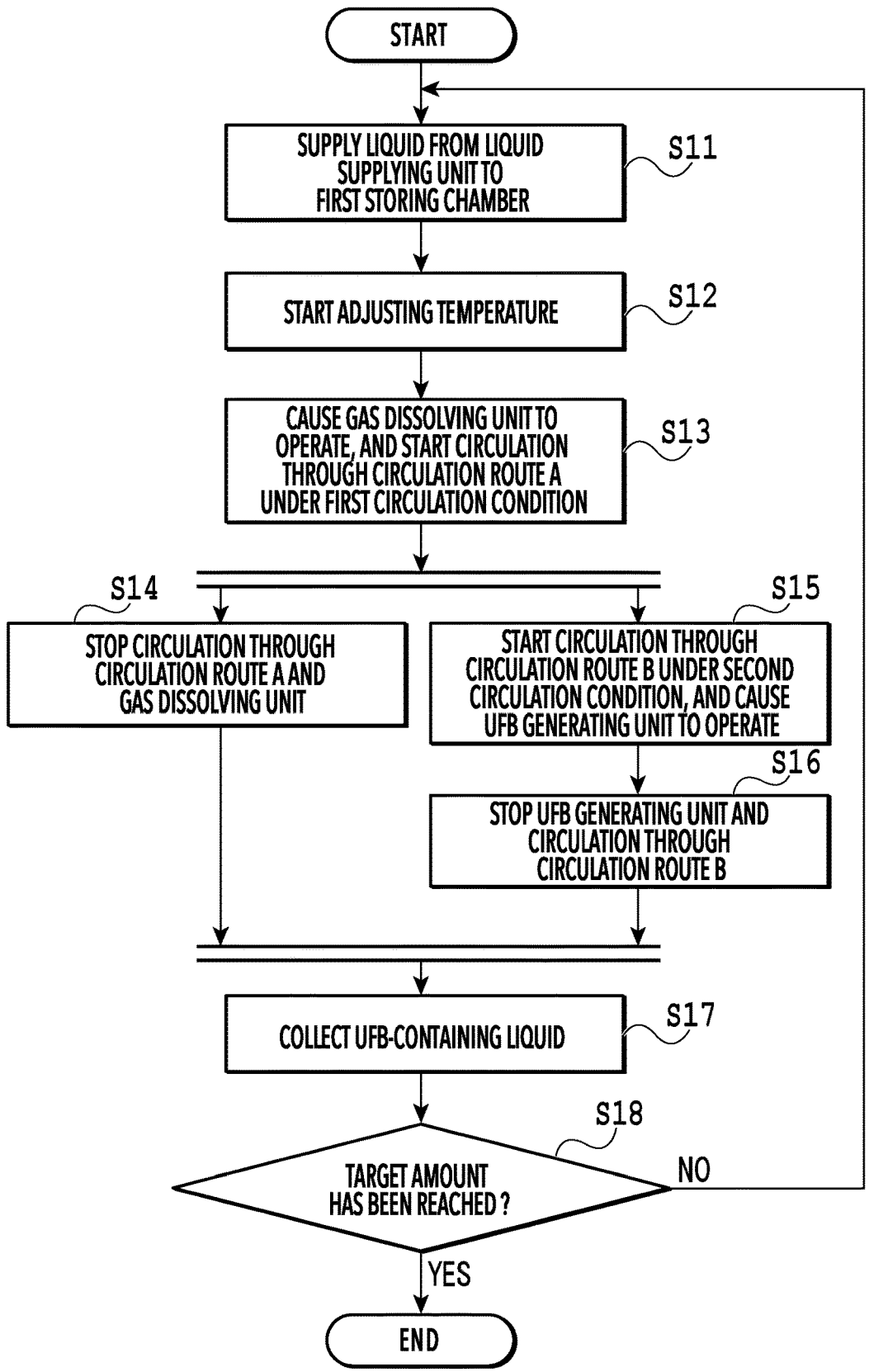
FIG. 16 is a flowchart describing UFB-containing liquid producing steps in the second embodiment.

FIG. 16 is a flowchart for describing steps executed by a CPU 2001 in a case of producing a desired UFB-containing liquid in the UFB-containing liquid producing apparatus 2000 in the present embodiment. The UFB-containing liquid producing apparatus 2000 in the present embodiment also has a control configuration similar to that in the first embodiment illustrated in the block diagram of FIG. 13.

In FIGS. 16, S11 and S12 are similar to S01 and S02 described in FIG. 14, and description thereof is therefore omitted here.

In S13, the CPU 2001 causes the gas dissolving unit 800 to operate, and drives the first pump 702 under a first circulation condition to start circulating a liquid W through the circulation route A. The content of the first circulation condition is similar to that in the first embodiment. Then, this circulation through the circulation route A is continued until the dissolution degree sensor 805 detects a predetermined degree of dissolution. In a case where the dissolution degree sensor 805 detects the predetermined degree of dissolution, the CPU 2001 causes the gas dissolving unit 800 and the first pump 702 to stop operating (S14).

The CPU 2001 also starts circulation through the circulation route B (S15). Specifically, the CPU 2001 drives the second pump 703 under the second circulation condition and also causes the UFB generating unit 1000 to operate. The content of the second circulation condition is also similar to that in the first embodiment. Then, this circulation through the circulation route B is continued until the UFB concentration sensor 906 detects a predetermined UFB concentration. In a case where the UFB concentration sensor 906 detects the predetermined UFB concentration, the CPU 2001 causes the UFB generating unit 1000 and the second pump 703 to stop operating (S16).

After the circulation through the circulation route A and the circulation through the circulation route B are both stopped, the CPU 2001 proceeds to S17, in which the CPU 2001 opens the valve 904 to discharge the liquid W stored in the first storing chamber 900 to the collection container on the outside. The subsequent step is similar to that in the flowchart described in FIG. 14, and description thereof is therefore omitted.

Figure 17:
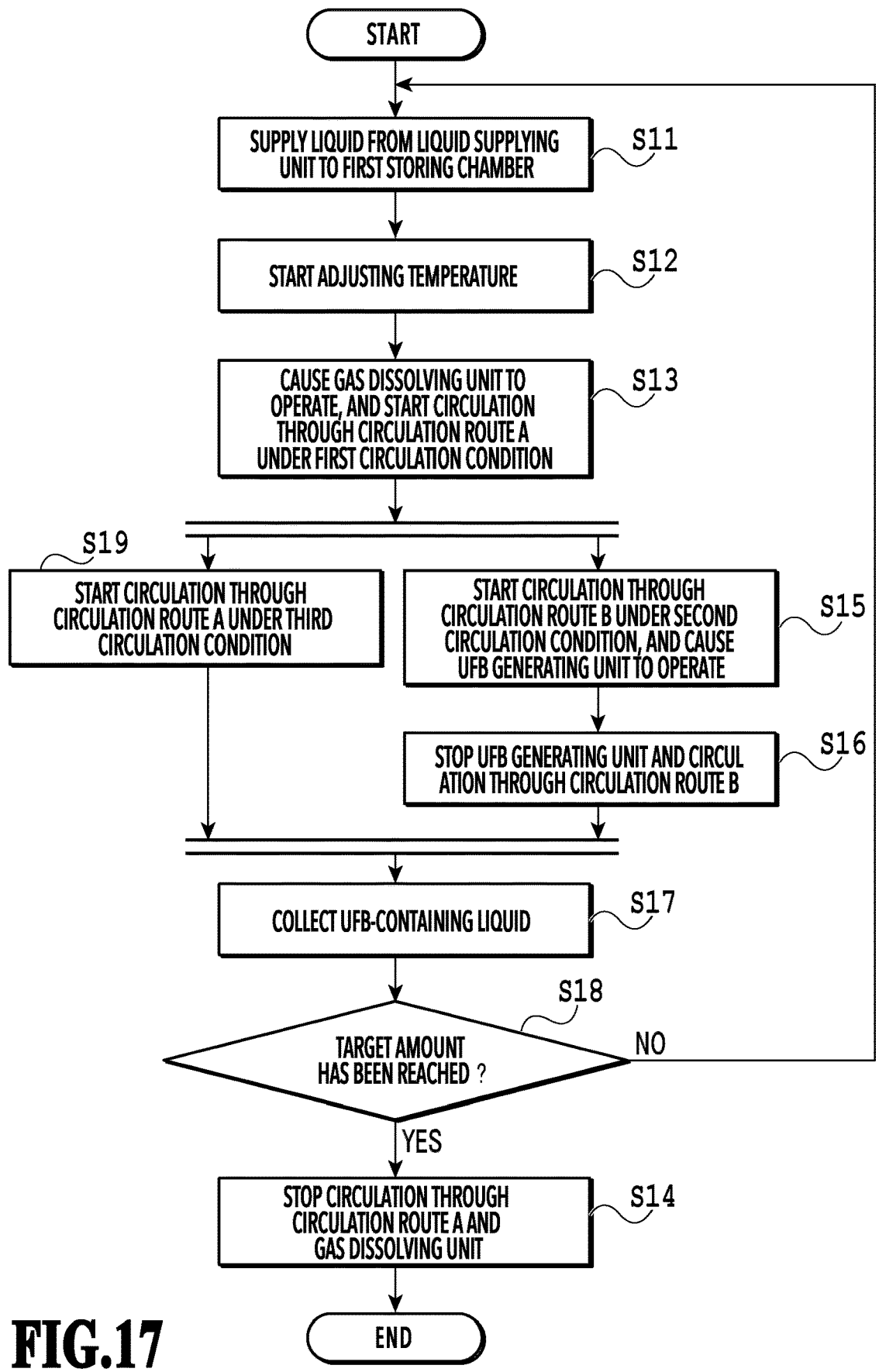
FIG. 17 is a flowchart describing a modification of the second embodiment.

FIG. 17 is a flowchart for describing a modification of the second embodiment. The flowchart of FIG. 17 differs from the flowchart of FIG. 16 in that S19 is provided for the circulation route A and S14 is moved to the end of the flow. In this example, in a case where the dissolution degree sensor 805 detects a predetermined degree of dissolution, the CPU 2001 switches the circulation condition in the circulation route A from the first circulation condition to a third circulation condition while maintaining the operation of the gas dissolving unit 800 (S19).

In this modification, the third circulation condition is a condition for recovering the degree of dissolution of the gas in the liquid that has decreased as a result of generating UFBs. While the third circulation condition may be the same condition as the first circulation condition, a flow rate and pressure lower than those in the first circulation condition may be used in order to prevent the generated UFBs from being broken. Alternatively, the third circulation condition may be such that the flow rate and pressure are the same as those in the first circulation condition but the circulation under the first circulation condition is performed and stopped repetitively and periodically. Either way, according to this modification, the degree of dissolution of the gas in the liquid W can be maintained at a preferred value regardless of the concentration of contained UFBs. This can further improve the UFB generation efficiency.

According to the second embodiment described above using FIGS. 15 to 17, the circulation route A and the circulation route B are both shorter than the circulation route illustrated in the first embodiment. Thus, the respective steps can be completed in a shorter time period than those in the first embodiment. In addition, the step of dissolving the gas G in the circulation route A and the step of generating UFBs in the circulation route B can be performed in individual routes under circulation conditions suitable for the individual steps. Accordingly, a desired UFB-containing liquid can be produced more efficiently.

Furthermore, according to the present embodiment, the route through which the liquid flows at a higher flow rate and pressure (circulation route A) is shorter than that in the first embodiment. Thus, the UFB-containing liquid producing apparatus itself can be made less costly and smaller in size and its maintenance is also expected to be easier.

Third Embodiment

Figure 18:
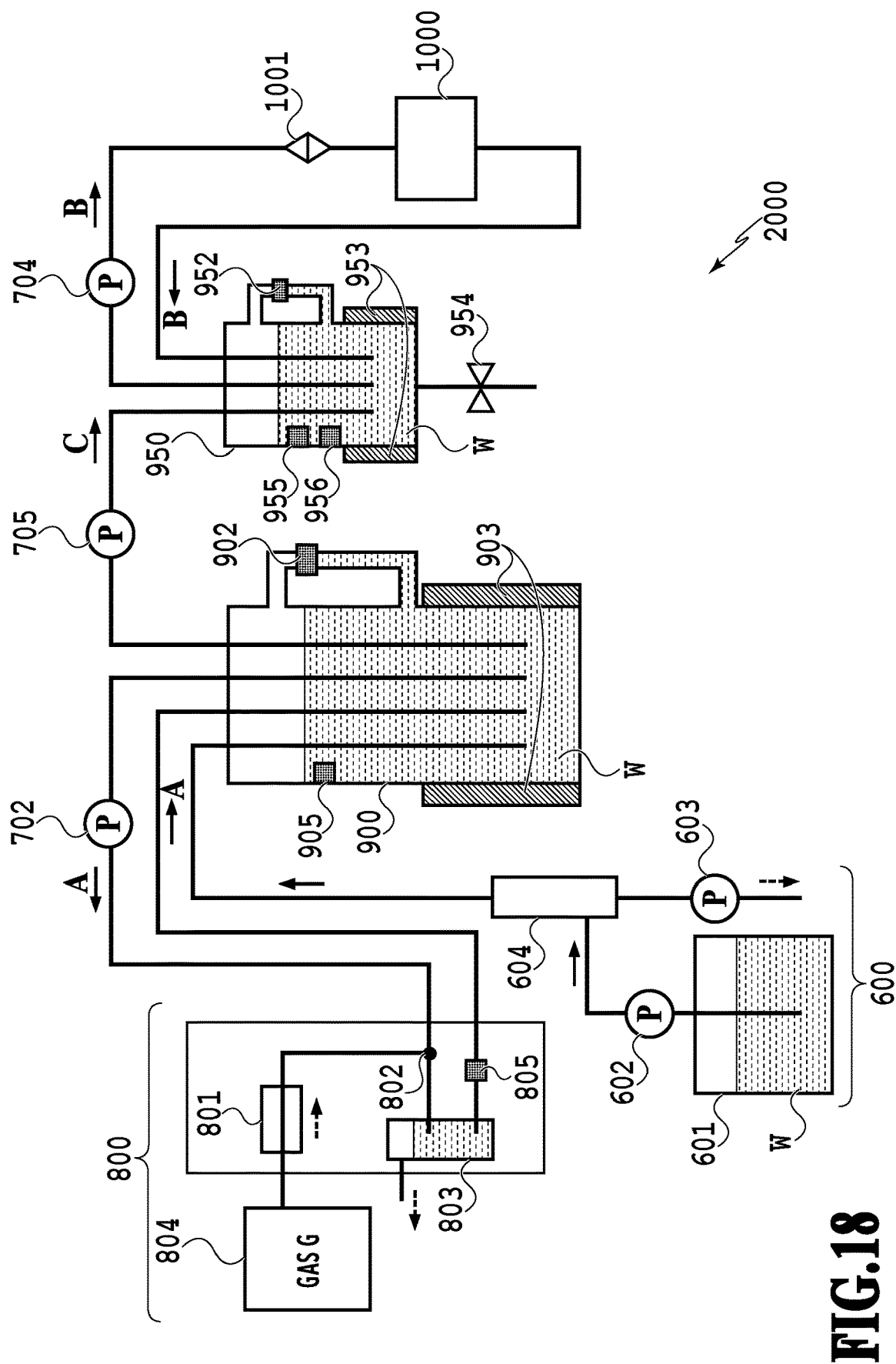
FIG. 18 is a schematic configuration diagram of a UFB-containing liquid producing apparatus in a third embodiment.

FIG. 18 is a schematic configuration diagram of a UFB-containing liquid producing apparatus 2000 in a third embodiment. The UFB-containing liquid producing apparatus 2000 in the present embodiment differs from that in the second embodiment illustrated in FIG. 15 in that a second storing chamber 950 is added.

The second storing chamber 950 is smaller than the first storing chamber 900 and has a capacity of about ¹⁄₁₀₀ to ⅕ of the first storing chamber 900. Like the first storing chamber 900, the second storing chamber 950 is preferably made of a material with high corrosion resistance as well. For example, a fluorine-based resin such as PTFE or PFA, a metal such as SUS316L, or another inorganic material can be preferably used. The second storing chamber 950 has substantially the same configuration as that of the first storing chamber 900, and includes a temperature sensor 955, a liquid level sensor 952, and a cooling unit 953. In the present embodiment, however, only the second storing chamber 950, not the first storing chamber 900, is provided with a UFB concentration sensor 956 for detecting the concentration of contained UFBs and a pipe and a valve 954 for discharging a UFB-containing liquid to a container on the outside. Meanwhile, it is preferable that a pipe between the first storing chamber 900 and the second storing chamber 950 be as short as possible, in order to prevent the temperature of a liquid W from rising while the liquid is supplied to the second storing chamber 950 from the first storing chamber 900.

A circulation route A indicated by arrow A in FIG. 18 is a circulation route starting from the first storing chamber 900, passing through the gas dissolving unit 800, and returning to the first storing chamber 900, and uses the first pump 702 as a driving source. A circulation route B indicated by arrow B in FIG. 18 is a circulation route starting from the second storing chamber 950, passing through the UFB generating unit 1000, and returning to the second storing chamber 950, and uses a third pump 704 as a driving source. Further, the route indicated by arrow C in FIG. 18 is a route for transferring a liquid W from the first storing chamber 900 to the second storing chamber 950, and uses a fourth pump 705 as a driving source.

In this UFB-containing liquid producing apparatus 2000 in the present embodiment, the circulation route A for dissolving the desired gas G and the circulation route B for generating UFBs do not merge with each other and are independent of each other. Thus, even in a case where liquids are caused to flow through these two circulation routes simultaneously, the circulation conditions, such as flow rate and pressure, in the circulation routes do not affect each other, and a condition suitable for each circulation route can be maintained with high accuracy. For example, the flow rate and pressure in the first circulation condition may be higher than the flow rates and pressures in the first and second embodiments in order to further raise the efficiency of dissolution of the gas into the liquid W. Also, the circulation condition may include the temperature of the liquid in each circulation route in addition to the flow rate and pressure, and the adjusted temperature may be set differently for the circulation route A and the circulation route B. Specifically, a temperature suitable for dissolving the desired gas G may be set in a first circulation condition, and a temperature lower than or equal to this temperature may be set in a second circulation condition.

Figure 19:
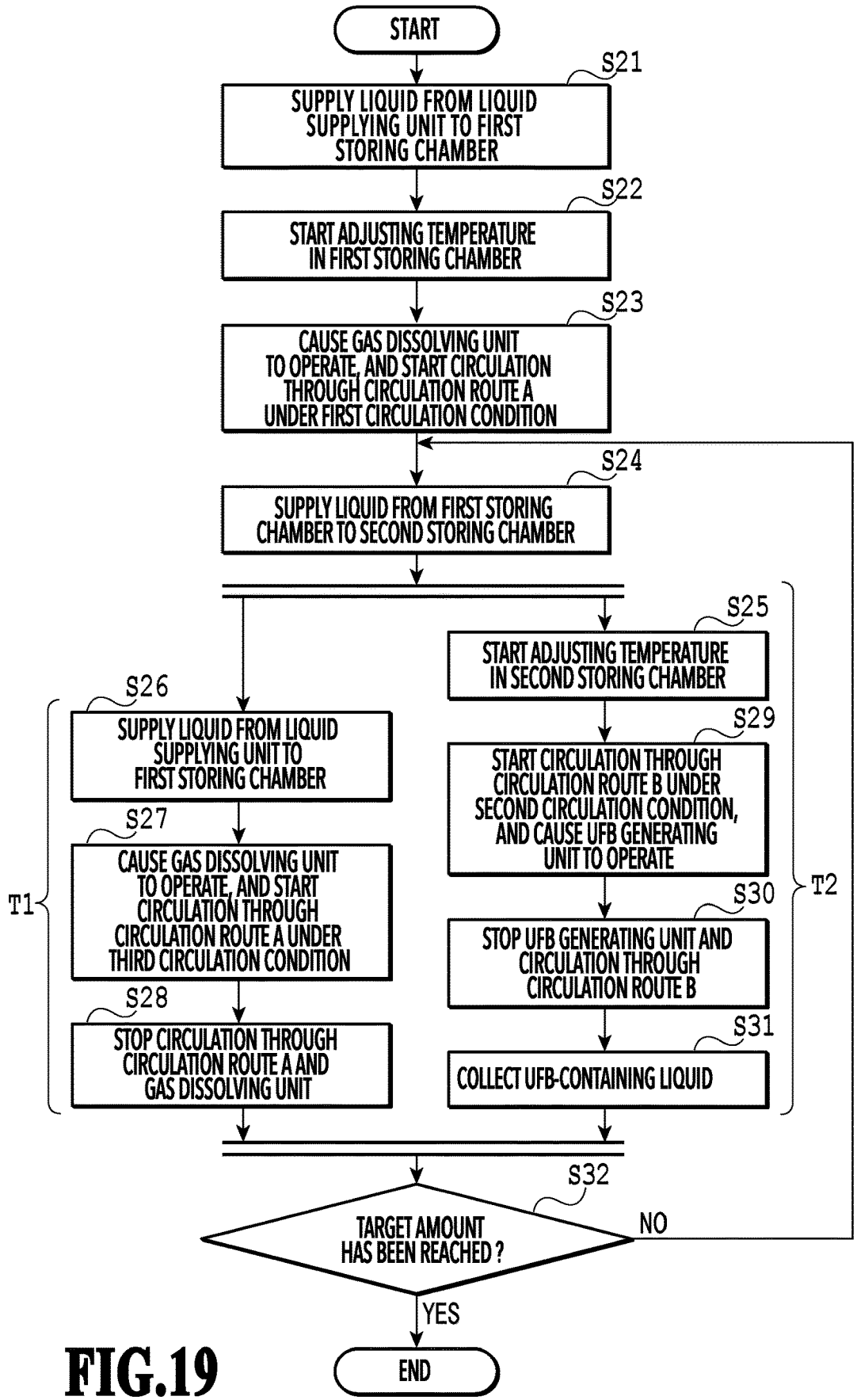
FIG. 19 is a flowchart describing UFB-containing liquid producing steps in the third embodiment.

FIG. 19 is a flowchart for describing steps executed by a CPU 2001 in a case of producing a desired UFB-containing liquid in the UFB-containing liquid producing apparatus 2000 in the present embodiment. The UFB-containing liquid producing apparatus 2000 in the present embodiment also has a control configuration similar to that in the first embodiment illustrated in the block diagram of FIG. 13.

In FIGS. 19, S21 and S22 are similar to S01 and S02 described in FIG. 14, and description thereof is therefore omitted here.

In S23, the CPU 2001 causes the gas dissolving unit 800 to operate, and drives the first pump 702 under the first circulation condition to start circulation through the circulation route A. In doing so, the CPU 2001 causes the third pump 704 and the fourth pump 705 not to operate. The content of the first circulation condition may be the same as that in the first embodiment or be a higher flow rate and pressure than those in the first embodiment. Then, this circulation through the circulation route A is continued until the dissolution degree sensor 805 detects a predetermined degree of dissolution.

In a case where the dissolution degree sensor 805 detects the predetermined degree of dissolution, the CPU 2001 transfers part of the liquid W stored in the first storing chamber 900 to the second storing chamber 950 (S24). Specifically, the CPU 2001 firstly causes the gas dissolving unit 800 and the first pump 702 to stop operating. Then, the CPU 2001 causes the fourth pump 705 to operate while monitoring the detection by the liquid level sensor 952 provided in the second storing chamber 950, and stops the fourth pump 705 when the liquid level sensor 952 detects a liquid surface. As a result, a predetermined amount of a liquid W is reserved in the second storing chamber 950.

Then, the CPU 2001 supplies the amount of a liquid W transferred to the second storing chamber 950 in S24 from the liquid supplying unit 600 to the first storing chamber 900 again (S26). Specifically, the CPU 2001 causes the pumps 602 and 603 to operate until the liquid level sensor 902 detects a liquid surface.

After the temperature detected by the temperature sensor 905 reaches 20° C. or lower, the CPU 2001 causes the gas dissolving unit 800 to resume operating, and drives the first pump 702 under a third circulation condition to circulate a liquid W through the circulation route A (S27). In the present embodiment, the third circulation condition is a condition suitable for recovering the degree of dissolution of the gas that has decreased as a result of causing a liquid W to flow in and out in S24 and S29 back to the desired degree of dissolution again. The third circulation condition may be the same flow and pressure as those in the first circulation condition or be a different flow rate and pressure from those in the first circulation condition. Alternatively, the third circulation condition may be such that the flow rate and pressure are the same as those in the first circulation condition but the circulation under the first circulation condition is performed and stopped repetitively and intermittently.

In a case where the dissolution degree sensor 805 detects a predetermined degree of dissolution, the CPU 2001 causes the gas dissolving unit 800 and the first pump 702 to stop operating (S28). Here, stopping the operation of the first pump 702 is not essential. That is, the subsequent step may be performed while continuing the circulation through the circulation route A.

The CPU 2001 also controls circulation through the circulation route B in parallel with S26 to S28. Firstly, the CPU 2001 starts adjusting the temperature of the liquid W stored in the second storing chamber 950 (S25). Specifically, the CPU 2001 causes the cooling unit 953 to operate while monitoring the temperature detected by the temperature sensor 955. Here, the temperature range for the second circulation condition may be 20° C. and below as with the first circulation condition, but may be a lower temperature and below for a reason similar to that described in the first embodiment. Meanwhile, in a case where the second storing chamber 950 is made of SUS316L or the like having relatively high thermal conductivity, the cooling of the second storing chamber 950 may be started before S24. In this way, it is possible to adjust the temperature for the second circulation condition while the temperature of the liquid W supplied to the second storing chamber 950 is maintained at 20° C. or lower, and thus suppress precipitation of the dissolved gas G as bubbles. Accordingly, UFBs can be generated efficiently.

In a case where the CPU 2001 confirms that the temperature detected by the temperature sensor 955 is within the temperature range for the second circulation condition mentioned above, the CPU 2001 drives the third pump 704 under the second circulation condition to circulate the liquid W through the circulation route B, and causes the UFB generating unit 1000 to start operating (S29). The content of the second circulation condition may be the same as that in the first embodiment or be a different condition from that in the first embodiment. Either way, it suffices that a flow rate and pressure suitable for UFB generation are set. The CPU 2001 continues such circulation through the circulation route B until the UFB concentration sensor 956 provided in the second storing chamber 950 detects a predetermined UFB concentration.

In a case where the UFB concentration sensor 956 detects the predetermined UFB concentration, the CPU 2001 causes the UFB generating unit 1000 and the third pump 704 to stop operating (S30). The CPU 2001 then opens the valve 954 to discharge the liquid W stored in the second storing chamber 950 to the collection container on the outside (S31).

Here, assume T1 as the time required to dissolve the desired gas G into a new liquid at a desired degree of dissolution after starting the supply of this liquid to the first storing chamber 900 from the liquid supplying unit 600 (the time required for S27). Assume also that T2 is the time required to turn a liquid W supplied to the second storing chamber 950 into a UFB-containing liquid of a desired concentration and complete discharging it to the collection container (the time required for S25 to S31). In the present embodiment, T1≤T2 is satisfied. In the case where the above condition is satisfied, a liquid W in which the desired gas is dissolved at the desired dissolution concentration is already prepared in the first storing chamber 900 by the time the discharge from the second storing chamber 950 to the collection container is completed. Accordingly, the UFB generating step can be continued efficiently.

In S32, the CPU 2001 determines whether the liquid W collected in the collection container has reached a target amount. If the target amount has not been reached, the CPU 2001 returns to S24, in which the CPU 2001 transfers a liquid from the first storing chamber 900 to the second storing chamber 950 again. In this case, the liquid reserved in the first storing chamber 900 is a liquid in which the desired gas has already been dissolved at the desired degree of dissolution.

If, on the other hand, it is determined in S32 that the liquid W collected in the collection container has reached the target amount, this process is terminated.

According to the present embodiment described above, the step of dissolving the gas G in the circulation route A and the step of generating UFBs in the circulation route B can be performed simultaneously under respectively suitable circulation conditions. Further, since the circulation route A and the circulation route B do not merge with each other and are independent of each other, the conditions suitable for the respective circulation routes can be maintained with higher accuracy.

Fourth Embodiment

Figure 20:
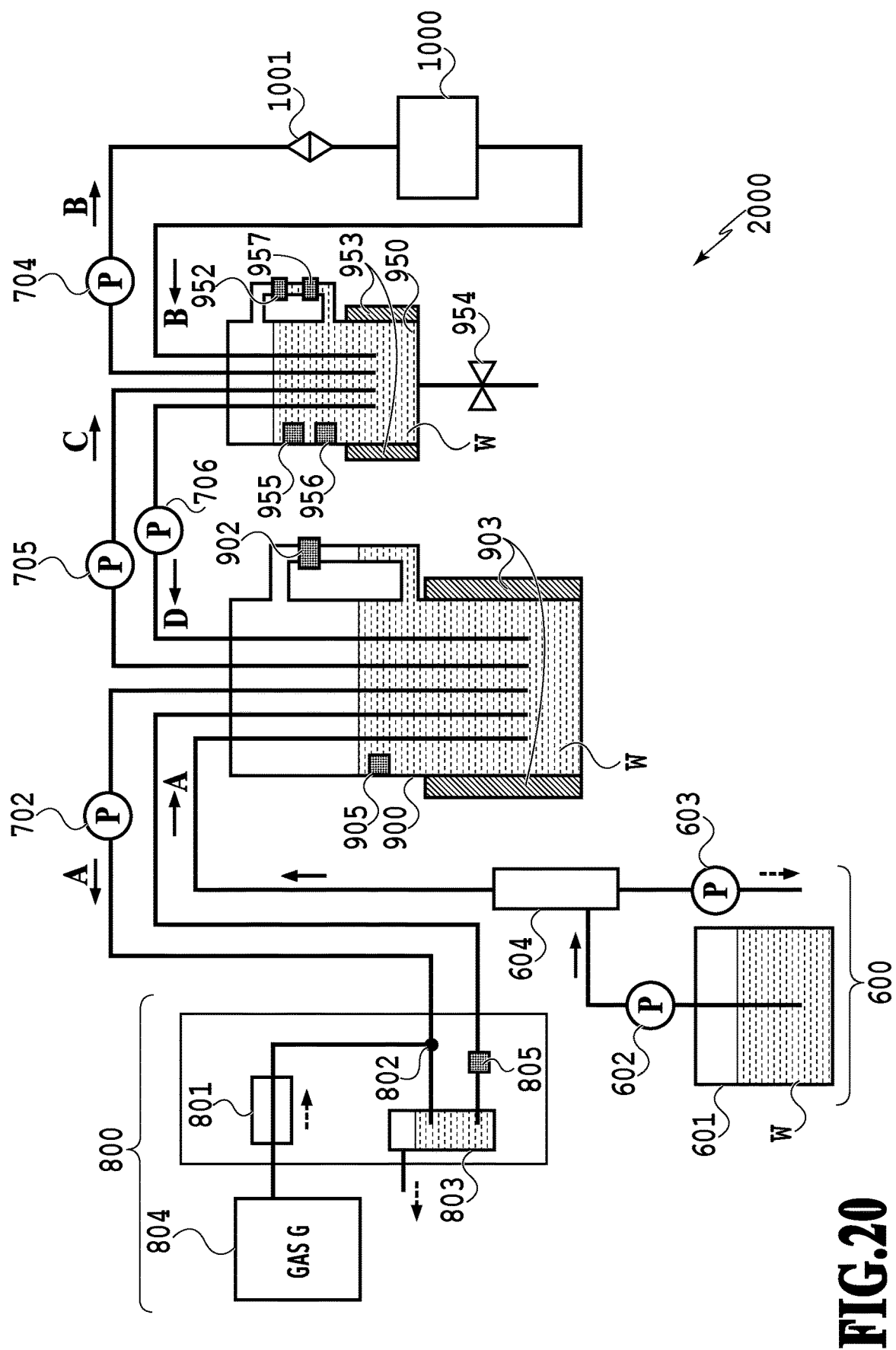
FIG. 20 is a schematic configuration diagram of a UFB-containing liquid producing apparatus in a fourth embodiment.

FIG. 20 is a schematic configuration diagram of a UFB-containing liquid producing apparatus 2000 in a fourth embodiment. The UFB-containing liquid producing apparatus 2000 in the present embodiment differs from that in the third embodiment illustrated in FIG. 18 in that the route indicated by arrow D in FIG. 20 is added. The route indicated by arrow D in FIG. 20 is a route for transferring a liquid W from the second storing chamber 950 to the first storing chamber 900, and uses a fifth pump 706 as a driving source. Also, the second storing chamber 950 in the present embodiment is provided with a lower-limit sensor 957 for managing the lower limit of the liquid level, in addition to the liquid level sensor 952 for managing the upper limit of the liquid level. The fourth pump 705 for transferring a liquid W from the first storing chamber 900 to the second storing chamber 950 and the fifth pump 706 for transferring a liquid W from the second storing chamber 950 to the first storing chamber 900 may be identical pumps or pumps differing in liquid transfer performance.

According to the present embodiment having the above configuration, the liquid W in the UFB generating step in the circulation route B can be returned to the gas dissolving step in the circulation route A again. That is, the degree of dissolution of the gas that has decreased as a result of generating UFBs can be adjusted to the proper degree of dissolution again by bringing the liquid back into the circulation route A.

Figure 21:
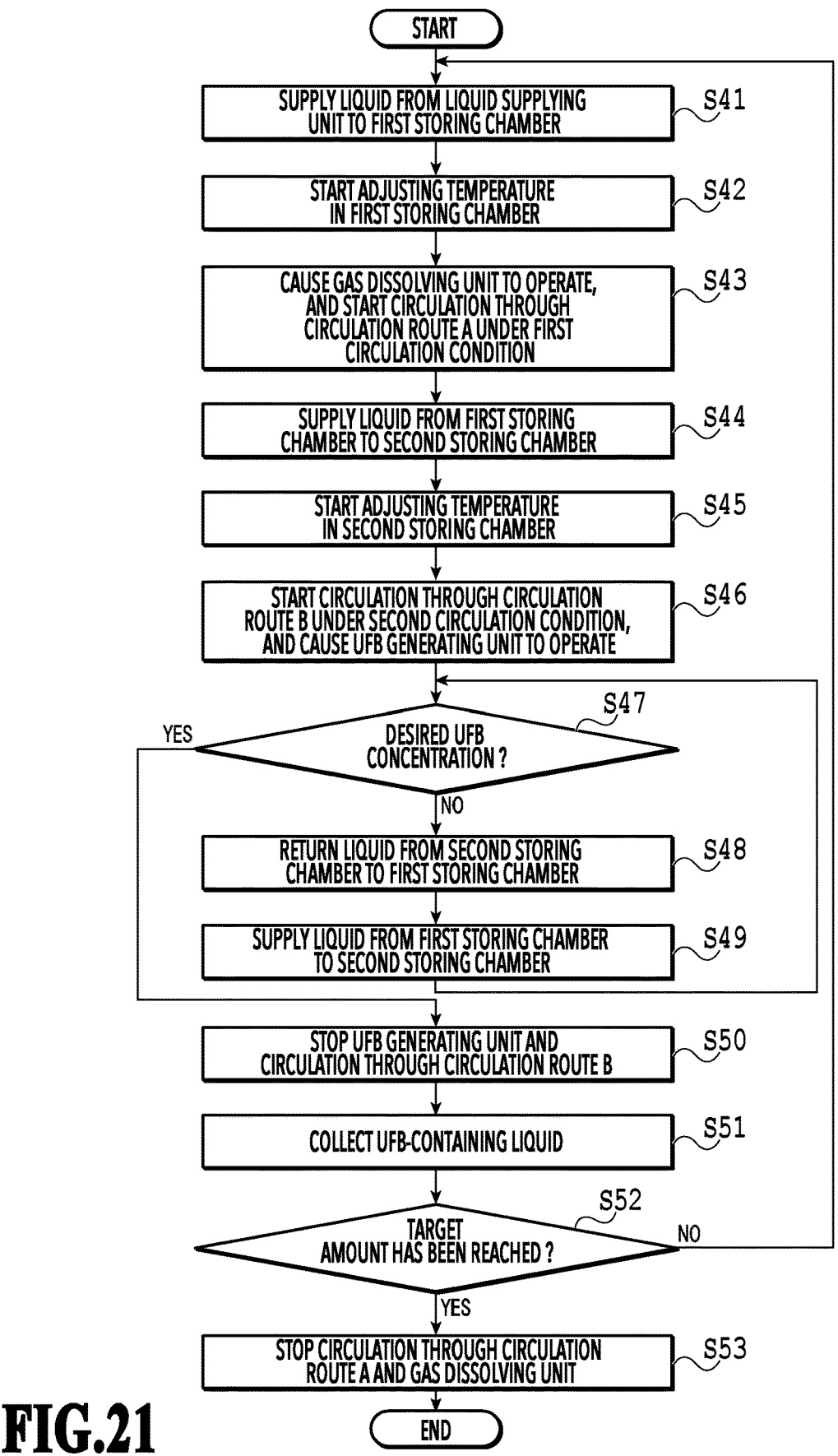
FIG. 21 is a flowchart describing UFB-containing liquid producing steps in the fourth embodiment.

FIG. 21 is a flowchart for describing steps executed by a CPU 2001 in a case of producing a desired UFB-containing liquid in the UFB-containing liquid producing apparatus 2000 in the present embodiment. The UFB-containing liquid producing apparatus 2000 in the present embodiment also has a control configuration similar to that in the first embodiment illustrated in the block diagram of FIG. 13.

In FIGS. 21, S41 to S45 are the same as S21 to S25 described in FIG. 19, and description thereof is therefore omitted here. In S44, however, the CPU 2001 does not stop the first pump 702 and maintains the circulation through the circulation route A.

In S46, the CPU 2001 drives the third pump 704 under the second circulation condition to circulate the liquid W through the circulation route B, and causes the UFB generating unit 1000 to start operating.

Then, the CPU 2001 determines whether the UFB concentration sensor 956 has detected a predetermined UFB concentration (S47). If determining that the predetermined UFB concentration has not been reached, the CPU 2001 returns part of the liquid W stored in the second storing chamber 950 back into the first storing chamber 900 (S48). Specifically, the CPU 2001 causes the fifth pump 706 to operate while monitoring the detection by the lower-limit sensor 957 provided in the second storing chamber 950, and causes the fifth pump 706 to stop operating when the lower-limit sensor 957 detects a liquid surface. As a result, a predetermined amount of the liquid W is returned to the first storing chamber 900 from the second storing chamber 950.

In a case where the dissolution degree sensor 805 detects a predetermined degree of dissolution, the CPU 2001 transfers part of the liquid W stored in the first storing chamber 900 to the second storing chamber 950 again (S49). Specifically, the CPU 2001 causes the fourth pump 705 to operate while monitoring the detection by the liquid level sensor 952 provided in the second storing chamber 950, and causes the fourth pump 705 to stop operating when the liquid level sensor 952 detects a liquid surface. As a result, a predetermined amount of the liquid W is transferred to the second storing chamber 950 from the first storing chamber 900. Then, these steps S48 and S49, i.e., steps of causing a liquid W to flow in and out between the first storing chamber 900 and the second storing chamber 950, are repeated until the UFB concentration sensor 956 detects the predetermined UFB concentration.

If determining in S47 that the UFB concentration sensor 956 has detected the predetermined UFB concentration, the CPU 2001 stops the UFB generating unit 1000 and the circulation through the circulation route B (S50). The CPU 2001 then opens the valve 954 to discharge the liquid W stored in the second storing chamber 950 to the collection container on the outside (S51).

In S52, the CPU 2001 determines whether the liquid W collected in the collection container has reached a target amount. If the target amount has not been reached, the CPU 2001 returns to S41 and repeats steps S41 to S51. On the other hand, if determining in S52 that the target amount has been reached, the CPU 2001 stops the circulation through the circulation route A and the operation of the gas dissolving unit 800 (S53). This process is then terminated.

According to the present embodiment described above, the gas dissolving step in the circulation route A and the UFB generating step in the circulation route B can be performed in a continuous manner, even during a liquid W between the first storing chamber 900 and the second storing chamber 950 and discharge of a liquid from the second storing chamber 950. The UFB-containing liquid production efficiency can therefore be improved to a greater extent than the embodiments described above.

In the present embodiment illustrated in FIG. 20, a new circulation route CD including the routes indicated by arrows C and D can be formed by making the amount of transfer by the fourth pump 705 and the amount of transfer by the fifth pump 706 equal to each other and also causing them to operate simultaneously. In this case, the first storing chamber 900 and the second storing chamber 950 can be considered a single large storing chamber and practically represent a configuration similar to the second embodiment described in FIG. 15. In this case, an independent circulation condition may be set for the circulation route CD. That is, during the circulation through the circulation route A under the first circulation condition and the circulation through the circulation route B under the second circulation condition, circulation through the circulation route CD may be performed under a circulation condition different from both the first circulation condition and the second circulation condition.

Also, in the present embodiment illustrated in FIG. 20, while the fourth pump 705 and the fifth pump 706 are both stopped, it is possible to implement an embodiment similar to the third embodiment described in FIG. 18. In other words, the UFB-containing liquid producing apparatus 2000 in the present embodiment illustrated in FIG. 20 is capable of switching between the producing method in the second embodiment and the producing method in the third embodiment according to various situations such as the type of the UFB-containing liquid to be produced and environmental conditions.

Figure 22:
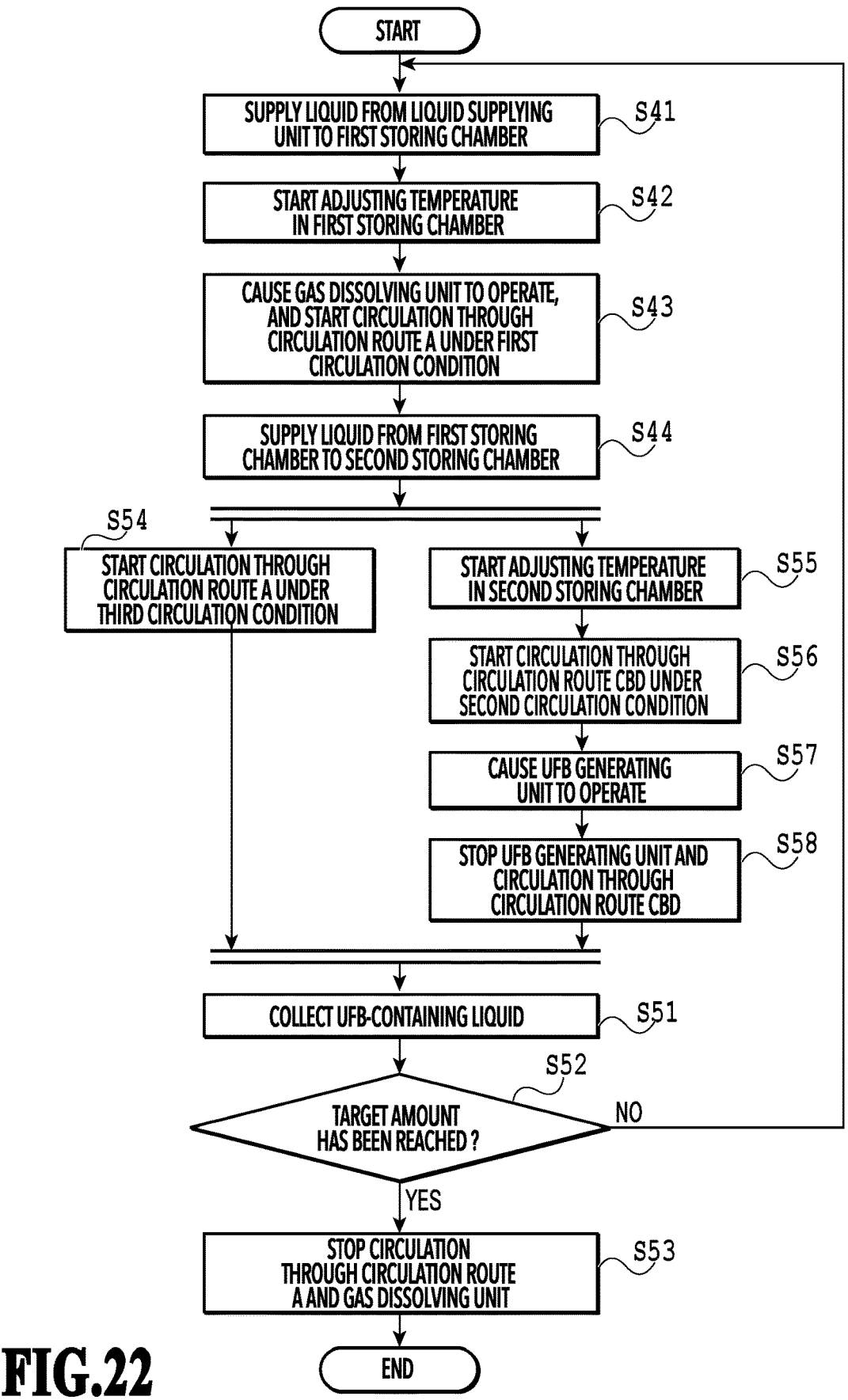
FIG. 22 is a flowchart describing a modification of the fourth embodiment.

FIG. 22 is a flowchart for describing a modification of the fourth embodiment. In this modification, after a liquid W is supplied from the first storing chamber 900 to the second storing chamber 950 (S44), a liquid is circulated through the circulation route A under the third circulation condition and the dissolution of the gas is continued (S54). On the other hand, adjustment of the temperature of the liquid in the second storing chamber 950 is started (S55), and the liquid is circulated through a circulation route CBD under the second circulation condition (S56). Details of this circulating operation are similar to those described in FIG. 21. In a case where the temperature in the second storing chamber 950 is set be different from the temperature in the first storing chamber 900, e.g., in a case where the temperature in the second storing chamber 950 is set at 15° C. and the temperature in the first storing chamber is set at 20° C., the CPU 2001 may proceed to S56 without waiting for the temperature in the second storing chamber 950 to reach 15° C.

If detecting that all of the values of the dissolution degree sensor 805, the temperature sensor 905, and the temperature sensor 955 have reached predetermined values, the CPU 2001 causes the UFB generating unit 1000 to operate (S57). Then, if determining that the UFB concentration sensor 956 has detected a predetermined UFB concentration, the CPU 2001 stops the UFB generating unit 1000 and the pumps 704, 705, and 706 to stop the circulation through the circulation route CBD.

The CPU 2001 then opens the valve 954 to discharge the liquid W stored in the second storing chamber 950 to the collection container on the outside (S51). Thereafter, as in the process described in FIG. 21, these operations are repeated until a target amount of a UFB-containing liquid is obtained.

With the configuration of FIG. 20, while a liquid W is supplied to the second storing chamber 950 from the first storing chamber 900 and also before the liquid temperature in the second storing chamber 950 reaches a predetermined value, the liquid temperature may rise to above the adjusted temperature obtained in the first storing chamber 900, thereby lowering the degree of dissolution of the gas G. According to this modification, even in such a case, UFBs can be generated stably and efficiently irrespective of the length of the route C and the material of the second storing chamber 950 since the UFB generation can be started in S57 after S54 and S56.

Fifth Embodiment

Figure 23:
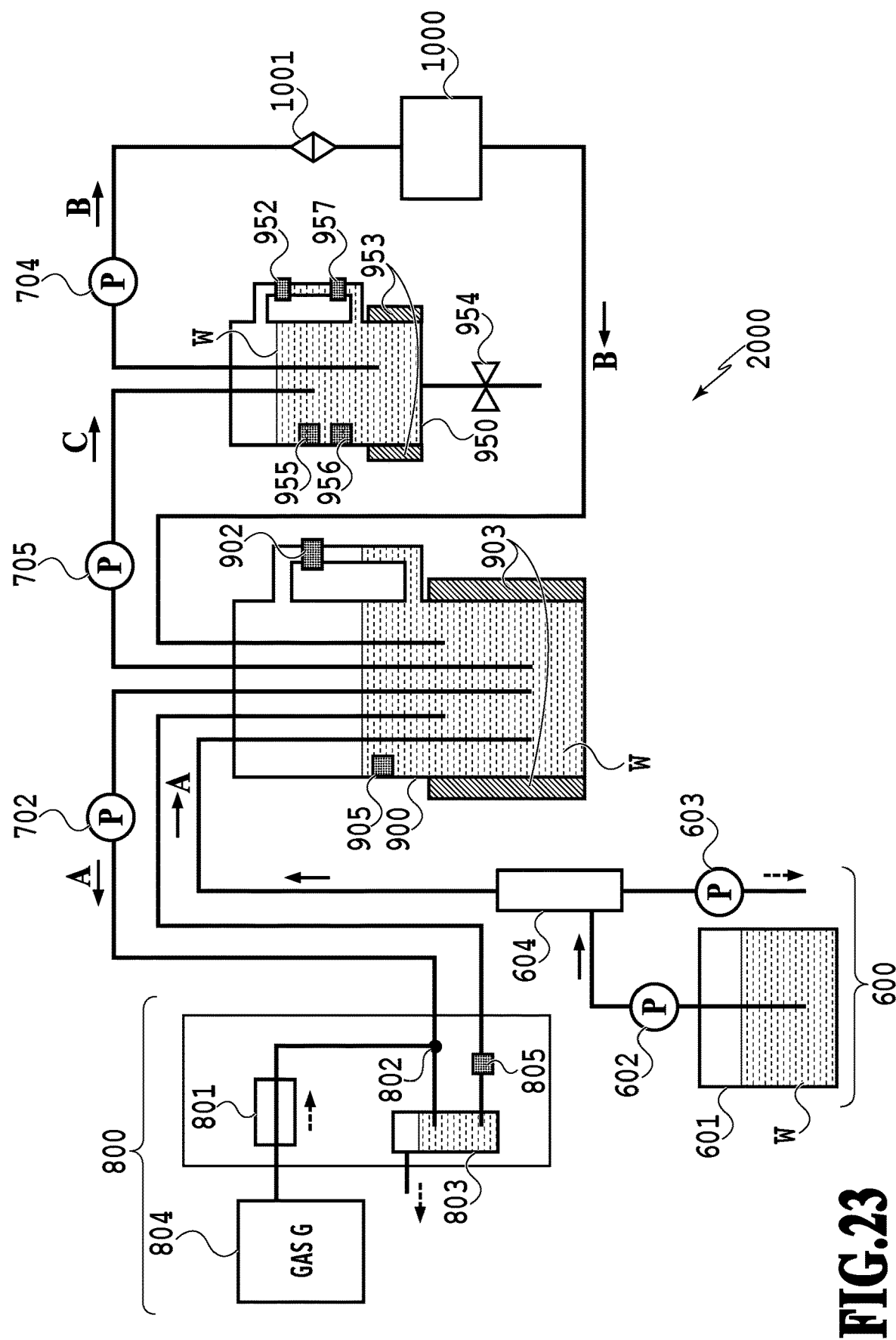
FIG. 23 is a schematic configuration diagram of a UFB-containing liquid producing apparatus in a fifth embodiment.

FIG. 23 is a schematic configuration diagram of a UFB-containing liquid producing apparatus 2000 in a fifth embodiment. The UFB-containing liquid producing apparatus 2000 in the present embodiment differs from that in the fourth embodiment illustrated in FIG. 20 in that the route leading back to the first storing chamber 900 from the UFB generating unit 1000 does not go through the second storing chamber 950.

With the UFB-containing liquid producing apparatus 2000 in the present embodiment, steps executed by the CPU 2001 in a case of producing a desired UFB-containing liquid are similar to those described in FIG. 22. In the present embodiment, however, the circulation route CBD in S56 in FIG. 22 is denoted as a circulation route CB. The flow rates in the route C and the route B may be the same or different. In the case where the flow rates are different, the flow rate in the route C is set to be higher than the flow rate in the route B.

In a case where the UFB generating unit 1000 generates a relatively large amount of heat, the temperature of the liquid W may rise and the gas G dissolved therein may be precipitated as bubbles. Returning these bubbles to the second storing chamber 950 as in FIG. 20 will change the liquid temperature in the second storing chamber 950, and the bubbles transferred from the UFB generating unit 1000 will be supplied to the UFB generating unit 1000 again, for example. This leads to a concern that the UFB generation efficiency at the UFB generating unit 1000 may be impaired, and this concern is notable especially in a case where a gas with high solubility is selected.

According to the present embodiment, a liquid having passed the UFB generating unit 1000 returns to the first storing chamber 900. This makes it possible to avoid the above concern and continue efficient UFB generation.

Note that the first storing chamber 900 has a sufficiently larger capacity than the second storing chamber 950, and is therefore less susceptible to temperature changes. Also, the end position of the route C is disposed higher than the start position of the route B. Thus, the possibility of bubbles entering the second storing chamber 950 and being supplied to the UFB generating unit 1000 is low. This enables more stable UFB generation. This positional relationship between pipes is also applicable to the first storing chamber 900. By disposing the end positions of the routes A and B above the start of the route C, it is possible to further reduce entry of bubbles into the second storing chamber 950.

Sixth Embodiment

Figure 24:
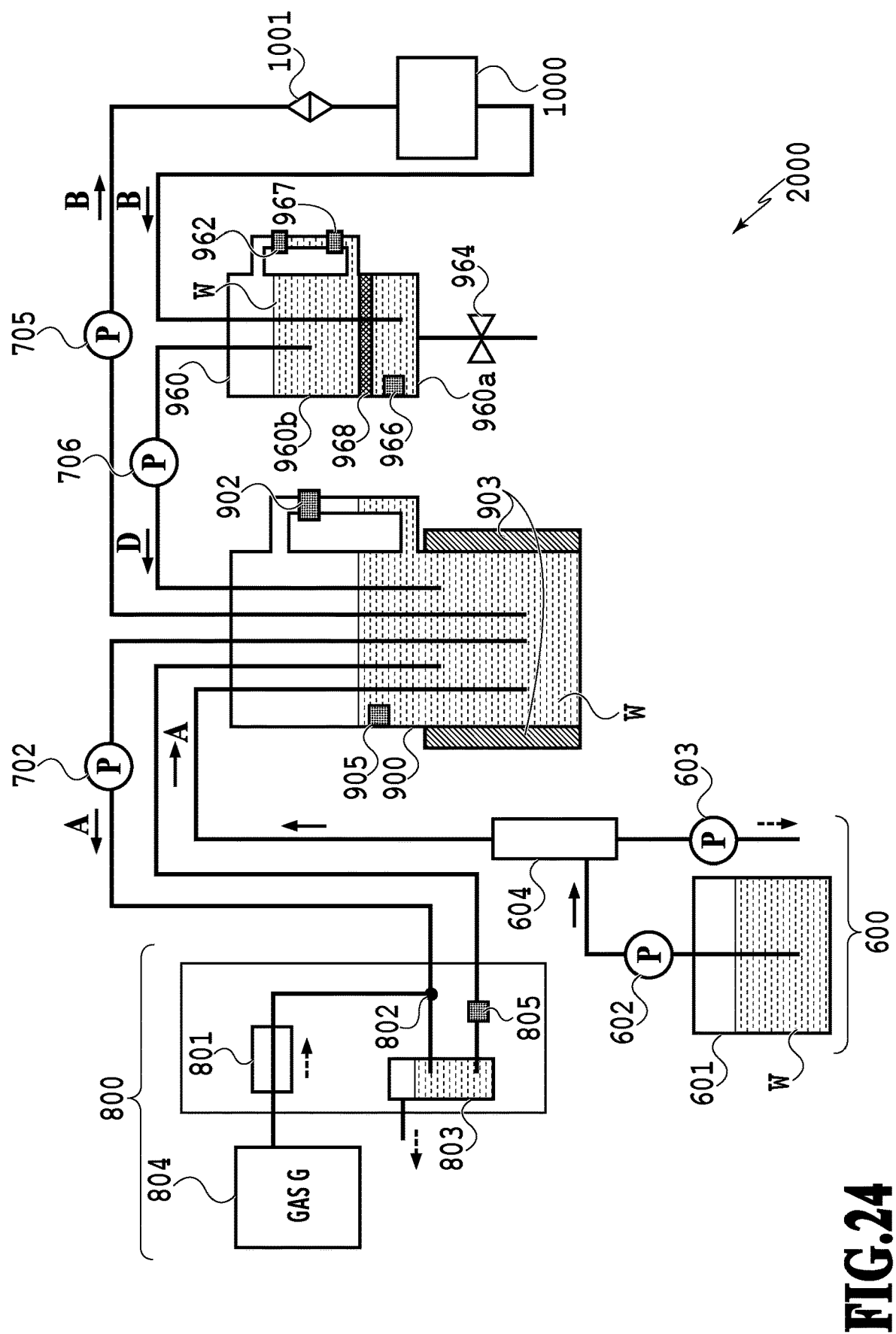
FIG. 24 is a schematic configuration diagram of a UFB-containing liquid producing apparatus in a sixth embodiment.

FIG. 24 is a schematic configuration diagram of a UFB-containing liquid producing apparatus 2000 in a sixth embodiment. The UFB-containing liquid producing apparatus 2000 in the present embodiment is configured to supply a liquid W directly from a first storing chamber 900 to a UFB generating unit 1000 and supply the liquid W from the UFB generating unit 1000 to the first storing chamber 900 through a third storing chamber 960.

Like the second storing chamber 950, the third storing chamber 960 is smaller than the first storing chamber 900 and has a capacity of about 1/100 to 1/5 of the first storing chamber 900. The third storing chamber 960 is made of a material with high corrosion resistance such as a fluorine-based resin such as PTFE or PFA, a metal such as SUS316L, or another inorganic material. Also, the third storing chamber 960 is provided with liquid level sensors 962 and 967, a UFB concentration sensor 966 for detecting the concentration of contained UFBs, and a pipe and a valve 964 for discharging a UFB-containing liquid to a container on the outside. Since the third storing chamber 960 is present downstream of the UFB generating unit 1000, the third storing chamber 960 requires no cooling unit but may be provided with a cooling unit depending on the application.

A UFB filter 968 is provided in the third storing chamber 960 at a position at or below the height level of the liquid level sensor 967. The inside of the third storing chamber 960 is separated into a UFB-containing liquid reservoir chamber 960a and a liquid reservoir chamber 960b by the UFB filter 968. The pore size of the UFB filter 968 is about 1 µm. A circulation route BD is formed such that the end of the route B is disposed in the UFB-containing liquid reservoir chamber 960a and the start of the route D is disposed in the liquid reservoir chamber 960b. In this configuration, the UFBs in a UFB-containing liquid supplied from the UFB generating unit 1000 are reserved inside the UFB-containing liquid reservoir chamber 960a, and the liquid W containing no UFB moves into the liquid reservoir chamber 960b and further is supplied to the first storing chamber 900.

Figure 25:
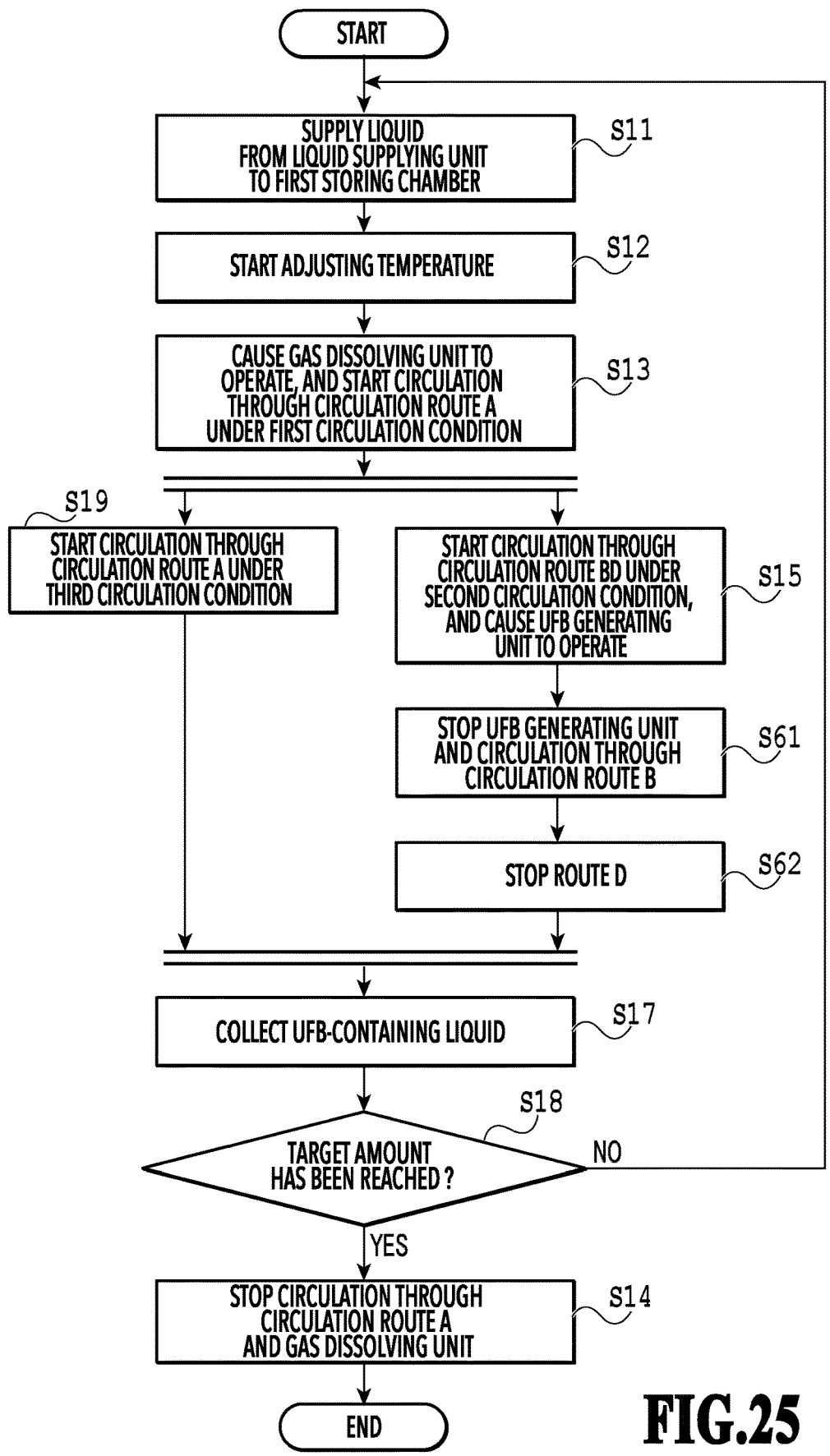
FIG. 25 is a flowchart describing UFB-containing liquid producing steps in the sixth embodiment.

With the UFB-containing liquid producing apparatus 2000 in the present embodiment, steps executed by a CPU 2001 in a case of producing a desired UFB-containing liquid are as described in FIG. 25, and these steps are substantially the same as those described in FIG. 17. The flow rates in the route B and the route D may be the same or different. In the case where the flow rates in the route B and the route D are different, the flow rate in the route D is set to be higher than the flow rate in the route B.

While the UFB generating unit 1000 generates UFBs, a liquid is circulated through a circulation route A under a third circulation condition and a gas is dissolved into the liquid (S19). In the present embodiment, the UFBs generated by the UFB generating unit 1000 are not caused to flow into the first storing chamber 900. Thus, there is no fear that the circulated UFBs will be broken at a merging part 802 and the like. Accordingly, the flow rate and pressure in the third circulation condition can be freely set and do not need to be set to be lower than those in the first circulation condition in order to prevent the breakage of the UFBs.

In the present embodiment, once generated, UFBs do not pass through various routes or the UFB generating unit 1000, but remain in the UFB-containing liquid reservoir chamber 960a. Thus, by controlling the time period of operation of the UFB generating unit 1000, it is possible to stably produce a UFB-containing liquid of a desired concentration.

If determining that the UFB concentration sensor 966 has detected a predetermined UFB concentration, the CPU 2001 firstly causes the UFB generating unit 1000 and a pump 705 to stop operating to thereby stop only the supply of a liquid W through the route B (S61). Then, at a timing when the liquid level sensor 967 detects a liquid surface, the CPU 2001 stops a pump 706 to stop the flow of a liquid W through the route D (S62). The CPU 2001 thereafter opens the valve 964 to discharge the liquid W stored in the third storing chamber 960 to the collection container on the outside (S17).

The present embodiment described above is particularly effective for, for example, a case where a gas G whose solubility is not significantly high is used, and a UFB-containing liquid of high concentration is produced by repeating the circulation through the circulation route A a number of times.

Figure 26:
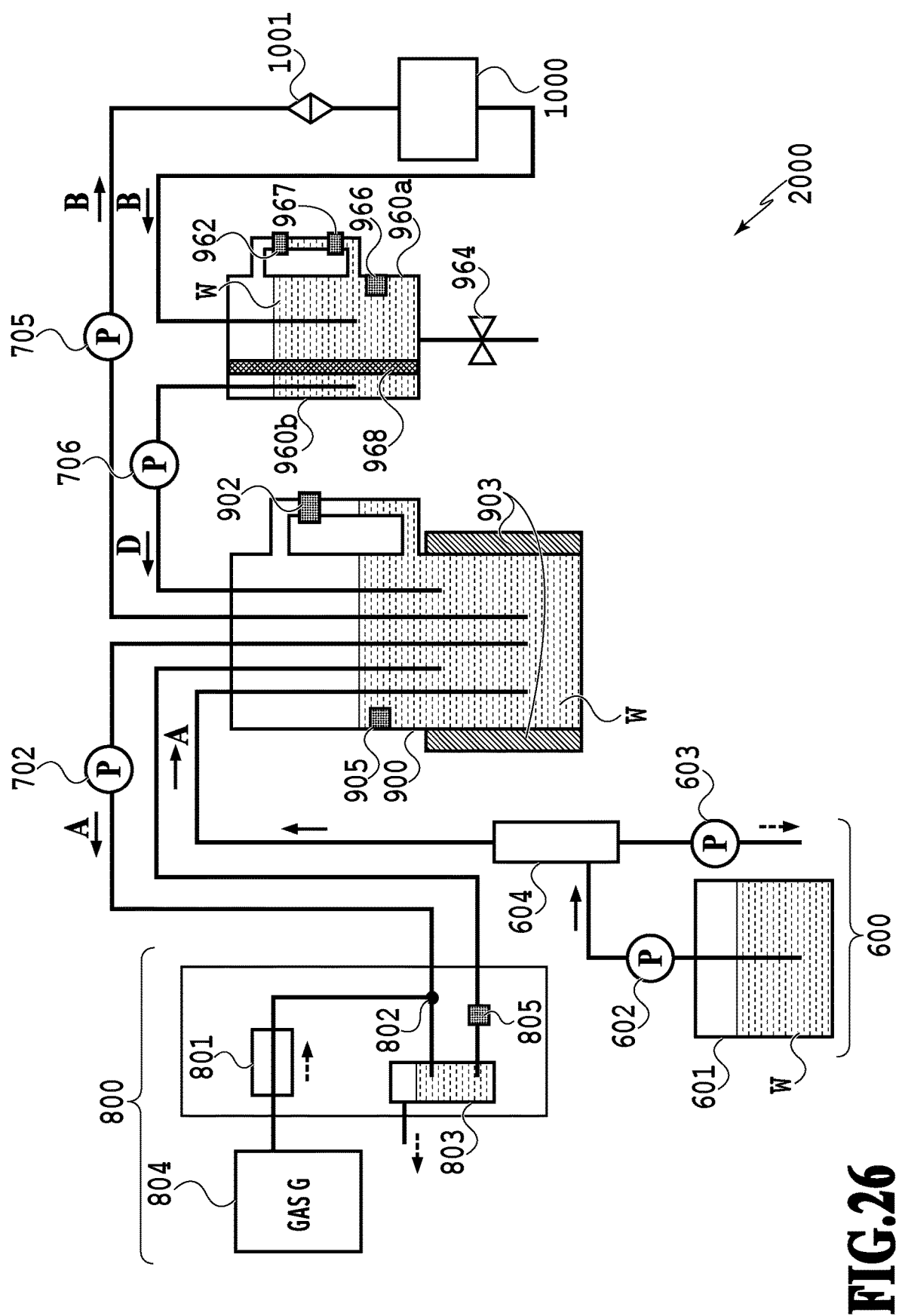
FIG. 26 is a schematic configuration diagram describing a modification of the UFB-containing liquid producing apparatus in the sixth embodiment.

FIG. 26 is a schematic configuration diagram of a UFB-containing liquid producing apparatus 2000 as a modification of the sixth embodiment. The UFB filter 968 is disposed horizontally in FIG. 24, whereas the UFB filter 968 is disposed vertically in FIG. 26.

In the case of FIG. 24, after bubbles enter the UFB-containing liquid reservoir chamber 960a, bubbles trying to rise with buoyancy may seal the UFB filter 968 and reduce the effective area of the UFB filter 968. In contrast, in the configuration of this modification, bubbles rising with buoyancy will be released to the atmosphere. This makes it possible to maintain the effective area of the UFB filter 968 and continue a stable circulating operation. Meanwhile, the UFB-containing liquid reservoir chamber 960a has a larger volume than the liquid reservoir chamber 960b. This makes it possible to increase the amount of a UFB-containing liquid to be collected at one time.

Seventh Embodiment

Figure 27:
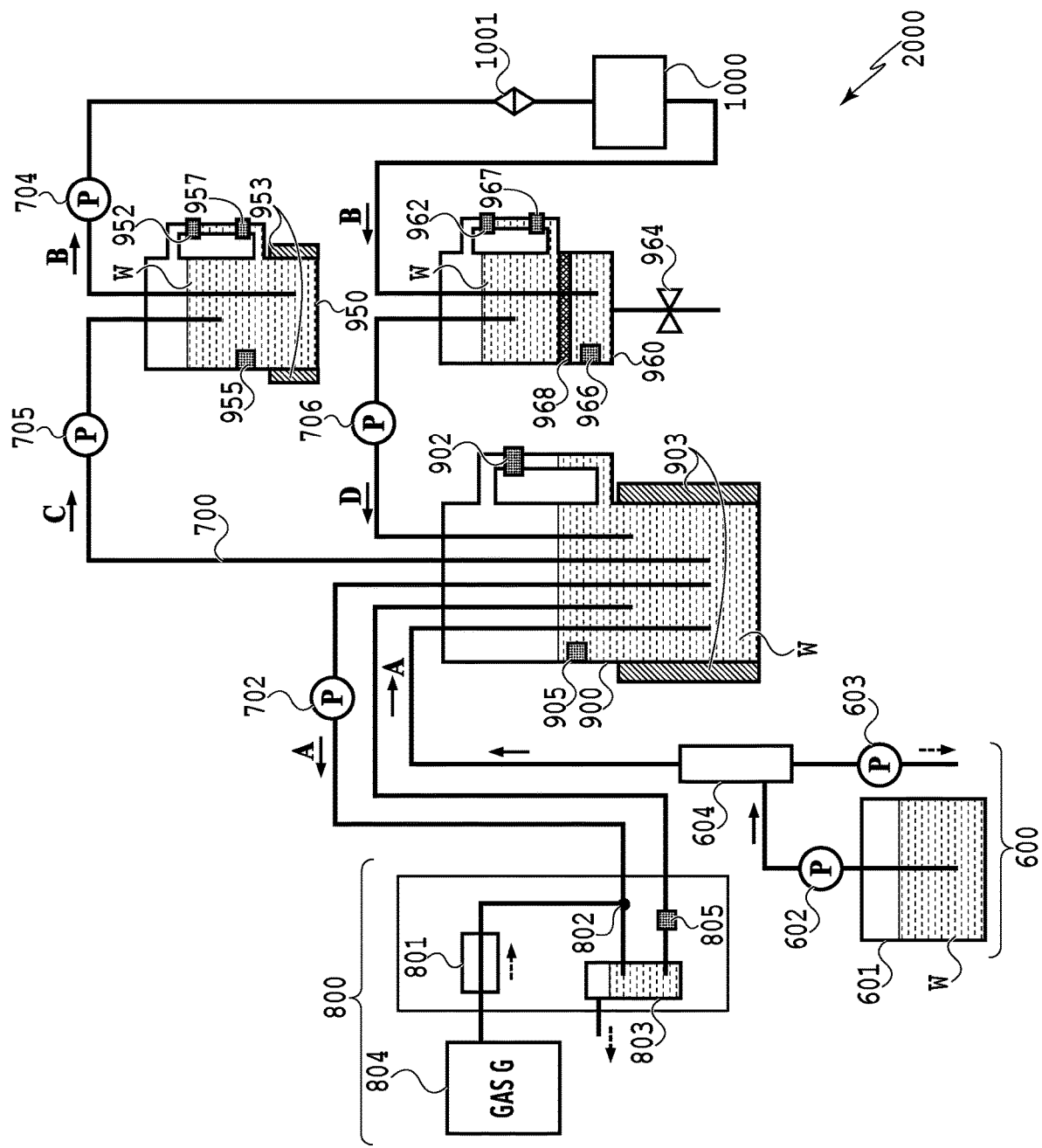
FIG. 27 is a schematic configuration diagram of a UFB-containing liquid producing apparatus in a seventh embodiment.

FIG. 27 is a schematic configuration diagram of a UFB-containing liquid producing apparatus 2000 in a seventh embodiment.

The UFB-containing liquid producing apparatus 2000 in the present embodiment is configured to supply a liquid W from a first storing chamber 900 to a UFB generating unit 1000 through a second storing chamber 950 and supply the liquid W from the UFB generating unit 1000 to the first storing chamber 900 through a third storing chamber 960.

The configurations and functions of the second storing chamber 950 and the third storing chamber 960 are similar to those described above, and the first storing chamber 900 is formed to have a capacity sufficiently larger than the sum of the capacities of the second storing chamber 950 and the third storing chamber 960.

Figure 28:
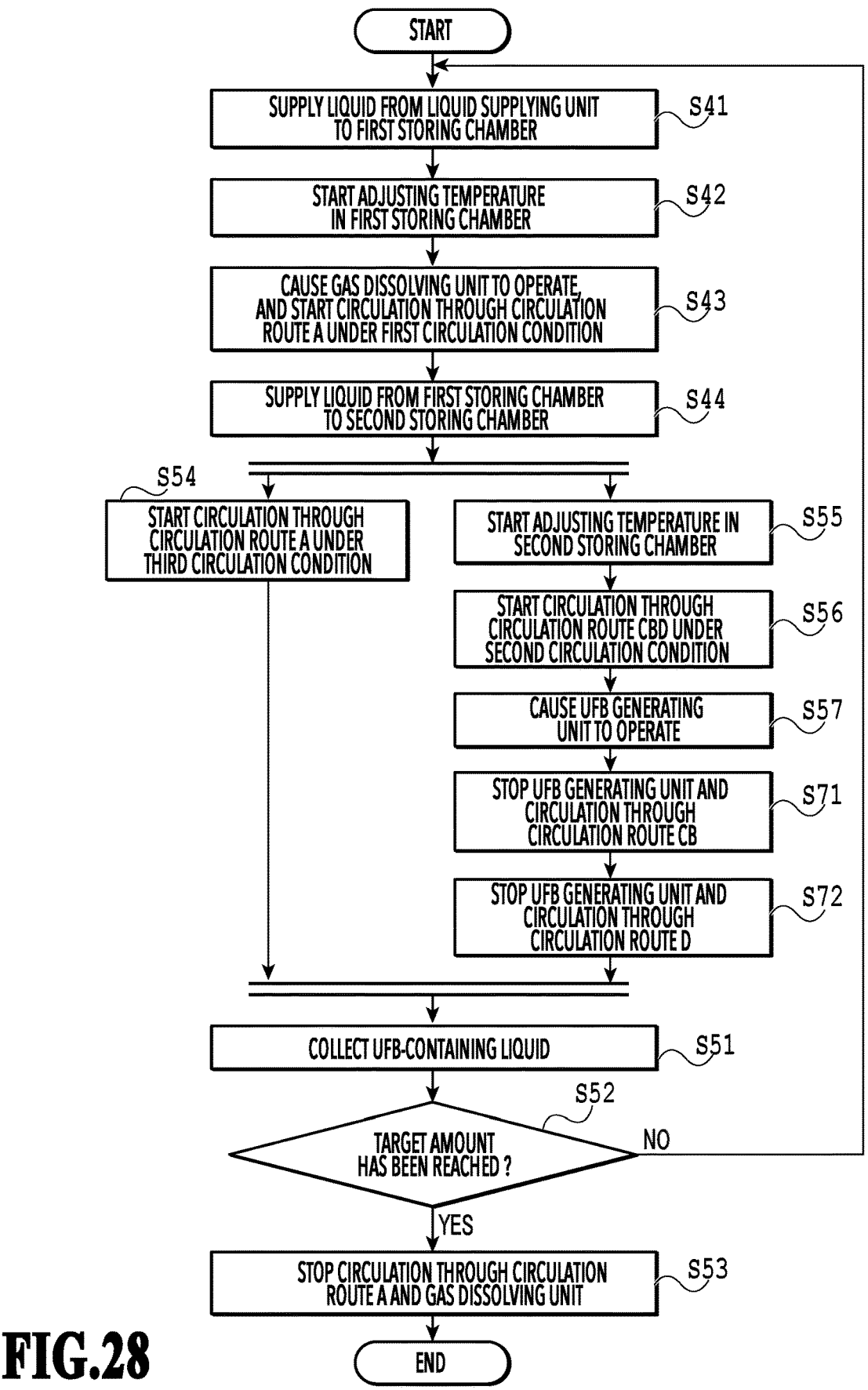
FIG. 28 is a flowchart describing UFB-containing liquid producing steps in the seventh embodiment.

FIG. 28 is a flowchart of steps executed by a CPU 2001 in a case of producing a desired UFB-containing liquid in the UFB-containing liquid producing apparatus 2000 in the present embodiment. FIG. 28 is substantially the same as the flowchart described in FIG. 22. If determining that a UFB concentration sensor 966 has detected a predetermined UFB concentration, the CPU 2001 firstly causes the UFB generating unit 1000 and a pump 705 to stop operating to thereby stop only the supply of a liquid W through a route CB (S71). Then, at a timing when a liquid level sensor 967 detects a liquid surface, the CPU 2001 stops a pump 706 to stop the supply of a liquid W through the route D (S72). The CPU 2001 thereafter opens a valve 964 to discharge the liquid W stored in the third storing chamber 960 to a collection container on the outside (S51).

According to the configuration of the present embodiment, it is possible to implement efficient UFB generation and production of a UFB-containing liquid of high concentration with the UFB generating unit 1000 irrespective of the type of the gas G. Although FIG. 27 illustrates a case where one type of gas G is connected, the present embodiment is also suitable for a case of switching from the gas G to be connected from one to another among a plurality of gases G.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2019-199170 filed Oct. 31, 2019, and No. 2020-141640 filed Aug. 25, 2020, which are hereby incorporated by reference wherein in their entirety.

What is claimed is:

1. An ultrafine bubble-containing liquid producing apparatus comprising:
    a storing chamber for storing a liquid;
    a dissolving unit that dissolves a predetermined gas into a liquid;
    an ultrafine bubble generating unit that generates ultrafine bubbles in the liquid in which the predetermined gas is dissolved; and
    a circulation controlling unit that controls circulation of a liquid through liquid circulation routes including the dissolving unit and the ultrafine bubble generating unit,
    wherein the circulation controlling unit circulates a liquid under a first condition that defines a state of the liquid to be circulated, through a circulation route passing through the dissolving unit in a case of causing the dissolving unit to operate in the circulation route, and
    wherein the circulation controlling unit circulates a liquid under a second condition different from the first condition through a circulation route passing through the ultrafine bubble generating unit in a case of causing the ultrafine bubble generating unit to operate in the circulation route,
    wherein the circulation controlling unit circulates a liquid under the first condition through a first circulation route starting from the storing chamber, passing through the dissolving unit, and returning to the storing chamber without passing through the ultrafine bubble generating unit, in a case of causing the dissolving unit to operate in the first circulation route, and
    wherein the circulation controlling unit circulates a liquid under the second condition through a second circulation route starting from the storing chamber, passing through the ultrafine bubble generating unit, and returning to the storing chamber without passing through the dissolving unit, in a case of causing the ultrafine bubble generating unit to operate in the second circulation route.

2. The ultrafine bubble-containing liquid producing apparatus according to claim 1, wherein the circulation controlling unit circulates a liquid under the first condition through a circulation route starting from the storing chamber, passing through the dissolving unit and the ultrafine bubble generating unit, and returning to the storing chamber, in a case of causing the dissolving unit to operate and causing the ultrafine bubble generating unit not to operate in the circulation route, and
    wherein the circulation controlling unit circulates a liquid under the second condition through the circulation route in a case of causing the dissolving unit not to operate and causing the ultrafine bubble generating unit to operate in the circulation route.

3. The ultrafine bubble-containing liquid producing apparatus according to claim 1, further comprising:
    a liquid supplying unit that supplies a liquid to the storing chamber; and
    a discharging unit that discharges the liquid from the storing chamber.

4. The ultrafine bubble-containing liquid producing apparatus according to claim 1, wherein the first condition and the second condition each define a state being at least one selected from the group consisting of a flow rate, pressure, and temperature of a liquid.

5. The ultrafine bubble-containing liquid producing apparatus according to claim 4, wherein the first condition defines a higher flow rate than a flow rate in the second condition.

6. The ultrafine bubble-containing liquid producing apparatus according to claim 4, wherein the first condition defines a higher pressure than a pressure in the second condition.

7. The ultrafine bubble-containing liquid producing apparatus according to claim 4, wherein the second condition defines a lower temperature than a temperature in the first condition.

8. The ultrafine bubble-containing liquid producing apparatus according to claim 1, wherein the circulation controlling unit circulates a liquid under the first condition and under the second condition by controlling driving of pumps disposed in the circulation routes.

9. The ultrafine bubble-containing liquid producing apparatus according to claim 1, wherein the ultrafine bubble generating unit generates the ultrafine bubbles by causing a heating element to generate heat and cause film boiling at an interface between a liquid and the heating element.

10. An ultrafine bubble-containing liquid producing apparatus comprising:
a dissolving unit that dissolves a predetermined gas into a liquid;
an ultrafine bubble generating unit that generates ultrafine bubbles in the liquid in which the predetermined gas is dissolved;
a circulation controlling unit that controls circulation of a liquid through liquid circulation routes including the dissolving unit and the ultrafine bubble generating unit;
a first storing chamber and a second storing chamber for storing a liquid; and
a unit that supplies a liquid from the first storing chamber to the second storing chamber,
wherein the circulation controlling unit circulates a liquid under a first condition that defines a state of the liquid to be circulated, through a circulation route passing through the dissolving unit in a case of causing the dissolving unit to operate in the circulation route,
wherein the circulation controlling unit circulates a liquid under a second condition different from the first condition through a circulation route passing through the ultrafine bubble generating unit in a case of causing the ultrafine bubble generating unit to operate in the circulation route,
wherein the circulation controlling unit circulates a liquid under the first condition through a first circulation route starting from the first storing chamber, passing through the dissolving unit, and returning to the first storing chamber without passing through the ultrafine bubble generating unit, in a case of causing the dissolving unit to operate in the first circulation route, and
wherein the circulation controlling unit circulates a liquid under the second condition through a second circulation route starting from the second storing chamber, passing through the ultrafine bubble generating unit, and returning to the second storing chamber without passing through the dissolving unit, in a case of causing the ultrafine bubble generating unit to operate in the second circulation route.

11. The ultrafine bubble-containing liquid producing apparatus according to claim 10, further comprising a unit that supplies a liquid in which the ultrafine bubbles are generated by the ultrafine bubble generating unit from the second storing chamber to the first storing chamber.

12. The ultrafine bubble-containing liquid producing apparatus according to claim 11, wherein the circulation controlling unit circulates a liquid under a circulation condition different from the first condition and the second condition through a third circulation route including a route for supplying a liquid from the first storing chamber to the second storing chamber and a route for supplying a liquid from the second storing chamber to the first storing chamber.

13. The ultrafine bubble-containing liquid producing apparatus according to claim 10, wherein the circulation controlling unit simultaneously performs the circulation through the first circulation route and the circulation through the second circulation route.

14. The ultrafine bubble-containing liquid producing apparatus according to claim 13, wherein the circulation controlling unit circulates a liquid under the first condition through the first circulation route in a case of causing the ultrafine bubble generating unit not to operate, and wherein the circulation controlling unit circulates a liquid under a third condition different from the first condition through the first circulation route in a case of causing the ultrafine bubble generating unit to operate.

15. The ultrafine bubble-containing liquid producing apparatus according to claim 10, wherein a capacity of the second storing chamber is smaller than a capacity of the first storing chamber, and
wherein the ultrafine bubble-containing liquid producing apparatus further comprises:
a liquid supplying unit that supplies a liquid to the first storing chamber; and
a discharging unit that discharges a liquid from the second storing chamber.

16. The ultrafine bubble-containing liquid producing apparatus according to claim 10, wherein the first condition and the second condition each define a state being at least one selected from the group consisting of a flow rate, pressure, and temperature of a liquid.

17. The ultrafine bubble-containing liquid producing apparatus according to claim 16, wherein the first condition defines a higher flow rate than a flow rate in the second condition.

18. The ultrafine bubble-containing liquid producing apparatus according to claim 16, wherein the first condition defines a higher pressure than a pressure in the second condition.

19. The ultrafine bubble-containing liquid producing apparatus according to claim 16, wherein the second condition defines a lower temperature than a temperature in the first condition.

20. The ultrafine bubble-containing liquid producing apparatus according to claim 10, wherein the circulation controlling unit circulates a liquid under the first condition and under the second condition by controlling driving of pumps disposed in the circulation routes.

21. The ultrafine bubble-containing liquid producing apparatus according to claim 10, wherein the ultrafine bubble generating unit generates the ultrafine bubbles by causing a heating element to generate heat and cause film boiling at an interface between a liquid and the heating element.

22. An ultrafine bubble-containing liquid producing apparatus comprising:
a dissolving unit that dissolves a predetermined gas into a liquid;
an ultrafine bubble generating unit that generates ultrafine bubbles in the liquid in which the predetermined gas is dissolved;
a circulation controlling unit that controls circulation of a liquid through liquid circulation routes including the dissolving unit and the ultrafine bubble generating unit; and
at least one of:
a first supplying unit that supplies a liquid to the ultrafine bubble generating unit from a first storing chamber for storing a liquid through a second storing chamber for storing a liquid; and
a second supplying unit that supplies a liquid to the first storing chamber from the ultrafine bubble generating unit through a third storing chamber for storing a liquid,
wherein the circulation controlling unit circulates a liquid under a first condition that defines a state of the liquid to be circulated, through a circulation route passing through the dissolving unit in a case of causing the dissolving unit to operate in the circulation route, and wherein the circulation controlling unit circulates a liquid under a second condition different from the first condition through a circulation route passing through the ultrafine bubble generating unit in a case of causing the ultrafine bubble generating unit to operate in the circulation route, wherein the circulation controlling unit circulates a liquid under the first condition through a first circulation route starting from the first storing chamber, passing through the dissolving unit, and returning to the first storing chamber without passing through the ultrafine bubble generating unit, in a case of causing the dissolving unit to operate in the first circulation route, and wherein the circulation controlling unit circulates a liquid under the second condition through a second circulation route starting from the first storing chamber, passing through the ultrafine bubble generating unit, and returning to the first storing chamber without passing through the dissolving unit, in a case of causing the ultrafine bubble generating unit to operate in the second circulation route.

23. The ultrafine bubble-containing liquid producing apparatus according to claim 22, wherein the ultrafine bubble-containing liquid producing apparatus comprises the second supplying unit,
wherein the third storing chamber includes a filter that separates an inside of the third storing chamber into an ultrafine bubble storing chamber connected to the ultrafine bubble generating unit and a liquid storing chamber connected to the first storing chamber, and
wherein the ultrafine bubble storing chamber includes a discharging unit that discharges a liquid.

24. The ultrafine bubble-containing liquid producing apparatus according to claim 23, wherein the filter is disposed vertically.

25. The ultrafine bubble-containing liquid producing apparatus according to claim 23, wherein a volume of the ultrafine bubble storing chamber is larger than a volume of the liquid storing chamber.

26. The ultrafine bubble-containing liquid producing apparatus according to claim 22, wherein a sum of capacities of the second storing chamber and the third storing chamber is smaller than a capacity of the first storing chamber.

27. The ultrafine bubble-containing liquid producing apparatus according to claim 22, wherein the first condition and the second condition each define a state being at least one selected from the group consisting of a flow rate, pressure, and temperature of a liquid.

28. The ultrafine bubble-containing liquid producing apparatus according to claim 27, wherein the first condition defines a higher flow rate than a flow rate in the second condition.

29. The ultrafine bubble-containing liquid producing apparatus according to claim 27, wherein the first condition defines a higher pressure than a pressure in the second condition.

30. The ultrafine bubble-containing liquid producing apparatus according to claim 27, wherein the second condition defines a lower temperature than a temperature in the first condition.

31. The ultrafine bubble-containing liquid producing apparatus according to claim 22, wherein the circulation controlling unit circulates a liquid under the first condition and under the second condition by controlling driving of pumps disposed in the circulation routes.

32. The ultrafine bubble-containing liquid producing apparatus according to claim 22, wherein the ultrafine bubble generating unit generates the ultrafine bubbles by causing a heating element to generate heat and cause film boiling at an interface between a liquid and the heating element.

* * * * *